US012684652B2

(12) United States Patent
Chun et al.

(10) Patent No.: US 12,684,652 B2
(45) Date of Patent: Jul. 14, 2026

(54) NETWORK SLICE MANAGEMENT BASED ON INACTIVITY

(71) Applicant: Ofinno, LLC, Reston, VA (US)

(72) Inventors: SungDuck Chun, Fairfax, VA (US); Kyungmin Park, Vienna, VA (US); Esmael Hejazi Dinan, McLean, VA (US); Peyman Talebi Fard, Vienna, VA (US); Weihua Qiao, Herndon, VA (US); Jian Xu, McLean, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 18/388,086

(22) Filed: Nov. 8, 2023

(65) Prior Publication Data

US 2024/0073996 A1 Feb. 29, 2024

Related U.S. Application Data

(63) Continuation of application No. PCT/US2023/015372, filed on Mar. 16, 2023.

(60) Provisional application No. 63/320,911, filed on Mar. 17, 2022.

(51) Int. Cl.
*H04W 76/38* (2018.01)

(52) U.S. Cl.
CPC ................................... *H04W 76/38* (2018.02)

(58) Field of Classification Search
CPC ..... H04W 76/38; H04W 76/30; H04W 88/02; H04W 76/34; H04W 60/06; H04W 76/00; H04W 48/00
See application file for complete search history.

(56) References Cited

U.S. PATENT DOCUMENTS

| | | | |
|---|---|---|---|
| 11,284,290 B2 | 3/2022 | Takano | |
| 2017/0079059 A1 | 3/2017 | Li et al. | |
| 2019/0141606 A1* | 5/2019 | Qiao | H04W 76/18 |
| 2019/0223093 A1* | 7/2019 | Watfa | H04W 36/24 |
| 2020/0068430 A1 | 2/2020 | Chan et al. | |
| 2021/0092634 A1* | 3/2021 | Kang | H04W 28/0247 |
| 2021/0136674 A1 | 5/2021 | Lee et al. | |
| 2021/0136715 A1 | 5/2021 | Jeong et al. | |
| 2021/0211974 A1 | 7/2021 | Prabhakar et al. | |

(Continued)

FOREIGN PATENT DOCUMENTS

| | | |
|---|---|---|
| EP | 3 544 337 A1 | 9/2019 |
| EP | 3 905 782 A1 | 11/2021 |

(Continued)

OTHER PUBLICATIONS

3GPP TS 23.501 V17.3.0 (Dec. 2021); Technical Specification; 3rd Generation Partnership Project; Technical Specification Group Services and System Aspects; System architecture for the 5G System (5GS); Stage 2; (Release 17).

(Continued)

*Primary Examiner* — Alison Slater
(74) *Attorney, Agent, or Firm* — John F. Sun; Kavon Nasabzadeh; Jacob L. Mangan

(57) ABSTRACT

An access and mobility management function (AMF) receives, from a unified data management (UDM), a value for a time duration associated with inactivity of a network slice for a wireless device. The AMF sends, to the wireless device and upon expiration of the time duration, an indication of removal of the network slice.

17 Claims, 37 Drawing Sheets

(56) References Cited

U.S. PATENT DOCUMENTS

| | | | |
|---|---|---|---|
| 2021/0297977 | A1 | 9/2021 | Prabhakar et al. |
| 2021/0368395 | A1 | 11/2021 | Prabhakar et al. |
| 2021/0368421 | A1 | 11/2021 | Venkataraman et al. |
| 2021/0377814 | A1 | 12/2021 | Sillanpaa |
| 2022/0007184 | A1 | 1/2022 | Ferdi et al. |
| 2022/0022128 | A1* | 1/2022 | Takakura ............... H04W 8/26 |
| 2022/0295279 | A1 | 9/2022 | Kuge |
| 2022/0400461 | A1 | 12/2022 | Nayak et al. |
| 2023/0016724 | A1 | 1/2023 | Nayak et al. |
| 2023/0276353 | A1 | 8/2023 | Cheng et al. |
| 2023/0362800 | A1* | 11/2023 | Watfa ................... H04W 48/18 |
| 2023/0413360 | A1* | 12/2023 | Velev ................... H04W 48/18 |

FOREIGN PATENT DOCUMENTS

| | | |
|---|---|---|
| EP | 4009708 A1 | 6/2022 |
| WO | 2018/038487 A1 | 3/2018 |
| WO | 2018/135992 A1 | 7/2018 |
| WO | 2021/054781 A1 | 3/2021 |
| WO | 2021/225087 A1 | 11/2021 |
| WO | 2021/247725 A1 | 12/2021 |
| WO | 2022/260472 A1 | 12/2022 |
| WO | 2023/120046 A1 | 6/2023 |
| WO | 2023/170636 A1 | 9/2023 |

OTHER PUBLICATIONS

3GPP TS 23.502 V17.3.0 (Dec. 2021); Technical Specification; 3rd Generation Partnership Project; Technical Specification Group Services and System Aspects; Procedures for the 5G System (5GS); Stage 2; (Release 17).

3GPP TR 23.700-40 V17.0.0 (Mar. 2021); Technical Report; 3rd Generation Partnership Project; Technical Specification Group Services and System Aspects; Study on enhancement of network slicing; Phase 2; (Release 17).

S2-2200191; 3GPP SA WG2 Meeting #149E; Elbonia, Feb. 14-25, 2022; (was S2-22xxxx); Source: Ericsson; Title: Key issue for Enhanced Network control of Slice Usage; Document for: Discussion/Approval.

S2-2200887; 3GPP TSG-SA WG2 Meeting #149E e-meeting; Elbonia, Feb. 14-25, 2022; (revision of S2-220xxxx); Source: Huawei, HiSilicon; Title: New Key issue for WT#4: Network controlled behavior of network slice usage; Document for: Approval; Agenda Item: 9.14.

S2-2200984; 3GPP TSG-WG SA2 Meeting #149E e-meeting; E-meeting, Feb. 14-25, 2022; (revision of S2-220xxxx); Source: Samsung; Title: Key issue on support for federated learning in 5GC; Document for: Approval.

S2-2200992; SA WG2 Meeting #149E (e-meeting); Feb. 14-25, 2022, Elbonia; (revision of S2-220xxxx); Source: Nokia, Nokia Shanghai Bell.; Title: New key issue: KI for objective #4—Improved Network control of the UE behaviour control; Document for: Approval.

S2-2200999; SA WG2 Meeting #149E (e-meeting); Feb. 14-25, 2022, Elbonia; Source: Samsung; Title: New key issue: KI for objective #4—Requested Slice controlled by network; Document for: Approval.

S2-2201149; SA WG2 Meeting #149e; Feb. 14-25, 2022, Electronic Meeting; (was S2-22xxxxx); Source: InterDigital Inc.; Title: WT#3: New Key Issue on enabling roaming UEs to register to available network slices in the surrounding area; Document for: Approval; Agenda Item: 9.14.

SP-211641; TSG SA Meeting #SP-94E; Dec. 14-20, 2021, Electronic meeting; Source: ZTE, LG Electronics, Samsung, Alibaba, Apple, AT&T, CATT, China Telecom, China Unicom, Convida Wireless LLC, Ericsson, Intel, InterDigital, KDDI, Lenovo, Matrixx, MITRE, Motorola Mobility, NEC , Nokia, Nokia Shanghai Bell , NTT Docomo, OPPO, Oracle, Orange, Qualcomm, Sanechips, Sharp, T-Mobile USA, Spreadtrum, Tencent, Verizon UK Ltd, Xiaomi Title: Study on Enhancement of Network Slicing Phase 3; Document for: Approval; Agenda Item: 9.1.3.

International Search Report and Written Opinion of the International Searching Authority mailed Aug. 25, 2023, in International Application No. PCT/US2023/015372.

C1-172092; 3GPP TSG-CT WG1 Meeting #104; Zhangjiajie, P.R of China, May 15-19, 2017; Source: ZTE; Title: MM procedure impact for network slicing; Spec: 3GPP TR24.890; Agenda item: 15.2.1.8/15.2.1.3; Document for: Agreement.

C1-217350; 3GPP TSG-CT WG1 Meeting #133-e; E-meeting, Nov. 11-19, 2021; (was C1-216759, 6287, 6204, 5774); Change Request; 24.501; CR 3632; rev 4; Current version: 17.4.1.

3GPP TS 24.501 V17.5.0 (Dec. 2021); Technical Specification; 3rd Generation Partnership Project; Technical Specification Group Core Network and Terminals; Non-Access-Stratum (NAS) protocol for 5G System (5GS); Stage 3; (Release 17).

Extended European Search Report, mailed Aug. 1, 2024, in EP Patent Application No. 24171216.5.

Office Action, mailed Jul. 3, 2024, in U.S. Appl. No. 18/639,814.

Office Action, mailed Oct. 30, 2024, in U.S. Appl. No. 18/639,814.

\* cited by examiner

FIG. 7C

SDAP 771/772

PDCP 761/762

RLC 751/752

MAC 741/742

PHY 731/732

Figures 14A, 14B, 14C, 14D:
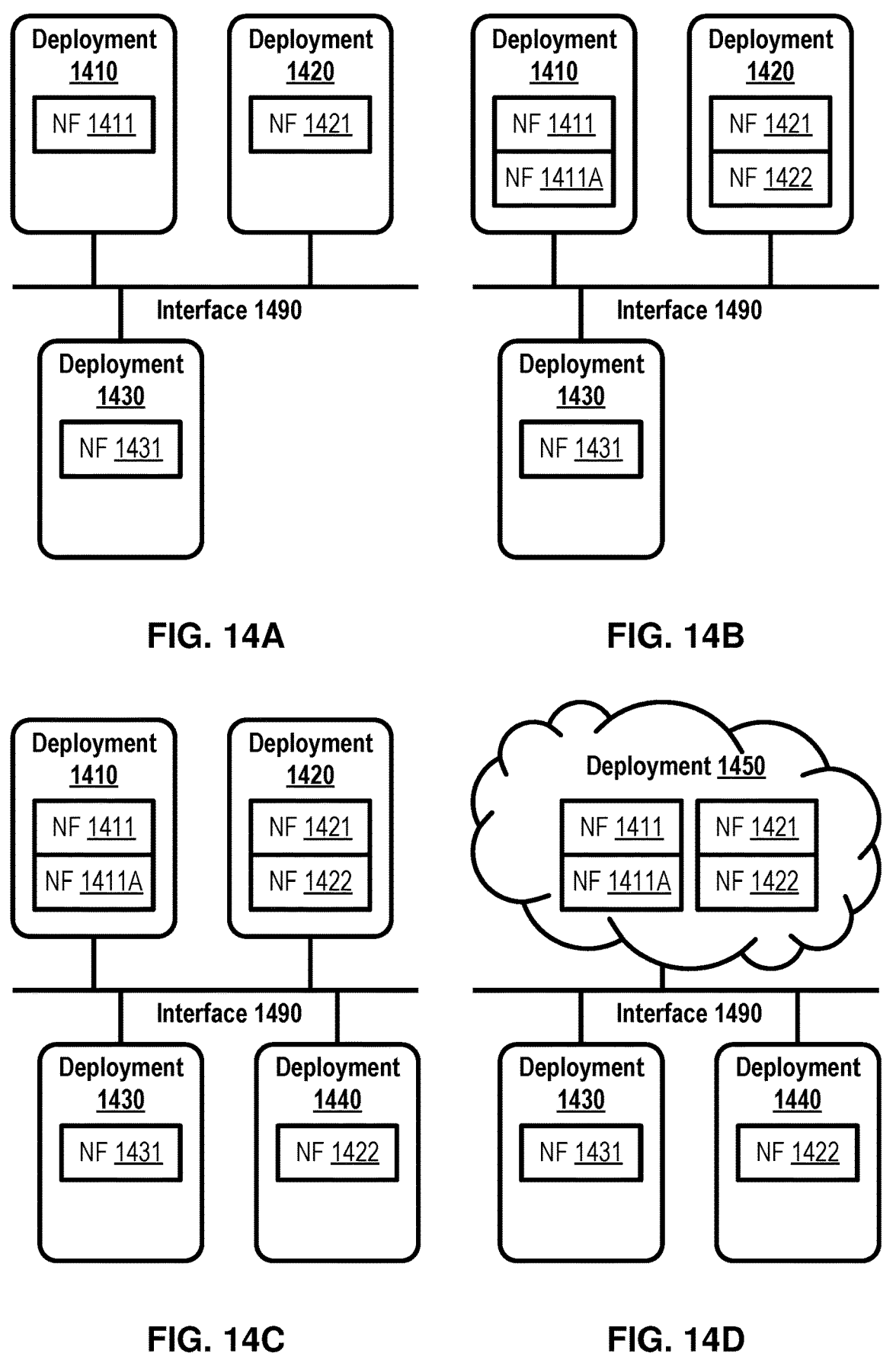

Deployment 1410

NF 1411

Deployment 1420

NF 1421

Interface 1490

Deployment 1430

Deployment 1410

NF 1411

NF 1411A

Deployment 1420

NF 1421

NF 1422

Interface 1490

Deployment 1430

Deployment 1410

NF 1411

NF 1411A

Deployment 1420

NF 1421

NF 1422

Interface 1490

Deployment 1430

NF 1431

Deployment 1440

Deployment 1450

NF 1411

NF 1411A

NF 1421

NF 1422

Interface 1490

Deployment 1430

NF 1431

Deployment 1440

NETWORK SLICE MANAGEMENT BASED ON INACTIVITY

CROSS-REFERENCE TO RELATED APPLICATIONS

This application is a continuation of International Application No. PCT/US2023/015372, filed Mar. 16, 2023, which claims the benefit of U.S. Provisional Application No. 63/320,911, filed Mar. 17, 2022, all of which are hereby incorporated by reference in their entireties.

BRIEF DESCRIPTION OF THE DRAWINGS

Examples of several of the various embodiments of the present disclosure are described herein with reference to the drawings.

FIG. 7A, FIG. 7B, and FIG. 7C illustrate a user plane protocol stack, a control plane protocol stack, and services provided between protocol layers of the user plane protocol stack.

FIG. 14A, FIG. 14B, FIG. 14C, and FIG. 14D illustrate various examples of physical core network deployments, each having one or more network functions or portions thereof.

DETAILED DESCRIPTION

Figures 1A, 1B:
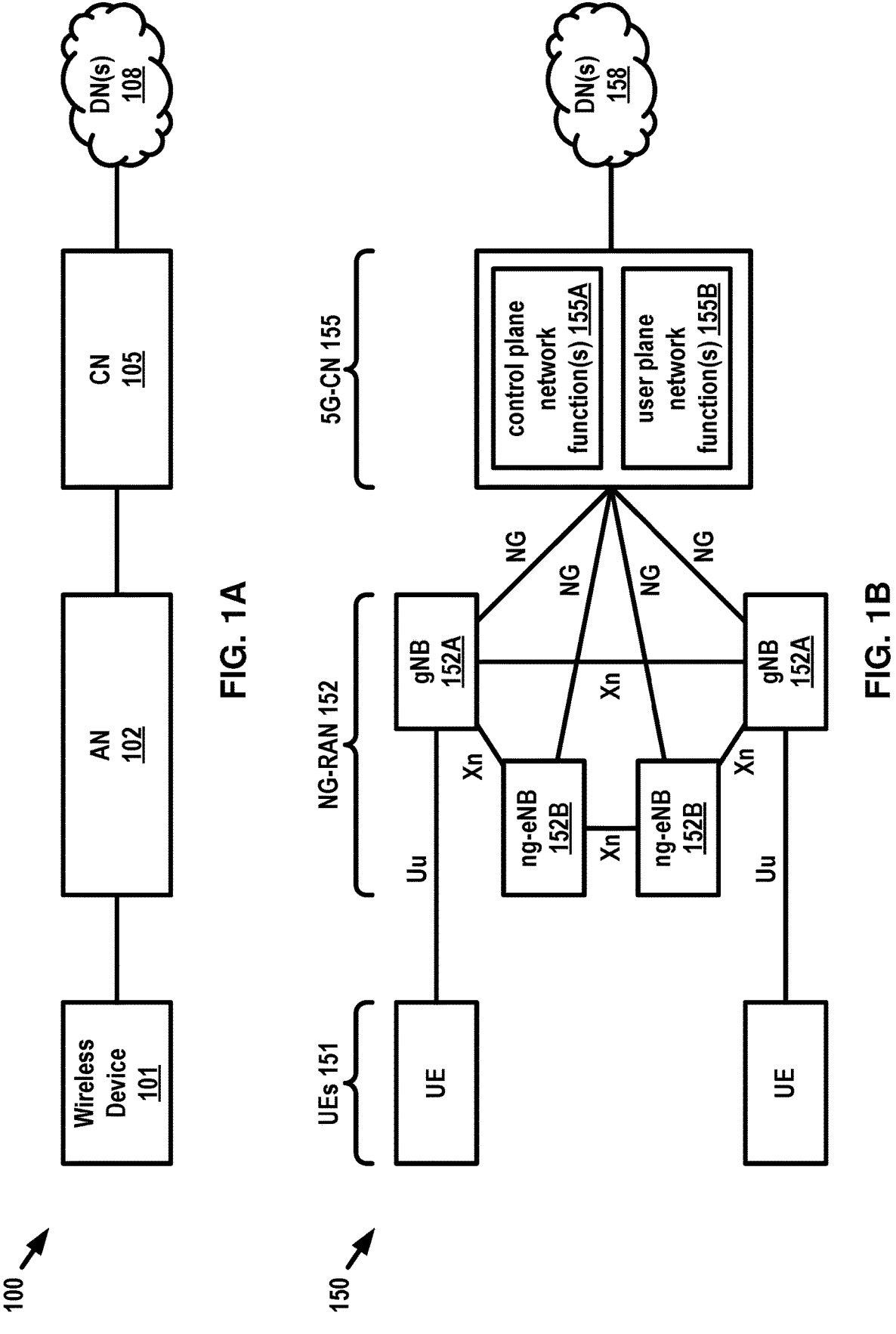
FIG. 1A and FIG. 1B illustrate example communication networks including an access network and a core network.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have one or more specific capabilities. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases refer to a single instance of a particular element, but should not be interpreted to exclude other instances of that element. For example, a bicycle with two wheels may be described as having "a wheel". Any term that ends with the suffix "(s)" is to be interpreted as "at least one" and/or "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described.

The phrases "based on", "in response to", "depending on", "employing", "using", and similar phrases indicate the presence and/or influence of a particular factor and/or condition on an event and/or action, but do not exclude unenumerated factors and/or conditions from also being present and/or influencing the event and/or action. For example, if action X is performed "based on" condition Y, this is to be interpreted as the action being performed "based at least on" condition Y. For example, if the performance of action X is performed when conditions Y and Z are both satisfied, then the performing of action X may be described as being "based on Y".

The term "configured" may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, a parameter may comprise one or more information objects, and an information object may comprise one or more other objects. For example, if parameter J comprises parameter K, and parameter K comprises parameter L, and parameter L comprises parameter M, then J comprises L, and J comprises M. A parameter may be referred to as a field or information element. In an example embodiment, when one or more messages comprise a plurality of parameters, it implies that a parameter in the plurality of parameters is in at least one of the one or more messages, but does not have to be in each of the one or more messages.

This disclosure may refer to possible combinations of enumerated elements. For the sake of brevity and legibility, the present disclosure does not explicitly recite each and every permutation that may be obtained by choosing from a set of optional features. The present disclosure is to be interpreted as explicitly disclosing all such permutations. For example, the seven possible combinations of enumerated elements A, B, C consist of: (1) "A"; (2) "B"; (3) "C"; (4) "A and B"; (5) "A and C"; (6) "B and C"; and (7) "A, B, and C". For the sake of brevity and legibility, these seven possible combinations may be described using any of the following interchangeable formulations: "at least one of A, B, and C"; "at least one of A, B, or C"; "one or more of A, B, and C"; "one or more of A, B, or C"; "A, B, and/or C". It will be understood that impossible combinations are excluded. For example, "X and/or not-X" should be interpreted as "X or not-X". It will be further understood that these formulations may describe alternative phrasings of overlapping and/or synonymous concepts, for example, "identifier, identification, and/or ID number".

This disclosure may refer to sets and/or subsets. As an example, set X may be a set of elements comprising one or more elements. If every element of X is also an element of Y, then X may be referred to as a subset of Y. In this disclosure, only non-empty sets and subsets are considered. For example, if Y consists of the elements Y1, Y2, and Y3, then the possible subsets of Y are {Y1, Y2, Y3}, {Y1, Y2}, {Y1, Y3}, {Y2, Y3}, {Y1}, {Y2}, and {Y3}.

FIG. 1A illustrates an example of a communication network 100 in which embodiments of the present disclosure may be implemented. The communication network 100 may comprise, for example, a public land mobile network (PLMN) run by a network operator. As illustrated in FIG. 1A, the communication network 100 includes a wireless device 101, an access network (AN) 102, a core network (CN) 105, and one or more data network (DNs) 108.

The wireless device 101 may communicate with DNs 108 via AN 102 and CN 105. In the present disclosure, the term wireless device may refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, unmanned aerial vehicle, urban air mobility, and/or any combination thereof. The term wireless device encompasses other terminology, including user equipment (UE), user terminal (UT), access terminal (AT), mobile station, handset, wireless transmit and receive unit (WTRU), and/or wireless communication device.

The AN 102 may connect wireless device 101 to CN 105 in any suitable manner. The communication direction from the AN 102 to the wireless device 101 is known as the downlink and the communication direction from the wireless device 101 to AN 102 is known as the uplink. Downlink transmissions may be separated from uplink transmissions using frequency division duplexing (FDD), time-division duplexing (TDD), and/or some combination of the two duplexing techniques. The AN 102 may connect to wireless device 101 through radio communications over an air interface. An access network that at least partially operates over the air interface may be referred to as a radio access network (RAN). The CN 105 may set up one or more end-to-end connection between wireless device 101 and the one or more DNs 108. The CN 105 may authenticate wireless device 101 and provide charging functionality.

In the present disclosure, the term base station may refer to and encompass any element of AN 102 that facilitates communication between wireless device 101 and AN 102. Access networks and base stations have many different names and implementations. The base station may be a terrestrial base station fixed to the earth. The base station may be a mobile base station with a moving coverage area. The base station may be in space, for example, on board a satellite. For example, WiFi and other standards may use the term access point. As another example, the Third-Generation Partnership Project (3GPP) has produced specifications for three generations of mobile networks, each of which uses different terminology. Third Generation (3G) and/or Universal Mobile Telecommunications System (UMTS) standards may use the term Node B. 4G, Long Term Evolution (LTE), and/or Evolved Universal Terrestrial Radio Access (E-UTRA) standards may use the term Evolved Node B (eNB). 5G and/or New Radio (NR) standards may describe AN 102 as a next-generation radio access network (NG-RAN) and may refer to base stations as Next Generation eNB (ng-eNB) and/or Generation Node B (gNB). Future standards (for example, 6G, 7G, 8G) may use new terminology to refer to the elements which implement the methods described in the present disclosure (e.g., wireless devices, base stations, ANs, CNs, and/or components thereof). A base station may be implemented as a repeater or relay node used to extend the coverage area of a donor node. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The AN 102 may include one or more base stations, each having one or more coverage areas. The geographical size and/or extent of a coverage area may be defined in terms of a range at which a receiver of AN 102 can successfully receive transmissions from a transmitter (e.g., wireless device 101) operating within the coverage area (and/or vice-versa). The coverage areas may be referred to as sectors or cells (although in some contexts, the term cell refers to the carrier frequency used in a particular coverage area, rather than the coverage area itself). Base stations with large coverage areas may be referred to as macrocell base stations. Other base stations cover smaller areas, for example, to provide coverage in areas with weak macrocell coverage, or to provide additional coverage in areas with high traffic (sometimes referred to as hotspots). Examples of small cell base stations include, in order of decreasing coverage area, microcell base stations, picocell base stations, and femtocell base stations or home base stations. Together, the coverage areas of the base stations may provide radio coverage to wireless device 101 over a wide geographic area to support wireless device mobility.

A base station may include one or more sets of antennas for communicating with the wireless device 101 over the air interface. Each set of antennas may be separately controlled by the base station. Each set of antennas may have a corresponding coverage area. As an example, a base station may include three sets of antennas to respectively control three coverage areas on three different sides of the base station. The entirety of the base station (and its corresponding antennas) may be deployed at a single location. Alternatively, a controller at a central location may control one or more sets of antennas at one or more distributed locations. The controller may be, for example, a baseband processing unit that is part of a centralized or cloud RAN architecture. The baseband processing unit may be either centralized in a pool of baseband processing units or virtualized. A set of antennas at a distributed location may be referred to as a remote radio head (RRH).

FIG. 1B illustrates another example communication network 150 in which embodiments of the present disclosure may be implemented. The communication network 150 may comprise, for example, a PLMN run by a network operator. As illustrated in FIG. 1B, communication network 150 includes UEs 151, a next generation radio access network (NG-RAN) 152, a 5G core network (5G-CN) 155, and one or more DNs 158. The NG-RAN 152 includes one or more base stations, illustrated as generation node Bs (gNBs) 152A and next generation evolved Node Bs (ng eNBs) 152B. The 5G-CN 155 includes one or more network functions (NFs), including control plane functions 155A and user plane functions 155B. The one or more DNs 158 may comprise public DNs (e.g., the Internet), private DNs, and/or intra-operator DNs. Relative to corresponding components illustrated in FIG. 1A, these components may represent specific implementations and/or terminology.

The base stations of the NG-RAN 152 may be connected to the UEs 151 via Uu interfaces. The base stations of the NG-RAN 152 may be connected to each other via Xn interfaces. The base stations of the NG-RAN 152 may be connected to 5G CN 155 via NG interfaces. The Uu interface may include an air interface. The NG and Xn interfaces may include an air interface, or may consist of direct physical connections and/or indirect connections over an underlying transport network (e.g., an internet protocol (IP) transport network).

Each of the Uu, Xn, and NG interfaces may be associated with a protocol stack. The protocol stacks may include a user plane (UP) and a control plane (CP). Generally, user plane data may include data pertaining to users of the UEs 151, for example, internet content downloaded via a web browser application, sensor data uploaded via a tracking application, or email data communicated to or from an email server. Control plane data, by contrast, may comprise signaling and messages that facilitate packaging and routing of user plane data so that it can be exchanged with the DN(s). The NG interface, for example, may be divided into an NG user plane interface (NG-U) and an NG control plane interface (NG-C). The NG-U interface may provide delivery of user plane data between the base stations and the one or more user plane network functions 155B. The NG-C interface may be used for control signaling between the base stations and the one or more control plane network functions 155A. The NG-C interface may provide, for example, NG interface management, UE context management, UE mobility management, transport of NAS messages, paging, PDU session management, and configuration transfer and/or warning message transmission. In some cases, the NG-C interface may support transmission of user data (for example, a small data transmission for an IoT device).

One or more of the base stations of the NG-RAN 152 may be split into a central unit (CU) and one or more distributed units (DUs). A CU may be coupled to one or more DUs via an F1 interface. The CU may handle one or more upper layers in the protocol stack and the DU may handle one or more lower layers in the protocol stack. For example, the CU may handle RRC, PDCP, and SDAP, and the DU may handle RLC, MAC, and PHY. The one or more DUs may be in geographically diverse locations relative to the CU and/or each other. Accordingly, the CU/DU split architecture may permit increased coverage and/or better coordination.

The gNBs 152A and ng-eNBs 152B may provide different user plane and control plane protocol termination towards the UEs 151. For example, the gNB 154A may provide new radio (NR) protocol terminations over a Uu interface associated with a first protocol stack. The ng-eNBs 152B may provide Evolved UMTS Terrestrial Radio Access (E-UTRA) protocol terminations over a Uu interface associated with a second protocol stack.

The 5G-CN 155 may authenticate UEs 151, set up end-to-end connections between UEs 151 and the one or more DNs 158, and provide charging functionality. The 5G-CN 155 may be based on a service-based architecture, in which the NFs making up the 5G-CN 155 offer services to each other and to other elements of the communication network 150 via interfaces. The 5G-CN 155 may include any number of other NFs and any number of instances of each NF.

FIG. 2A, FIG. 2B, FIG. 2C, and FIG. 2D illustrate various examples of a framework for a service-based architecture within a core network. In a service-based architecture, a service may be sought by a service consumer and provided by a service producer. Prior to obtaining a particular service, an NF may determine where such as service can be obtained. To discover a service, the NF may communicate with a network repository function (NRF). As an example, an NF that provides one or more services may register with a network repository function (NRF). The NRF may store data relating to the one or more services that the NF is prepared to provide to other NFs in the service-based architecture. A consumer NF may query the NRF to discover a producer NF (for example, by obtaining from the NRF a list of NF instances that provide a particular service).

Figures 2A, 2B:
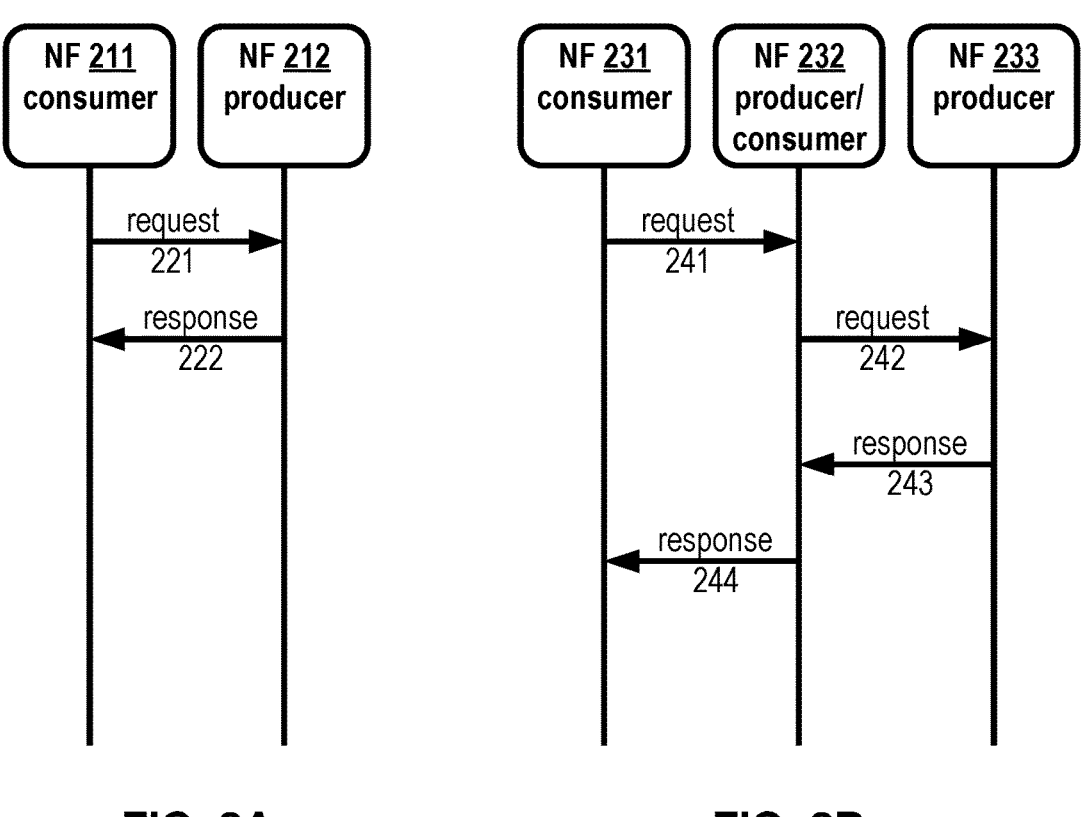
FIG. 2A, FIG. 2B, FIG. 2C, and FIG. 2D illustrate various examples of a framework for a service-based architecture within a core network.

In the example of FIG. 2A, an NF 211 (a consumer NF in this example) may send a request 221 to an NF 212 (a producer NF). The request 221 may be a request for a particular service and may be sent based on a discovery that NF 212 is a producer of that service. The request 221 may comprise data relating to NF 211 and/or the requested service. The NF 212 may receive request 221, perform one or more actions associated with the requested service (e.g., retrieving data), and provide a response 221. The one or more actions performed by the NF 212 may be based on request data included in the request 221, data stored by NF 212, and/or data retrieved by NF 212. The response 222 may notify NF 211 that the one or more actions have been completed. The response 222 may comprise response data relating to NF 212, the one or more actions, and/or the requested service.

In the example of FIG. 2B, an NF 231 sends a request 241 to an NF 232. In this example, part of the service produced by NF 232 is to send a request 242 to an NF 233. The NF 233 may perform one or more actions and provide a response 243 to NF 232. Based on response 243, NF 232 may send a response 244 to NF 231. It will be understood from FIG. 2B that a single NF may perform the role of producer of services, consumer of services, or both. A particular NF service may include any number of nested NF services produced by one or more other NFs.

Figures 2C, 2D:
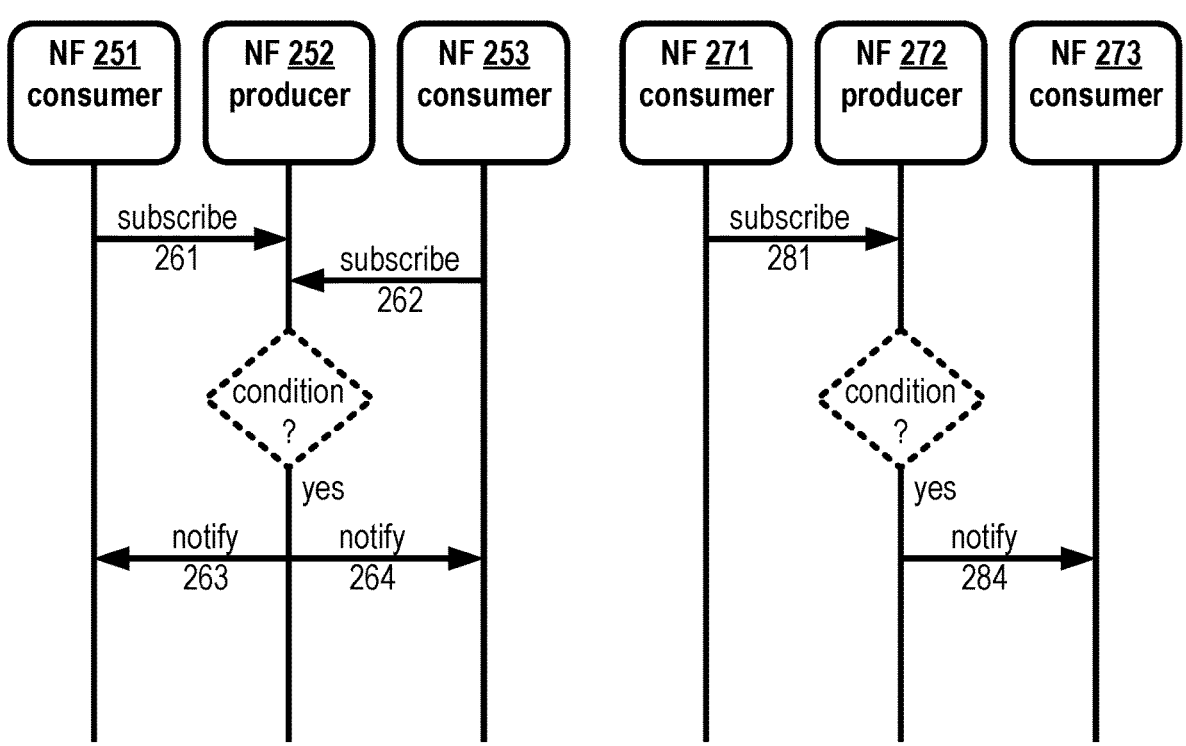

FIG. 2C illustrates examples of subscribe-notify interactions between a consumer NF and a producer NF. In FIG. 2C, an NF 251 sends a subscription 261 to an NF 252. An NF 253 sends a subscription 262 to the NF 252. Two NFs are shown in FIG. 2C for illustrative purposes (to demonstrate that the NF 252 may provide multiple subscription services to different NFs), but it will be understood that a subscribe-notify interaction only requires one subscriber. The NFs 251, 253 may be independent from one another. For example, the NFs 251, 253 may independently discover NF 252 and/or independently determine to subscribe to the service offered by NF 252. In response to receipt of a subscription, the NF 252 may provide a notification to the subscribing NF. For example, NF 252 may send a notification 263 to NF 251 based on subscription 261 and may send a notification 264 to NF 253 based on subscription 262.

As shown in the example illustration of FIG. 2C, the sending of the notifications 263, 264 may be based on a determination that a condition has occurred. For example, the notifications 263, 264 may be based on a determination that a particular event has occurred, a determination that a particular condition is outstanding, and/or a determination that a duration of time associated with the subscription has elapsed (for example, a period associated with a subscription for periodic notifications). As shown in the example illustration of FIG. 2C, NF 252 may send notifications 263, 264 to NFs 251, 253 simultaneously and/or in response to the same condition. However, it will be understood that the NF 252 may provide notifications at different times and/or in response to different notification conditions. In an example, the NF 251 may request a notification when a certain parameter, as measured by the NF 252, exceeds a first threshold, and the NF 252 may request a notification when the parameter exceeds a second threshold different from the first threshold. In an example, a parameter of interest and/or a corresponding threshold may be indicated in the subscriptions 261, 262.

FIG. 2D illustrates another example of a subscribe-notify interaction. In FIG. 2D, an NF 271 sends a subscription 281 to an NF 272. In response to receipt of subscription 281 and/or a determination that a notification condition has occurred, NF 272 may send a notification 284. The notification 284 may be sent to an NF 273. Unlike the example in FIG. 2C (in which a notification is sent to the subscribing NF), FIG. 2D demonstrates that a subscription and its corresponding notification may be associated with different NFs. For example, NF 271 may subscribe to the service provided by NF 272 on behalf of NF 273.

Figure 3:
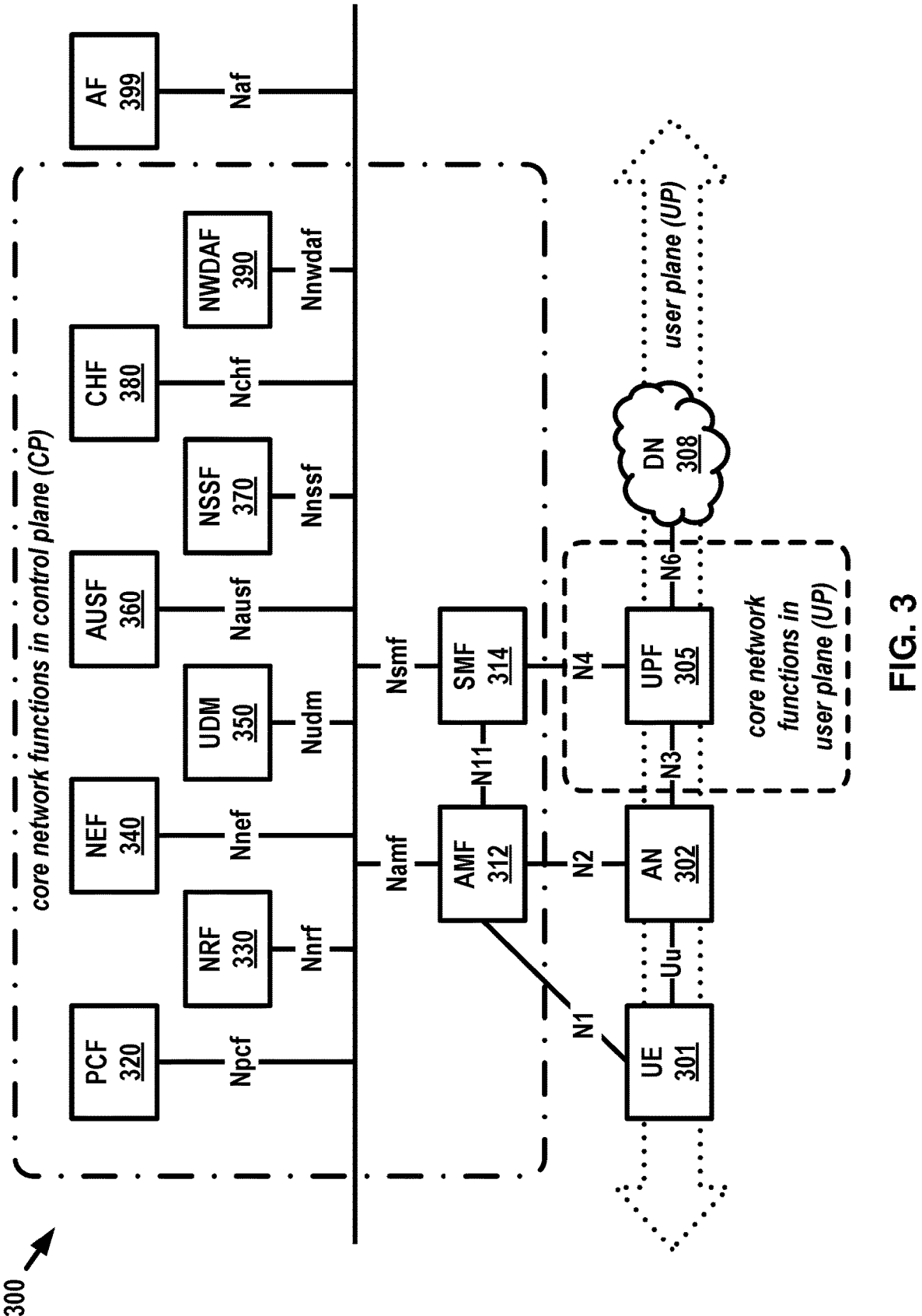
FIG. 3 illustrates an example communication network including core network functions.

FIG. 3 illustrates another example communication network 300 in which embodiments of the present disclosure may be implemented. Communication network 300 includes a user equipment (UE) 301, an access network (AN) 302, and a data network (DN) 308. The remaining elements depicted in FIG. 3 may be included in and/or associated with a core network. Each element of the core network may be referred to as a network function (NF).

The NFs depicted in FIG. 3 include a user plane function (UPF) 305, an access and mobility management function (AMF) 312, a session management function (SMF) 314, a policy control function (PCF) 320, a network repository function (NRF) 330, a network exposure function (NEF) 340, a unified data management (UDM) 350, an authentication server function (AUSF) 360, a network slice selection function (NSSF) 370, a charging function (CHF) 380, a network data analytics function (NWDAF) 390, and an application function (AF) 399. The UPF 305 may be a user-plane core network function, whereas the NFs 312, 314, and 320-390 may be control-plane core network functions. Although not shown in the example of FIG. 3, the core network may include additional instances of any of the NFs depicted and/or one or more different NF types that provide different services. Other examples of NF type include a gateway mobile location center (GMLC), a location management function (LMF), an operations, administration, and maintenance function (OAM), a public warning system (PWS), a short message service function (SMSF), a unified data repository (UDR), and an unstructured data storage function (UDSF).

Each element depicted in FIG. 3 has an interface with at least one other element. The interface may be a logical connection rather than, for example, a direct physical connection. Any interface may be identified using a reference point representation and/or a service-based representation. In a reference point representation, the letter 'N' is followed by a numeral, indicating an interface between two specific elements. For example, as shown in FIG. 3, AN 302 and UPF 305 interface via 'N3', whereas UPF 305 and DN 308 interface via 'N6'. By contrast, in a service-based representation, the letter 'N' is followed by letters. The letters identify an NF that provides services to the core network. For example, PCF 320 may provide services via interface 'Npcf'. The PCF 320 may provide services to any NF in the core network via 'Npcf'. Accordingly, a service-based representation may correspond to a bundle of reference point representations. For example, the Npcf interface between PCF 320 and the core network generally may correspond to an N7 interface between PCF 320 and SMF 314, an N30 interface between PCF 320 and NEF 340, etc.

The UPF 305 may serve as a gateway for user plane traffic between AN 302 and DN 308. The UE 301 may connect to UPF 305 via a Uu interface and an N3 interface (also described as NG-U interface). The UPF 305 may connect to DN 308 via an N6 interface. The UPF 305 may connect to one or more other UPFs (not shown) via an N9 interface. The UE 301 may be configured to receive services through a protocol data unit (PDU) session, which is a logical connection between UE 301 and DN 308. The UPF 305 (or a plurality of UPFs if desired) may be selected by SMF 314 to handle a particular PDU session between UE 301 and DN 308. The SMF 314 may control the functions of UPF 305 with respect to the PDU session. The SMF 314 may connect to UPF 305 via an N4 interface. The UPF 305 may handle any number of PDU sessions associated with any number of UEs (via any number of ANs). For purposes of handling the one or more PDU sessions, UPF 305 may be controlled by any number of SMFs via any number of corresponding N4 interfaces.

The AMF 312 depicted in FIG. 3 may control UE access to the core network. The UE 301 may register with the network via AMF 312. It may be necessary for UE 301 to register prior to establishing a PDU session. The AMF 312 may manage a registration area of UE 301, enabling the network to track the physical location of UE 301 within the network. For a UE in connected mode, AMF 312 may manage UE mobility, for example, handovers from one AN or portion thereof to another. For a UE in idle mode, AMF 312 may perform registration updates and/or page the UE to transition the UE to connected mode.

The AMF 312 may receive, from UE 301, non-access stratum (NAS) messages transmitted in accordance with NAS protocol. NAS messages relate to communications between UE 301 and the core network. Although NAS messages may be relayed to AMF 312 via AN 302, they may be described as communications via the N1 interface. NAS messages may facilitate UE registration and mobility management, for example, by authenticating, identifying, configuring, and/or managing a connection of UE 301. NAS messages may support session management procedures for maintaining user plane connectivity and quality of service (QoS) of a session between UE 301 and DN 309. If the NAS message involves session management, AMF 312 may send the NAS message to SMF 314. NAS messages may be used to transport messages between UE 301 and other components of the core network (e.g., core network components other than AMF 312 and SMF 314). The AMF 312 may act on a particular NAS message itself, or alternatively, forward the NAS message to an appropriate core network function (e.g., SMF 314, etc.)

The SMF 314 depicted in FIG. 3 may establish, modify, and/or release a PDU session based on messaging received UE 301. The SMF 314 may allocate, manage, and/or assign an IP address to UE 301, for example, upon establishment of a PDU session. There may be multiple SMFs in the network, each of which may be associated with a respective group of wireless devices, base stations, and/or UPFs. A UE with multiple PDU sessions may be associated with a different SMF for each PDU session. As noted above, SMF 314 may select one or more UPFs to handle a PDU session and may control the handling of the PDU session by the selected UPF by providing rules for packet handling (PDR, FAR, QER, etc.). Rules relating to QoS and/or charging for a particular PDU session may be obtained from PCF 320 and provided to UPF 305.

The PCF 320 may provide, to other NFs, services relating to policy rules. The PCF 320 may use subscription data and information about network conditions to determine policy rules and then provide the policy rules to a particular NF which may be responsible for enforcement of those rules. Policy rules may relate to policy control for access and mobility, and may be enforced by the AMF. Policy rules may relate to session management, and may be enforced by the SMF 314. Policy rules may be, for example, network-specific, wireless device-specific, session-specific, or data flow-specific.

The NRF 330 may provide service discovery. The NRF 330 may belong to a particular PLMN. The NRF 330 may maintain NF profiles relating to other NFs in the communication network 300. The NF profile may include, for example, an address, PLMN, and/or type of the NF, a slice identifier, a list of the one or more services provided by the NF, and the authorization required to access the services.

The NEF 340 depicted in FIG. 3 may provide an interface to external domains, permitting external domains to selectively access the control plane of the communication network 300. The external domain may comprise, for example, third-party network functions, application functions, etc. The NEF 340 may act as a proxy between external elements and network functions such as AMF 312, SMF 314, PCF 320, UDM 350, etc. As an example, NEF 340 may determine a location or reachability status of UE 301 based on reports from AMF 312, and provide status information to an external element. As an example, an external element may provide, via NEF 340, information that facilitates the setting of parameters for establishment of a PDU session. The NEF 340 may determine which data and capabilities of the control plane are exposed to the external domain. The NEF 340 may provide secure exposure that authenticates and/or authorizes an external entity to which data or capabilities of the communication network 300 are exposed. The NEF 340 may selectively control the exposure such that the internal architecture of the core network is hidden from the external domain.

The UDM 350 may provide data storage for other NFs. The UDM 350 may permit a consolidated view of network information that may be used to ensure that the most relevant information can be made available to different NFs from a single resource. The UDM 350 may store and/or retrieve information from a unified data repository (UDR). For example, UDM 350 may obtain user subscription data relating to UE 301 from the UDR.

The AUSF 360 may support mutual authentication of UE 301 by the core network and authentication of the core network by UE 301. The AUSF 360 may perform key agreement procedures and provide keying material that can be used to improve security.

The NSSF 370 may select one or more network slices to be used by the UE 301. The NSSF 370 may select a slice based on slice selection information. For example, the NSSF 370 may receive Single Network Slice Selection Assistance Information (S-NSSAI) and map the S-NSSAI to a network slice instance identifier (NSI).

The CHF 380 may control billing-related tasks associated with UE 301. For example, UPF 305 may report traffic usage associated with UE 301 to SMF 314. The SMF 314 may collect usage data from UPF 305 and one or more other UPFs. The usage data may indicate how much data is exchanged, what DN the data is exchanged with, a network slice associated with the data, or any other information that may influence billing. The SMF 314 may share the collected usage data with the CHF. The CHF may use the collected usage data to perform billing-related tasks associated with UE 301. The CHF may, depending on the billing status of UE 301, instruct SMF 314 to limit or influence access of UE 301 and/or to provide billing-related notifications to UE 301.

The NWDAF 390 may collect and analyze data from other network functions and offer data analysis services to other network functions. As an example, NWDAF 390 may collect data relating to a load level for a particular network slice instance from UPF 305, AMF 312, and/or SMF 314. Based on the collected data, NWDAF 390 may provide load level data to the PCF 320 and/or NSSF 370, and/or notify the PC 220 and/or NSSF 370 if load level for a slice reaches and/or exceeds a load level threshold.

The AF 399 may be outside the core network, but may interact with the core network to provide information relating to the QoS requirements or traffic routing preferences associated with a particular application. The AF 399 may access the core network based on the exposure constraints imposed by the NEF 340. However, an operator of the core network may consider the AF 399 to be a trusted domain that can access the network directly.

Figure 4A:
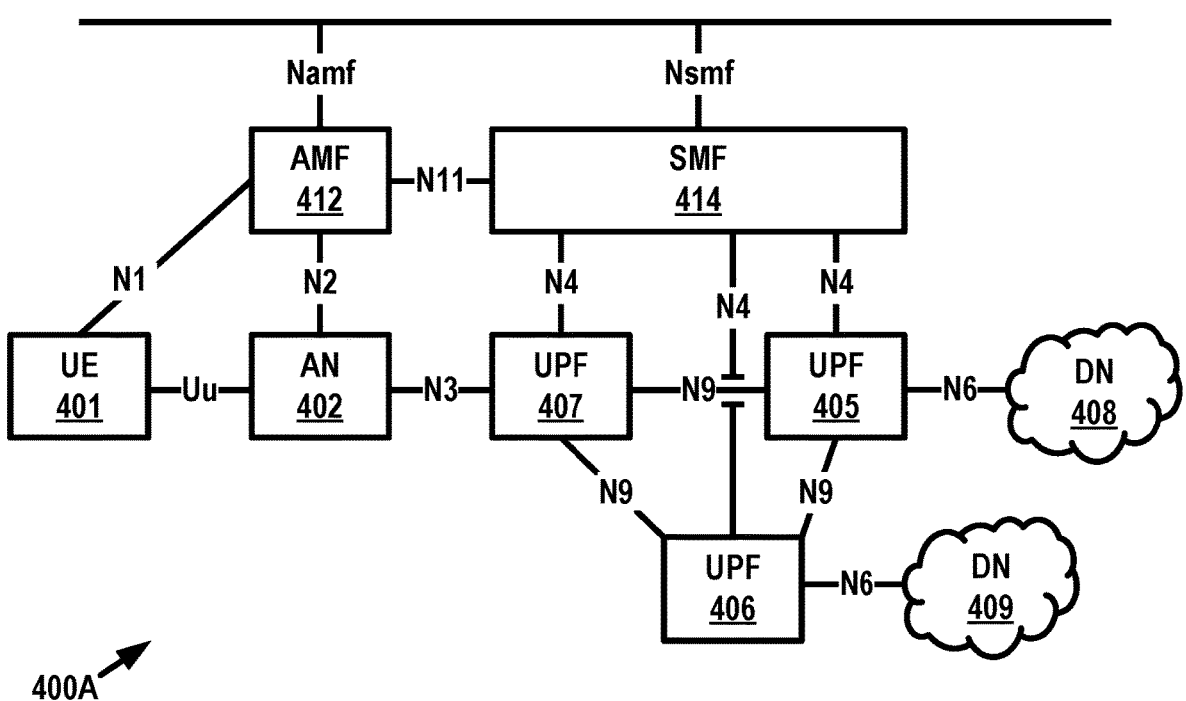
FIG. 4A and FIG. 4B illustrate example of core network architecture with multiple user plane functions and untrusted access.
Figure 4B:
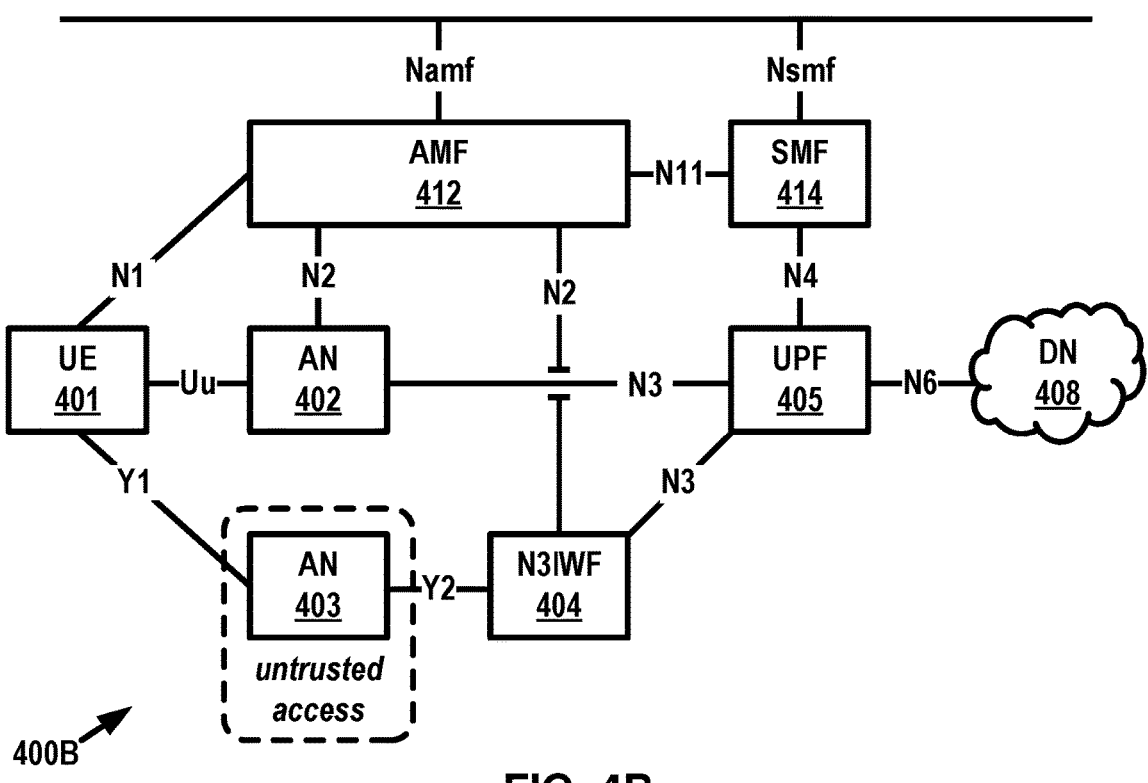
Figure 5:
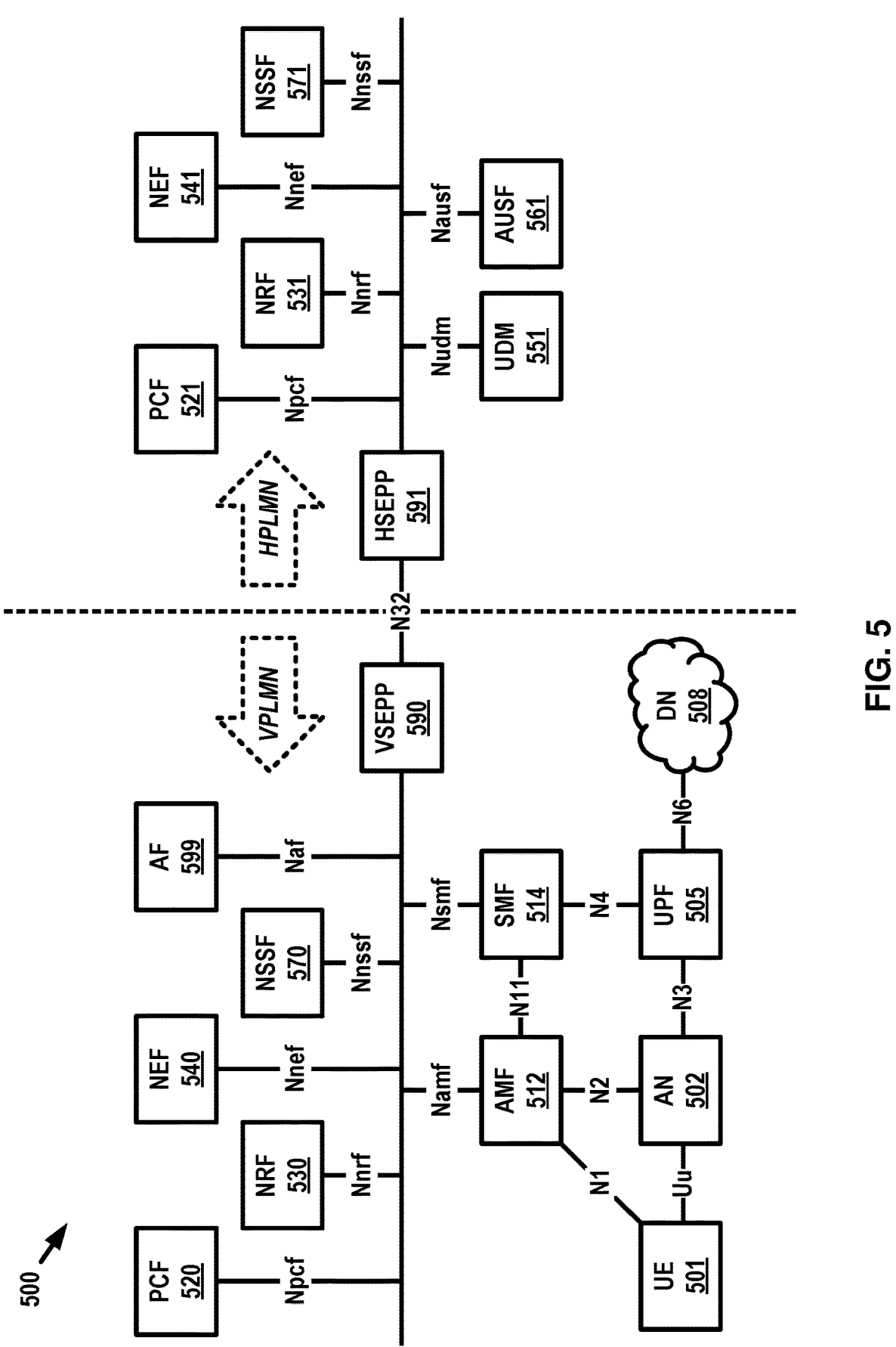
FIG. 5 illustrates an example of a core network architecture for a roaming scenario.

FIGS. 4A, 4B, and 5 illustrate other examples of core network architectures that are analogous in some respects to the core network architecture 300 depicted in FIG. 3. For conciseness, some of the core network elements depicted in FIG. 3 are omitted. Many of the elements depicted in FIGS. 4A, 4B, and 5 are analogous in some respects to elements depicted in FIG. 3. For conciseness, some of the details relating to their functions or operation are omitted.

FIG. 4A illustrates an example of a core network architecture 400A comprising an arrangement of multiple UPFs. Core network architecture 400A includes a UE 401, an AN 402, an AMF 412, and an SMF 414. Unlike previous examples of core network architectures described above, FIG. 4A depicts multiple UPFs, including a UPF 405, a UPF 406, and a UPF 407, and multiple DNs, including a DN 408 and a DN 409. Each of the multiple UPFs 405, 406, 407 may communicate with the SMF 414 via an N4 interface. The DNs 408, 409 communicate with the UPFs 405, 406, respectively, via N6 interfaces. As shown in FIG. 4A, the multiple UPFs 405, 406, 407 may communicate with one another via N9 interfaces.

The UPFs 405, 406, 407 may perform traffic detection, in which the UPFs identify and/or classify packets. Packet identification may be performed based on packet detection rules (PDR) provided by the SMF 414. A PDR may include packet detection information comprising one or more of: a source interface, a UE IP address, core network (CN) tunnel information (e.g., a CN address of an N3/N9 tunnel corresponding to a PDU session), a network instance identifier, a quality of service flow identifier (QFI), a filter set (for example, an IP packet filter set or an ethernet packet filter set), and/or an application identifier.

In addition to indicating how a particular packet is to be detected, a PDR may further indicate rules for handling the packet upon detection thereof. The rules may include, for example, forwarding action rules (FARs), multi-access rules (MARs), usage reporting rules (URRs), QoS enforcement rules (QERs), etc. For example, the PDR may comprise one or more FAR identifiers, MAR identifiers, URR identifiers, and/or QER identifiers. These identifiers may indicate the rules that are prescribed for the handling of a particular detected packet.

The UPF 405 may perform traffic forwarding in accordance with a FAR. For example, the FAR may indicate that a packet associated with a particular PDR is to be forwarded, duplicated, dropped, and/or buffered. The FAR may indicate a destination interface, for example, "access" for downlink or "core" for uplink. If a packet is to be buffered, the FAR may indicate a buffering action rule (BAR). As an example, UPF 405 may perform data buffering of a certain number downlink packets if a PDU session is deactivated.

The UPF 405 may perform QoS enforcement in accordance with a QER. For example, the QER may indicate a guaranteed bitrate that is authorized and/or a maximum bitrate to be enforced for a packet associated with a particular PDR. The QER may indicate that a particular guaranteed and/or maximum bitrate may be for uplink packets and/or downlink packets. The UPF 405 may mark packets belonging to a particular QoS flow with a corresponding QFI. The marking may enable a recipient of the packet to determine a QoS of the packet.

The UPF 405 may provide usage reports to the SMF 414 in accordance with a URR. The URR may indicate one or more triggering conditions for generation and reporting of the usage report, for example, immediate reporting, periodic reporting, a threshold for incoming uplink traffic, or any other suitable triggering condition. The URR may indicate a method for measuring usage of network resources, for example, data volume, duration, and/or event.

As noted above, the DNs 408, 409 may comprise public DNs (e.g., the Internet), private DNs (e.g., private, internal corporate-owned DNs), and/or intra-operator DNs. Each DN may provide an operator service and/or a third-party service. The service provided by a DN may be the Internet, an IP multimedia subsystem (IMS), an augmented or virtual reality network, an edge computing or mobile edge computing (MEC) network, etc. Each DN may be identified using a data network name (DNN). The UE 401 may be configured to establish a first logical connection with DN 408 (a first PDU session), a second logical connection with DN 409 (a second PDU session), or both simultaneously (first and second PDU sessions).

Each PDU session may be associated with at least one UPF configured to operate as a PDU session anchor (PSA, or "anchor"). The anchor may be a UPF that provides an N6 interface with a DN.

In the example of FIG. 4A, UPF 405 may be the anchor for the first PDU session between UE 401 and DN 408, whereas the UPF 406 may be the anchor for the second PDU session between UE 401 and DN 409. The core network may use the anchor to provide service continuity of a particular PDU session (for example, IP address continuity) as UE 401 moves from one access network to another. For example, suppose that UE 401 establishes a PDU session using a data path to the DN 408 using an access network other than AN 402. The data path may include UPF 405 acting as anchor. Suppose further that the UE 401 later moves into the coverage area of the AN 402. In such a scenario, SMF 414 may select a new UPF (UPF 407) to bridge the gap between the newly-entered access network (AN 402) and the anchor UPF (UPF 405). The continuity of the PDU session may be preserved as any number of UPFs are added or removed from the data path. When a UPF is added to a data path, as shown in FIG. 4A, it may be described as an intermediate UPF and/or a cascaded UPF.

As noted above, UPF 406 may be the anchor for the second PDU session between UE 401 and DN 409. Although the anchor for the first and second PDU sessions are associated with different UPFs in FIG. 4A, it will be understood that this is merely an example. It will also be understood that multiple PDU sessions with a single DN may correspond to any number of anchors. When there are multiple UPFs, a UPF at the branching point (UPF 407 in FIG. 4) may operate as an uplink classifier (UL-CL). The UL-CL may divert uplink user plane traffic to different UPFs.

The SMF 414 may allocate, manage, and/or assign an IP address to UE 401, for example, upon establishment of a PDU session. The SMF 414 may maintain an internal pool of IP addresses to be assigned. The SMF 414 may, if necessary, assign an IP address provided by a dynamic host configuration protocol (DHCP) server or an authentication, authorization, and accounting (AAA) server. IP address management may be performed in accordance with a session and service continuity (SSC) mode. In SSC mode 1, an IP address of UE 401 may be maintained (and the same anchor UPF may be used) as the wireless device moves within the network. In SSC mode 2, the IP address of UE 401 changes as UE 401 moves within the network (e.g., the old IP address and UPF may be abandoned and a new IP address and anchor UPF may be established). In SSC mode 3, it may be possible to maintain an old IP address (similar to SSC mode 1) temporarily while establishing a new IP address (similar to SSC mode 2), thus combining features of SSC modes 1 and 2. Applications that are sensitive to IP address changes may operate in accordance with SSC mode 1.

UPF selection may be controlled by SMF 414. For example, upon establishment and/or modification of a PDU session between UE 401 and DN 408, SMF 414 may select UPF 405 as the anchor for the PDU session and/or UPF 407 as an intermediate UPF. Criteria for UPF selection include path efficiency and/or speed between AN 402 and DN 408. The reliability, load status, location, slice support and/or other capabilities of candidate UPFs may also be considered.

FIG. 4B illustrates an example of a core network architecture 400B that accommodates untrusted access. Similar to FIG. 4A, UE 401 as depicted in FIG. 4B connects to DN 408 via AN 402 and UPF 405. The AN 402 and UPF 405 constitute trusted (e.g., 3GPP) access to the DN 408. By contrast, UE 401 may also access DN 408 using an untrusted access network, AN 403, and a non-3GPP interworking function (N3IWF) 404.

The AN 403 may be, for example, a wireless land area network (WLAN) operating in accordance with the IEEE 802.11 standard. The UE 401 may connect to AN 403, via an interface Y1, in whatever manner is prescribed for AN 403. The connection to AN 403 may or may not involve authentication. The UE 401 may obtain an IP address from AN 403. The UE 401 may determine to connect to core network 400B and select untrusted access for that purpose. The AN 403 may communicate with N3IWF 404 via a Y2 interface. After selecting untrusted access, the UE 401 may provide N3IWF 404 with sufficient information to select an AMF. The selected AMF may be, for example, the same AMF that is used by UE 401 for 3GPP access (AMF 412 in the present example). The N3IWF 404 may communicate with AMF 412 via an N2 interface. The UPF 405 may be selected and N3IWF 404 may communicate with UPF 405 via an N3 interface. The UPF 405 may be a PDU session anchor (PSA) and may remain the anchor for the PDU session even as UE 401 shifts between trusted access and untrusted access.

FIG. 5 illustrates an example of a core network architecture 500 in which a UE 501 is in a roaming scenario. In a roaming scenario, UE 501 is a subscriber of a first PLMN (a home PLMN, or HPLMN) but attaches to a second PLMN (a visited PLMN, or VPLMN). Core network architecture 500 includes UE 501, an AN 502, a UPF 505, and a DN 508. The AN 502 and UPF 505 may be associated with a VPLMN. The VPLMN may manage the AN 502 and UPF 505 using core network elements associated with the VPLMN, including an AMF 512, an SMF 514, a PCF 520, an NRF 530, an NEF 540, and an NSSF 570. An AF 599 may be adjacent the core network of the VPLMN.

The UE 501 may not be a subscriber of the VPLMN. The AMF 512 may authorize UE 501 to access the network based on, for example, roaming restrictions that apply to UE 501. In order to obtain network services provided by the VPLMN, it may be necessary for the core network of the VPLMN to interact with core network elements of a HPLMN of UE 501, in particular, a PCF 521, an NRF 531, an NEF 541, a UDM 551, and/or an AUSF 561. The VPLMN and HPLMN may communicate using an N32 interface connecting respective security edge protection proxies (SEPPs). In FIG. 5, the respective SEPPs are depicted as a VSEPP 590 and an HSEPP 591.

The VSEPP 590 and the HSEPP 591 communicate via an N32 interface for defined purposes while concealing information about each PLMN from the other. The SEPPs may apply roaming policies based on communications via the N32 interface. The PCF 520 and PCF 521 may communicate via the SEPPs to exchange policy-related signaling. The NRF 530 and NRF 531 may communicate via the SEPPs to enable service discovery of NFs in the respective PLMNs. The VPLMN and HPLMN may independently maintain NEF 540 and NEF 541. The NSSF 570 and NSSF 571 may communicate via the SEPPs to coordinate slice selection for UE 501. The HPLMN may handle all authentication and subscription related signaling. For example, when the UE 501 registers or requests service via the VPLMN, the VPLMN may authenticate UE 501 and/or obtain subscription data of UE 501 by accessing, via the SEPPs, the UDM 551 and AUSF 561 of the HPLMN.

The core network architecture 500 depicted in FIG. 5 may be referred to as a local breakout configuration, in which UE 501 accesses DN 508 using one or more UPFs of the VPLMN (i.e., UPF 505). However, other configurations are possible. For example, in a home-routed configuration (not shown in FIG. 5), UE 501 may access a DN using one or more UPFs of the HPLMN. In the home-routed configuration, an N9 interface may run parallel to the N32 interface, crossing the frontier between the VPLMN and the HPLMN to carry user plane data. One or more SMFs of the respective PLMNs may communicate via the N32 interface to coordinate session management for UE 501. The SMFs may control their respective UPFs on either side of the frontier.

Figure 6:
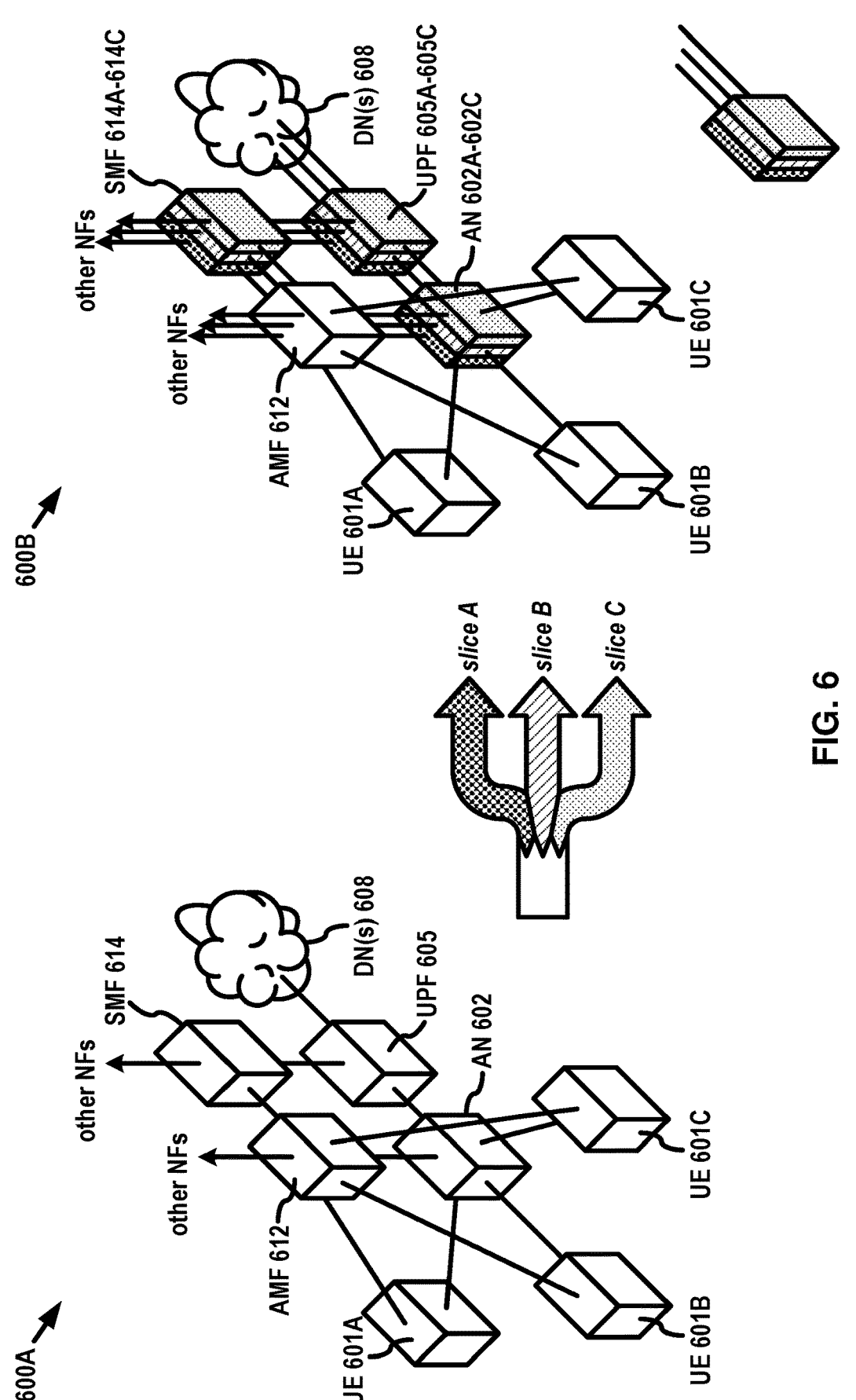
FIG. 6 illustrates an example of network slicing.

FIG. 6 illustrates an example of network slicing. Network slicing may refer to division of shared infrastructure (e.g., physical infrastructure) into distinct logical networks. These distinct logical networks may be independently controlled, isolated from one another, and/or associated with dedicated resources.

Network architecture 600A illustrates an un-sliced physical network corresponding to a single logical network. The network architecture 600A comprises a user plane wherein UEs 601A, 601B, 601C (collectively, UEs 601) have a physical and logical connection to a DN 608 via an AN 602 and a UPF 605. The network architecture 600A comprises a control plane wherein an AMF 612 and a SMF 614 control various aspects of the user plane.

The network architecture 600A may have a specific set of characteristics (e.g., relating to maximum bit rate, reliability, latency, bandwidth usage, power consumption, etc.). This set of characteristics may be affected by the nature of the network elements themselves (e.g., processing power, availability of free memory, proximity to other network elements, etc.) or the management thereof (e.g., optimized to maximize bit rate or reliability, reduce latency or power bandwidth usage, etc.). The characteristics of network architecture 600A may change over time, for example, by upgrading equipment or by modifying procedures to target a particular characteristic. However, at any given time, network architecture 600A will have a single set of characteristics that may or may not be optimized for a particular use case. For example, UEs 601A, 601B, 601C may have different requirements, but network architecture 600A can only be optimized for one of the three.

Network architecture 600B is an example of a sliced physical network divided into multiple logical networks. In FIG. 6, the physical network is divided into three logical networks, referred to as slice A, slice B, and slice C. For example, UE 601A may be served by AN 602A, UPF 605A, AMF 612, and SMF 614A. UE 601B may be served by AN 602B, UPF 605B, AMF 612, and SMF 614B. UE 601C may be served by AN 602C, UPF 605C, AMF 612, and SMF 614C. Although the respective UEs 601 communicate with different network elements from a logical perspective, these network elements may be deployed by a network operator using the same physical network elements.

Each network slice may be tailored to network services having different sets of characteristics. For example, slice A may correspond to enhanced mobile broadband (eMBB) service. Mobile broadband may refer to internet access by mobile users, commonly associated with smartphones. Slice B may correspond to ultra-reliable low-latency communication (URLLC), which focuses on reliability and speed. Relative to eMBB, URLLC may improve the feasibility of use cases such as autonomous driving and telesurgery. Slice C may correspond to massive machine type communication (mMTC), which focuses on low-power services delivered to a large number of users. For example, slice C may be optimized for a dense network of battery-powered sensors that provide small amounts of data at regular intervals. Many mMTC use cases would be prohibitively expensive if they operated using an eMBB or URLLC network.

If the service requirements for one of the UEs 601 changes, then the network slice serving that UE can be updated to provide better service. Moreover, the set of network characteristics corresponding to eMBB, URLLC, and mMTC may be varied, such that differentiated species of eMBB, URLLC, and mMTC are provided. Alternatively, network operators may provide entirely new services in response to, for example, customer demand.

In FIG. 6, each of the UEs 601 has its own network slice. However, it will be understood that a single slice may serve any number of UEs and a single UE may operate using any number of slices. Moreover, in the example network architecture 600B, the AN 602, UPF 605 and SMF 614 are separated into three separate slices, whereas the AMF 612 is unsliced. However, it will be understood that a network operator may deploy any architecture that selectively utilizes any mix of sliced and unsliced network elements, with different network elements divided into different numbers of slices. Although FIG. 6 only depicts three core network functions, it will be understood that other core network functions may be sliced as well. A PLMN that supports multiple network slices may maintain a separate network repository function (NFR) for each slice, enabling other NFs to discover network services associated with that slice.

Network slice selection may be controlled by an AMF, or alternatively, by a separate network slice selection function (NSSF). For example, a network operator may define and implement distinct network slice instances (NSIs). Each NSI may be associated with single network slice selection assistance information (S-NSSAI). The S-NSSAI may include a particular slice/service type (SST) indicator (indicating eMBB, URLLC, mMTC, etc.). as an example, a particular tracking area may be associated with one or more configured S-NSSAIs. UEs may identify one or more requested and/or subscribed S-NSSAIs (e.g., during registration). The network may indicate to the UE one or more allowed and/or rejected S-NSSAIs.

The S-NSSAI may further include a slice differentiator (SD) to distinguish between different tenants of a particular slice and/or service type. For example, a tenant may be a customer (e.g., vehicle manufacture, service provider, etc.) of a network operator that obtains (for example, purchases) guaranteed network resources and/or specific policies for handling its subscribers. The network operator may configure different slices and/or slice types, and use the SD to determine which tenant is associated with a particular slice.

Figures 7A, 7B, 7C:
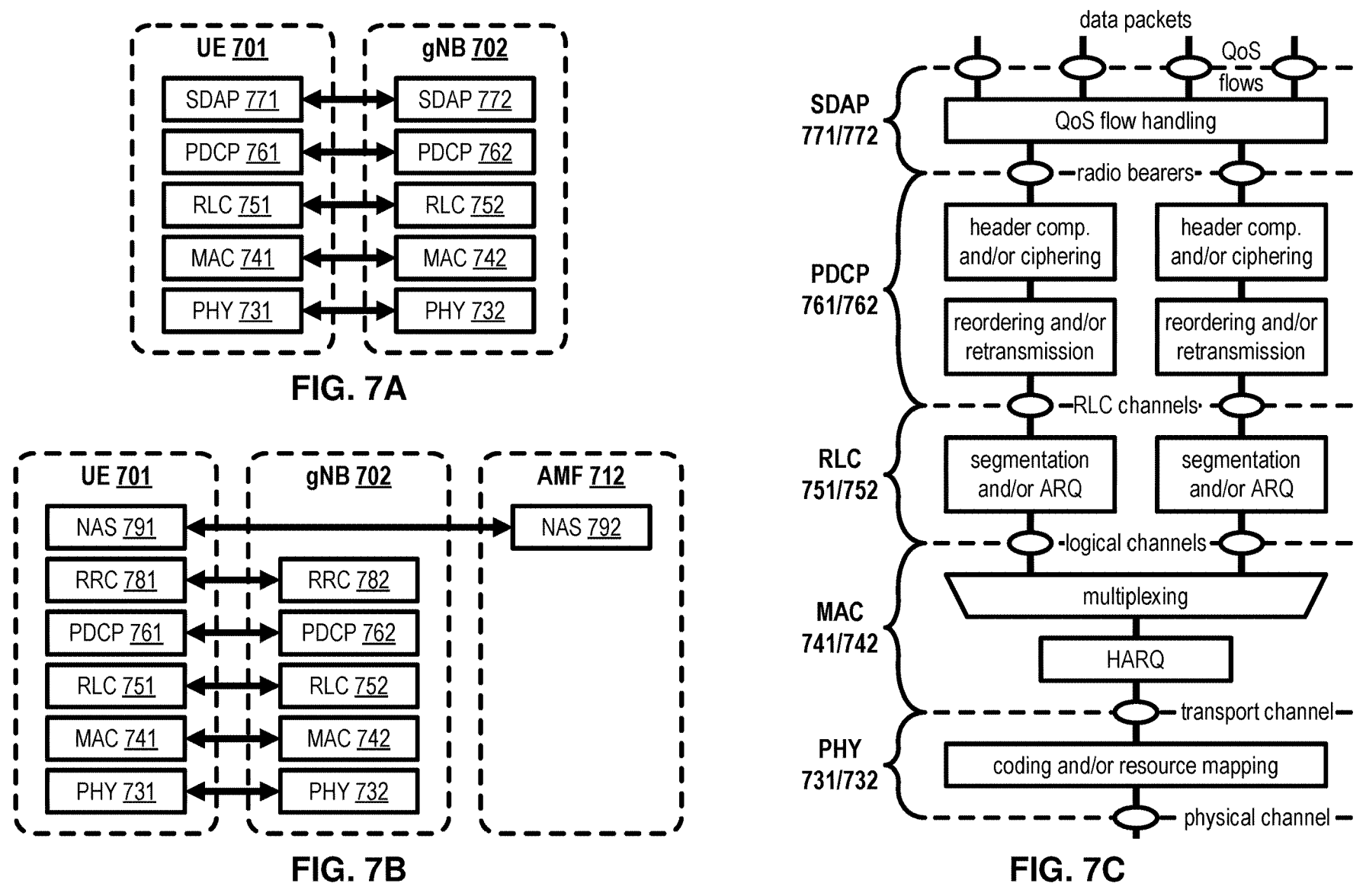

FIG. 7A, FIG. 7B, and FIG. 7C illustrate a user plane (UP) protocol stack, a control plane (CP) protocol stack, and services provided between protocol layers of the UP protocol stack.

The layers may be associated with an open system interconnection (OSI) model of computer networking functionality. In the OSI model, layer 1 may correspond to the bottom layer, with higher layers on top of the bottom layer. Layer 1 may correspond to a physical layer, which is concerned with the physical infrastructure used for transfer of signals (for example, cables, fiber optics, and/or radio frequency transceivers). In New Radio (NR), layer 1 may comprise a physical layer (PHY). Layer 2 may correspond to a data link layer. Layer 2 may be concerned with packaging of data (into, e.g., data frames) for transfer, between nodes of the network, using the physical infrastructure of layer 1. In NR, layer 2 may comprise a media access control layer (MAC), a radio link control layer (RLC), a packet data convergence layer (PDCP), and a service data application protocol layer (SDAP).

Layer 3 may correspond to a network layer. Layer 3 may be concerned with routing of the data which has been packaged in layer 2. Layer 3 may handle prioritization of data and traffic avoidance. In NR, layer 3 may comprise a radio resource control layer (RRC) and a non-access stratum layer (NAS). Layers 4 through 7 may correspond to a transport layer, a session layer, a presentation layer, and an application layer. The application layer interacts with an end user to provide data associated with an application. In an example, an end user implementing the application may generate data associated with the application and initiate sending of that information to a targeted data network (e.g., the Internet, an application server, etc.). Starting at the application layer, each layer in the OSI model may manipulate and/or repackage the information and deliver it to a lower layer. At the lowest layer, the manipulated and/or repackaged information may be exchanged via physical infrastructure (for example, electrically, optically, and/or electromagnetically). As it approaches the targeted data network, the information will be unpackaged and provided to higher and higher layers, until it once again reaches the application layer in a form that is usable by the targeted data network (e.g., the same form in which it was provided by the end user). To respond to the end user, the data network may perform this procedure in reverse.

FIG. 7A illustrates a user plane protocol stack. The user plane protocol stack may be a new radio (NR) protocol stack for a Uu interface between a UE 701 and a gNB 702. In layer 1 of the UP protocol stack, the UE 701 may implement PHY 731 and the gNB 702 may implement PHY 732. In layer 2 of the UP protocol stack, the UE 701 may implement MAC 741, RLC 751, PDCP 761, and SDAP 771. The gNB 702 may implement MAC 742, RLC 752, PDCP 762, and SDAP 772.

FIG. 7B illustrates a control plane protocol stack. The control plane protocol stack may be an NR protocol stack for the Uu interface between the UE 701 and the gNB 702 and/or an N1 interface between the UE 701 and an AMF 712. In layer 1 of the CP protocol stack, the UE 701 may implement PHY 731 and the gNB 702 may implement PHY 732. In layer 2 of the CP protocol stack, the UE 701 may implement MAC 741, RLC 751, PDCP 761, RRC 781, and NAS 791. The gNB 702 may implement MAC 742, RLC 752, PDCP 762, and RRC 782. The AMF 712 may implement NAS 792.

The NAS may be concerned with the non-access stratum, in particular, communication between the UE 701 and the core network (e.g., the AMF 712). Lower layers may be concerned with the access stratum, for example, communication between the UE 701 and the gNB 702. Messages sent between the UE 701 and the core network may be referred to as NAS messages. In an example, a NAS message may be relayed by the gNB 702, but the content of the NAS message (e.g., information elements of the NAS message) may not be visible to the gNB 702.

FIG. 7C illustrates an example of services provided between protocol layers of the NR user plane protocol stack illustrated in FIG. 7A. The UE 701 may receive services through a PDU session, which may be a logical connection between the UE 701 and a data network (DN). The UE 701 and the DN may exchange data packets associated with the PDU session. The PDU session may comprise one or more quality of service (QoS) flows. SDAP 771 and SDAP 772 may perform mapping and/or demapping between the one or more QoS flows of the PDU session and one or more radio bearers (e.g., data radio bearers). The mapping between the QoS flows and the data radio bearers may be determined in the SDAP 772 by the gNB 702, and the UE 701 may be notified of the mapping (e.g., based on control signaling and/or reflective mapping). For reflective mapping, the SDAP 772 of the gNB 220 may mark downlink packets with a QoS flow indicator (QFI) and deliver the downlink packets to the UE 701. The UE 701 may determine the mapping based on the QFI of the downlink packets.

PDCP 761 and PDCP 762 may perform header compression and/or decompression. Header compression may reduce the amount of data transmitted over the physical layer. The PDCP 761 and PDCP 762 may perform ciphering and/or deciphering. Ciphering may reduce unauthorized decoding of data transmitted over the physical layer (e.g., intercepted on an air interface), and protect data integrity (e.g., to ensure control messages originate from intended sources). The PDCP 761 and PDCP 762 may perform retransmissions of undelivered packets, in-sequence delivery and reordering of packets, duplication of packets, and/or identification and removal of duplicate packets. In a dual connectivity scenario, PDCP 761 and PDCP 762 may perform mapping between a split radio bearer and RLC channels.

RLC 751 and RLC 752 may perform segmentation, retransmission through Automatic Repeat Request (ARQ). The RLC 751 and RLC 752 may perform removal of duplicate data units received from MAC 741 and MAC 742, respectively. The RLCs 213 and 223 may provide RLC channels as a service to PDCPs 214 and 224, respectively.

MAC 741 and MAC 742 may perform multiplexing and/or demultiplexing of logical channels. MAC 741 and MAC 742 may map logical channels to transport channels. In an example, UE 701 may, in MAC 741, multiplex data units of one or more logical channels into a transport block. The UE 701 may transmit the transport block to the gNB 702 using PHY 731. The gNB 702 may receive the transport block using PHY 732 and demultiplex data units of the transport blocks back into logical channels. MAC 741 and MAC 742 may perform error correction through Hybrid Automatic Repeat Request (HARQ), logical channel prioritization, and/or padding.

PHY 731 and PHY 732 may perform mapping of transport channels to physical channels. PHY 731 and PHY 732 may perform digital and analog signal processing functions (e.g., coding/decoding and modulation/demodulation) for sending and receiving information (e.g., transmission via an air interface). PHY 731 and PHY 732 may perform multiantenna mapping.

Figure 8:
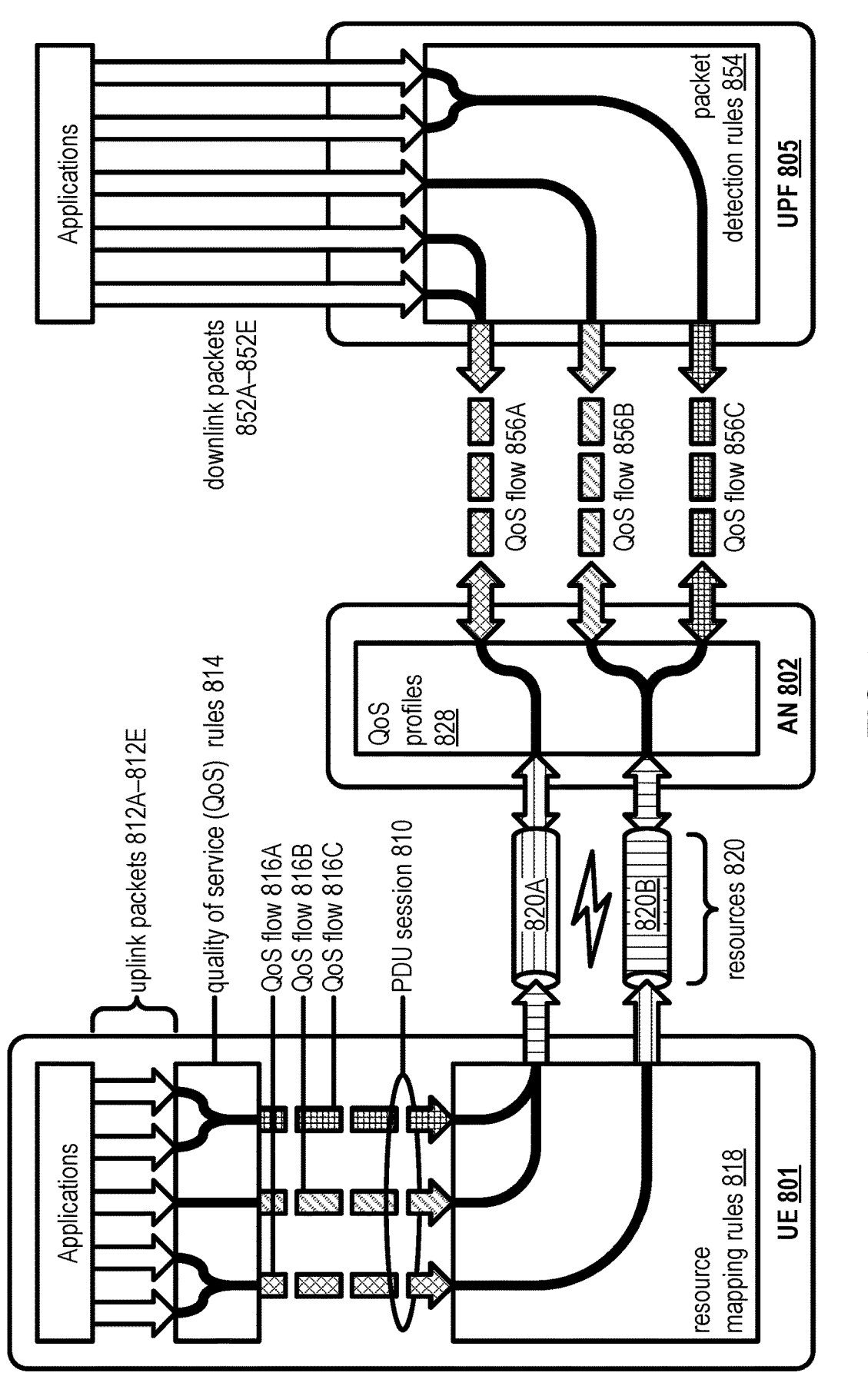
FIG. 8 illustrates an example of a quality of service model for data exchange.

FIG. 8 illustrates an example of a quality of service (QoS) model for differentiated data exchange. In the QoS model of FIG. 8, there are a UE 801, a AN 802, and a UPF 805. The QoS model facilitates prioritization of certain packet or protocol data units (PDUs), also referred to as packets. For example, higher-priority packets may be exchanged faster and/or more reliably than lower-priority packets. The network may devote more resources to exchange of high-QoS packets.

In the example of FIG. 8, a PDU session 810 is established between UE 801 and UPF 805. The PDU session 810 may be a logical connection enabling the UE 801 to exchange data with a particular data network (for example, the Internet). The UE 801 may request establishment of the PDU session 810. At the time that the PDU session 810 is established, the UE 801 may, for example, identify the targeted data network based on its data network name (DNN). The PDU session 810 may be managed, for example, by a session management function (SMF, not shown). In order to facilitate exchange of data associated with the PDU session 810, between the UE 801 and the data network, the SMF may select the UPF 805 (and optionally, one or more other UPFs, not shown).

One or more applications associated with UE 801 may generate uplink packets 812A-812E associated with the PDU session 810. In order to work within the QoS model, UE 801 may apply QoS rules 814 to uplink packets 812A-812E. The QoS rules 814 may be associated with PDU session 810 and may be determined and/or provided to the UE 801 when PDU session 810 is established and/or modified. Based on QoS rules 814, UE 801 may classify uplink packets 812A-812E, map each of the uplink packets 812A-812E to a QoS flow, and/or mark uplink packets 812A-812E with a QoS flow indicator (QFI). As a packet travels through the network, and potentially mixes with other packets from other UEs having potentially different priorities, the QFI indicates how the packet should be handled in accordance with the QoS model. In the present illustration, uplink packets 812A, 812B are mapped to QoS flow 816A, uplink packet 812C is mapped to QoS flow 816B, and the remaining packets are mapped to QoS flow 816C.

The QoS flows may be the finest granularity of QoS differentiation in a PDU session. In the figure, three QoS flows 816A-816C are illustrated. However, it will be understood that there may be any number of QoS flows. Some QoS flows may be associated with a guaranteed bit rate (GBR QoS flows) and others may have bit rates that are not guaranteed (non-GBR QoS flows). QoS flows may also be subject to per-UE and per-session aggregate bit rates. One of the QoS flows may be a default QoS flow. The QoS flows may have different priorities. For example, QoS flow 816A may have a higher priority than QoS flow 816B, which may have a higher priority than QoS flow 816C. Different priorities may be reflected by different QoS flow characteristics. For example, QoS flows may be associated with flow bit rates. A particular QoS flow may be associated with a guaranteed flow bit rate (GFBR) and/or a maximum flow bit rate (MFBR). QoS flows may be associated with specific packet delay budgets (PDBs), packet error rates (PERs), and/or maximum packet loss rates. QoS flows may also be subject to per-UE and per-session aggregate bit rates.

In order to work within the QoS model, UE 801 may apply resource mapping rules 818 to the QoS flows 816A-816C. The air interface between UE 801 and AN 802 may be associated with resources 820. In the present illustration, QoS flow 816A is mapped to resource 820A, whereas QoS flows 816B, 816C are mapped to resource 820B. The resource mapping rules 818 may be provided by the AN 802. In order to meet QoS requirements, the resource mapping rules 818 may designate more resources for relatively high-priority QoS flows. With more resources, a high-priority QoS flow such as QoS flow 816A may be more likely to obtain the high flow bit rate, low packet delay budget, or other characteristic associated with QoS rules 814. The resources 820 may comprise, for example, radio bearers. The radio bearers (e.g., data radio bearers) may be established between the UE 801 and the AN 802. The radio bearers in 5G, between the UE 801 and the AN 802, may be distinct from bearers in LTE, for example, Evolved Packet System (EPS) bearers between a UE and a packet data network gateway (PGW), S1 bearers between an eNB and a serving gateway (SGW), and/or an S5/S8 bearer between an SGW and a PGW.

Once a packet associated with a particular QoS flow is received at AN 802 via resource 820A or resource 820B, AN 802 may separate packets into respective QoS flows 856A-

856C based on QoS profiles 828. The QoS profiles 828 may be received from an SMF. Each QoS profile may correspond to a QFI, for example, the QFI marked on the uplink packets 812A-812E. Each QoS profile may include QoS parameters such as 5G QoS identifier (5QI) and an allocation and retention priority (ARP). The QoS profile for non-GBR QoS flows may further include additional QoS parameters such as a reflective QoS attribute (RQA). The QoS profile for GBR QoS flows may further include additional QoS parameters such as a guaranteed flow bit rate (GFBR), a maximum flow bit rate (MFBR), and/or a maximum packet loss rate. The 5QI may be a standardized 5QI which have one-to-one mapping to a standardized combination of 5G QoS characteristics per well-known services. The 5QI may be a dynamically assigned 5QI which the standardized 5QI values are not defined. The 5QI may represent 5G QoS characteristics. The 5QI may comprise a resource type, a default priority level, a packet delay budget (PDB), a packet error rate (PER), a maximum data burst volume, and/or an averaging window. The resource type may indicate a non-GBR QoS flow, a GBR QoS flow or a delay-critical GBR QoS flow. The averaging window may represent a duration over which the GFBR and/or MFBR is calculated. ARP may be a priority level comprising pre-emption capability and a pre-emption vulnerability. Based on the ARP, the AN 802 may apply admission control for the QoS flows in a case of resource limitations.

The AN 802 may select one or more N3 tunnels 850 for transmission of the QoS flows 856A-856C. After the packets are divided into QoS flows 856A-856C, the packet may be sent to UPF 805 (e.g., towards a DN) via the selected one or more N3 tunnels 850. The UPF 805 may verify that the QFIs of the uplink packets 812A-812E are aligned with the QoS rules 814 provided to the UE 801. The UPF 805 may measure and/or count packets and/or provide packet metrics to, for example, a PCF.

The figure also illustrates a process for downlink. In particular, one or more applications may generate downlink packets 852A-852E. The UPF 805 may receive downlink packets 852A-852E from one or more DNs and/or one or more other UPFs. As per the QoS model, UPF 805 may apply packet detection rules (PDRs) 854 to downlink packets 852A-852E. Based on PDRs 854, UPF 805 may map packets 852A-852E into QoS flows. In the present illustration, downlink packets 852A, 852B are mapped to QoS flow 856A, downlink packet 852C is mapped to QoS flow 856B, and the remaining packets are mapped to QoS flow 856C.

The QoS flows 856A-856C may be sent to AN 802. The AN 802 may apply resource mapping rules to the QoS flows 856A-856C. In the present illustration, QoS flow 856A is mapped to resource 820A, whereas QoS flows 856B, 856C are mapped to resource 820B. In order to meet QoS requirements, the resource mapping rules may designate more resources to high-priority QoS flows.

FIGS. 9A-9D illustrate example states and state transitions of a wireless device (e.g., a UE). At any given time, the wireless device may have a radio resource control (RRC) state, a registration management (RM) state, and a connection management (CM) state.

Figure 9A:
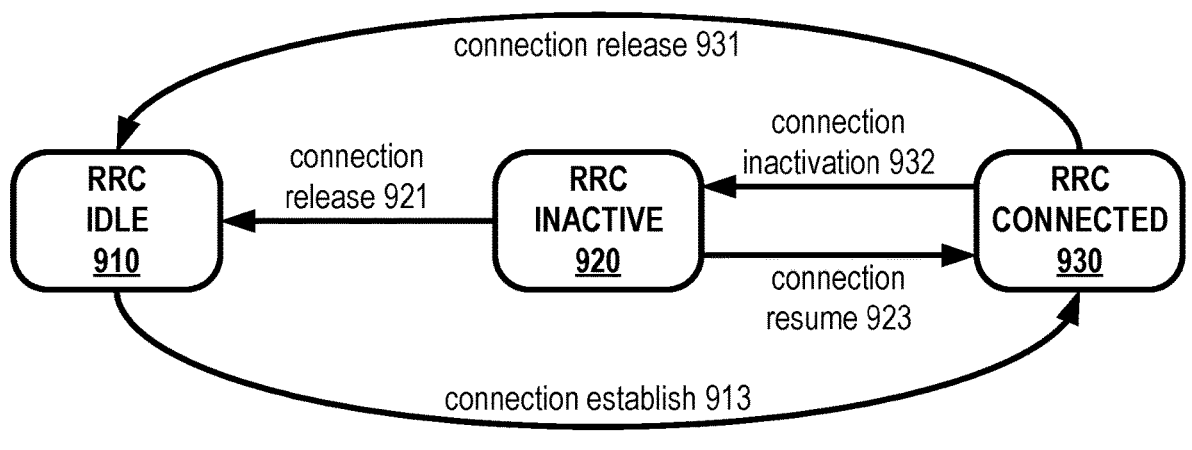
FIG. 9A, FIG. 9B, FIG. 9C, and FIG. 9D illustrate example states and state transitions of a wireless device.

FIG. 9A is an example diagram showing RRC state transitions of a wireless device (e.g., a UE). The UE may be in one of three RRC states: RRC idle 910, (e.g., RRC_IDLE), RRC inactive 920 (e.g., RRC_INACTIVE), or RRC connected 930 (e.g., RRC_CONNECTED). The UE may implement different RAN-related control-plane procedures depending on its RRC state. Other elements of the network, for example, a base station, may track the RRC state of one or more UEs and implement RAN-related control-plane procedures appropriate to the RRC state of each.

In RRC connected 930, it may be possible for the UE to exchange data with the network (for example, the base station). The parameters necessary for exchange of data may be established and known to both the UE and the network. The parameters may be referred to and/or included in an RRC context of the UE (sometimes referred to as a UE context). These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. The base station with which the UE is connected may store the RRC context of the UE.

While in RRC connected 930, mobility of the UE may be managed by the access network, whereas the UE itself may manage mobility while in RRC idle 910 and/or RRC inactive 920. While in RRC connected 930, the UE may manage mobility by measuring signal levels (e.g., reference signal levels) from a serving cell and neighboring cells and reporting these measurements to the base station currently serving the UE. The network may initiate handover based on the reported measurements. The RRC state may transition from RRC connected 930 to RRC idle 910 through a connection release procedure 930 or to RRC inactive 920 through a connection inactivation procedure 932.

In RRC idle 910, an RRC context may not be established for the UE. In RRC idle 910, the UE may not have an RRC connection with a base station. While in RRC idle 910, the UE may be in a sleep state for a majority of the time (e.g., to conserve battery power). The UE may wake up periodically (e.g., once in every discontinuous reception cycle) to monitor for paging messages from the access network. Mobility of the UE may be managed by the UE through a procedure known as cell reselection. The RRC state may transition from RRC idle 910 to RRC connected 930 through a connection establishment procedure 913, which may involve a random access procedure, as discussed in greater detail below.

In RRC inactive 920, the RRC context previously established is maintained in the UE and the base station. This may allow for a fast transition to RRC connected 930 with reduced signaling overhead as compared to the transition from RRC idle 910 to RRC connected 930. The RRC state may transition to RRC connected 930 through a connection resume procedure 923. The RRC state may transition to RRC idle 910 though a connection release procedure 921 that may be the same as or similar to connection release procedure 931.

An RRC state may be associated with a mobility management mechanism. In RRC idle 910 and RRC inactive 920, mobility may be managed by the UE through cell reselection. The purpose of mobility management in RRC idle 910 and/or RRC inactive 920 is to allow the network to be able to notify the UE of an event via a paging message without having to broadcast the paging message over the entire mobile communications network. The mobility management mechanism used in RRC idle 910 and/or RRC inactive 920 may allow the network to track the UE on a cell-group level so that the paging message may be broadcast over the cells of the cell group that the UE currently resides within instead of the entire communication network. Tracking may be based on different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 920 state, the UE may be assigned a RAN notification area. A RAN notification area may comprise one or more cell identities, a list of RAIs, and/or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 920.

Figure 9B:
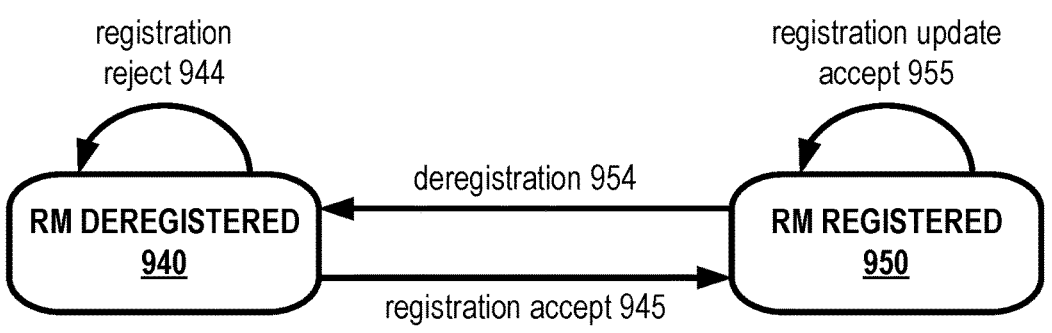

FIG. 9B is an example diagram showing registration management (RM) state transitions of a wireless device (e.g., a UE). The states are RM deregistered 940, (e.g., RM-DEREGISTERED) and RM registered 950 (e.g., RM-REGISTERED).

In RM deregistered 940, the UE is not registered with the network, and the UE is not reachable by the network. In order to be reachable by the network, the UE must perform an initial registration. As an example, the UE may register with an AMF of the network. If registration is rejected (registration reject 944), then the UE remains in RM deregistered 940. If registration is accepted (registration accept 945), then the UE transitions to RM registered 950. While the UE is RM registered 950, the network may store, keep, and/or maintain a UE context for the UE. The UE context may be referred to as wireless device context. The UE context corresponding to network registration (maintained by the core network) may be different from the RRC context corresponding to RRC state (maintained by an access network, e.g., a base station). The UE context may comprise a UE identifier and a record of various information relating to the UE, for example, UE capability information, policy information for access and mobility management of the UE, lists of allowed or established slices or PDU sessions, and/or a registration area of the UE (i.e., a list of tracking areas covering the geographical area where the wireless device is likely to be found).

While the UE is RM registered 950, the network may store the UE context of the UE, and if necessary use the UE context to reach the UE. Moreover, some services may not be provided by the network unless the UE is registered. The UE may update its UE context while remaining in RM registered 950 (registration update accept 955). For example, if the UE leaves one tracking area and enters another tracking area, the UE may provide a tracking area identifier to the network. The network may deregister the UE, or the UE may deregister itself (deregistration 954). For example, the network may automatically deregister the wireless device if the wireless device is inactive for a certain amount of time. Upon deregistration, the UE may transition to RM deregistered 940.

Figure 9C:
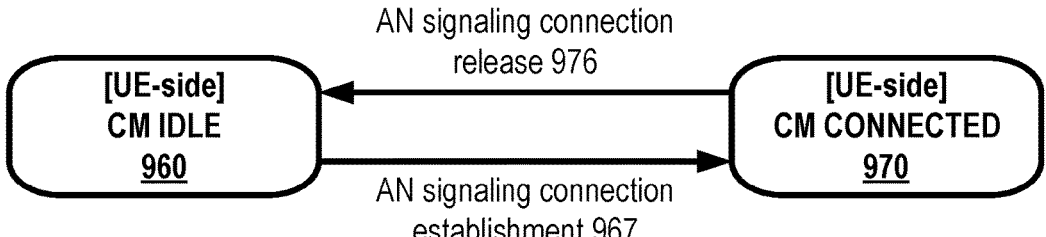

FIG. 9C is an example diagram showing connection management (CM) state transitions of a wireless device (e.g., a UE), shown from a perspective of the wireless device. The UE may be in CM idle 960 (e.g., CM-IDLE) or CM connected 970 (e.g., CM-CONNECTED).

In CM idle 960, the UE does not have a non access stratum (NAS) signaling connection with the network. As a result, the UE can not communicate with core network functions. The UE may transition to CM connected 970 by establishing an AN signaling connection (AN signaling connection establishment 967). This transition may be initiated by sending an initial NAS message. The initial NAS message may be a registration request (e.g., if the UE is RM deregistered 940) or a service request (e.g., if the UE is RM registered 950). If the UE is RM registered 950, then the UE may initiate the AN signaling connection establishment by sending a service request, or the network may send a page, thereby triggering the UE to send the service request.

In CM connected 970, the UE can communicate with core network functions using NAS signaling. As an example, the UE may exchange NAS signaling with an AMF for registration management purposes, service request procedures, and/or authentication procedures. As another example, the UE may exchange NAS signaling, with an SMF, to establish and/or modify a PDU session. The network may disconnect the UE, or the UE may disconnect itself (AN signaling connection release 976). For example, if the UE transitions to RM deregistered 940, then the UE may also transition to CM idle 960. When the UE transitions to CM idle 960, the network may deactivate a user plane connection of a PDU session of the UE.

Figure 9D:
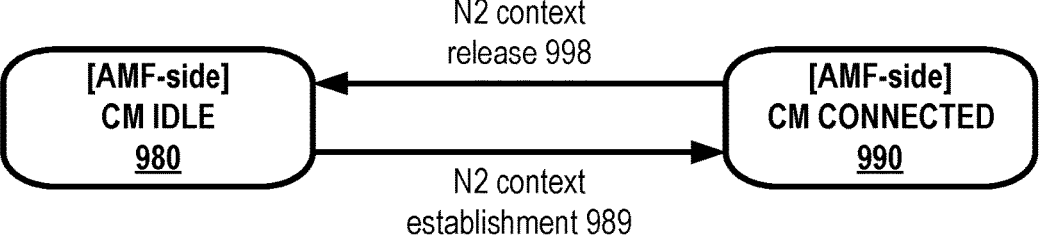

FIG. 9D is an example diagram showing CM state transitions of the wireless device (e.g., a UE), shown from a network perspective (e.g., an AMF). The CM state of the UE, as tracked by the AMF, may be in CM idle 980 (e.g., CM-IDLE) or CM connected 990 (e.g., CM-CONNECTED). When the UE transitions from CM idle 980 to CM connected 990, the AMF many establish an N2 context of the UE (N2 context establishment 989). When the UE transitions from CM connected 990 to CM idle 980, the AMF many release the N2 context of the UE (N2 context release 998).

Figure 10:
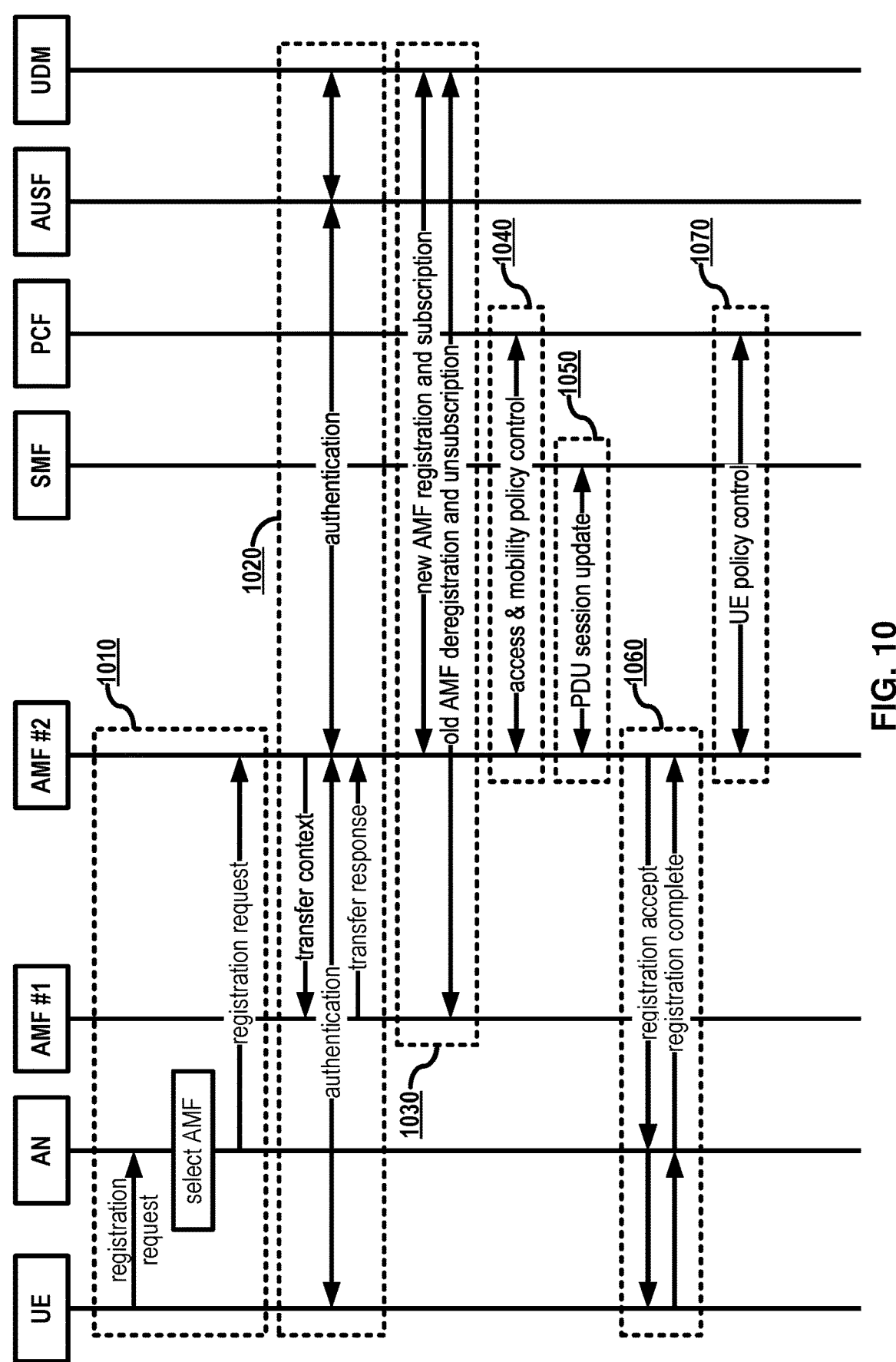
FIG. 10 illustrates an example of a registration procedure for a wireless device.
Figure 11:
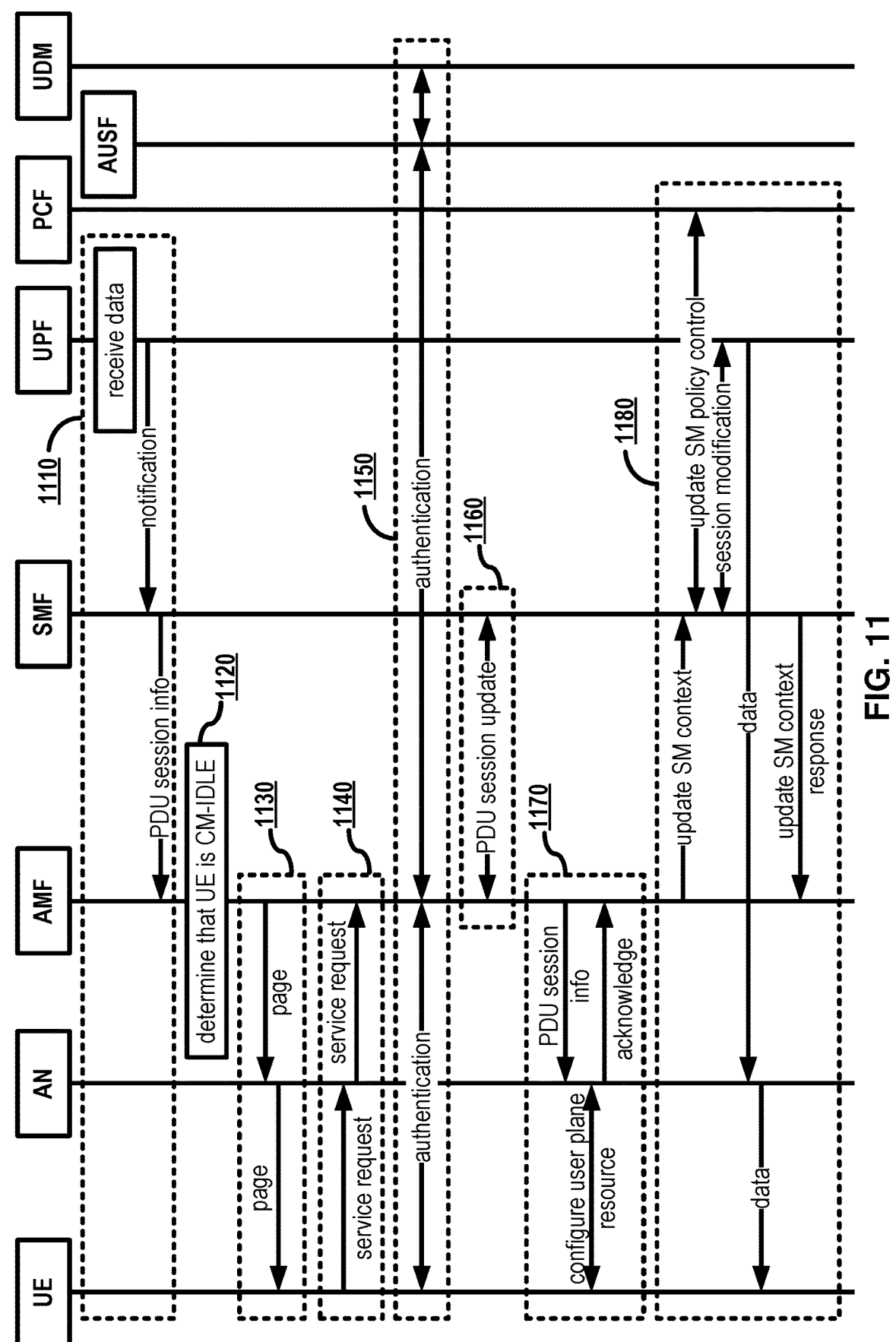
FIG. 11 illustrates an example of a service request procedure for a wireless device.
Figure 12:
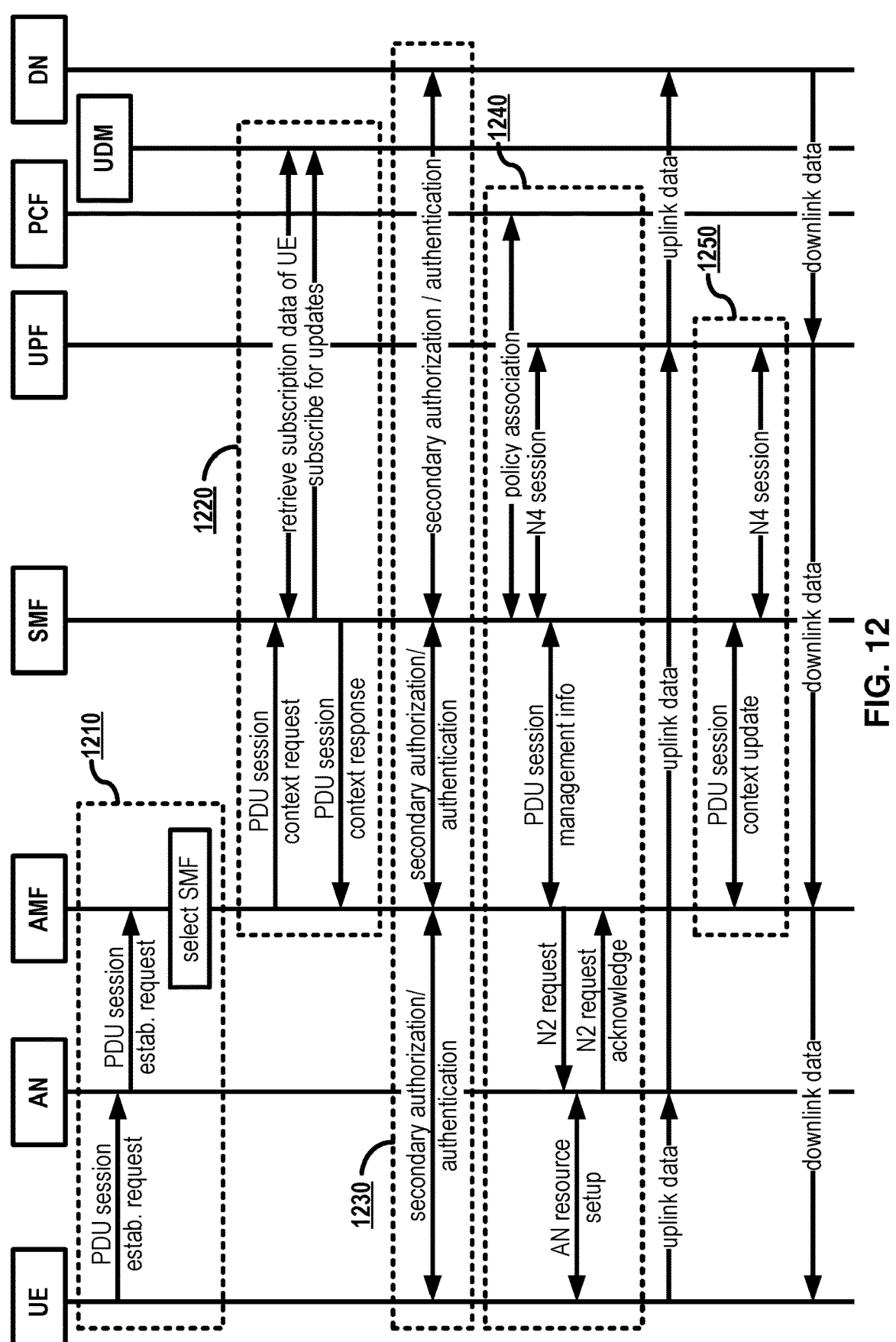
FIG. 12 illustrates an example of a protocol data unit session establishment procedure for a wireless device.

FIGS. 10-12 illustrate example procedures for registering, service request, and PDU session establishment of a UE.

FIG. 10 illustrates an example of a registration procedure for a wireless device (e.g., a UE). Based on the registration procedure, the UE may transition from, for example, RM deregistered 940 to RM registered 950.

Registration may be initiated by a UE for the purposes of obtaining authorization to receive services, enabling mobility tracking, enabling reachability, or other purposes. The UE may perform an initial registration as a first step toward connection to the network (for example, if the UE is powered on, airplane mode is turned off, etc.). Registration may also be performed periodically to keep the network informed of the UE's presence (for example, while in CM-IDLE state), or in response to a change in UE capability or registration area. Deregistration (not shown in FIG. 10) may be performed to stop network access.

At 1010, the UE transmits a registration request to an AN. As an example, the UE may have moved from a coverage area of a previous AMF (illustrated as AMF #1) into a coverage area of a new AMF (illustrated as AMF #2). The registration request may be a NAS message. The registration request may include a UE identifier. The AN may select an AMF for registration of the UE. For example, the AN may select a default AMF. For example, the AN may select an AMF that is already mapped to the UE (e.g., a previous AMF). The NAS registration request may include a network slice identifier and the AN may select an AMF based on the requested slice. After the AMF is selected, the AN may send the registration request to the selected AMF.

At 1020, the AMF that receives the registration request (AMF #2) performs a context transfer. The context may be a UE context, for example, an RRC context for the UE. As an example, AMF #2 may send AMF #1 a message requesting a context of the UE. The message may include the UE identifier. The message may be a Namf_Communication_UEContextTransfer message. AMF #1 may send to AMF #2 a message that includes the requested UE context. This message may be a Namf_Communication_UEContextTransfer message. After the UE context is received, the AMF #2 may coordinate authentication of the UE. After authentication is complete, AMF #2 may send to AMF #1 a message indicating that the UE context transfer is complete. This message may be a Namf_Communication_UEContextTransfer Response message.

Authentication may require participation of the UE, an AUSF, a UDM and/or a UDR (not shown). For example, the AMF may request that the AUSF authenticate the UE. For example, the AUSF may execute authentication of the UE. For example, the AUSF may get authentication data from UDM. For example, the AUSF may send a subscription permanent identifier (SUPI) to the AMF based on the authentication being successful. For example, the AUSF may provide an intermediate key to the AMF. The intermediate key may be used to derive an access-specific security key for the UE, enabling the AMF to perform security context management (SCM). The AUSF may obtain subscription data from the UDM. The subscription data may be based on information obtained from the UDM (and/or the UDR). The subscription data may include subscription identifiers, security credentials, access and mobility related subscription data and/or session related data.

At 1030, the new AMF, AMF #2, registers and/or subscribes with the UDM. AMF #2 may perform registration using a UE context management service of the UDM (Nudm_UECM). AMF #2 may obtain subscription information of the UE using a subscriber data management service of the UDM (Nudm_SDM). AMF #2 may further request that the UDM notify AMF #2 if the subscription information of the UE changes. As the new AMF registers and subscribes, the old AMF, AMF #1, may deregister and unsubscribe. After deregistration, AMF #1 is free of responsibility for mobility management of the UE.

At 1040, AMF #2 retrieves access and mobility (AM) policies from the PCF. As an example, the AMF #2 may provide subscription data of the UE to the PCF. The PCF may determine access and mobility policies for the UE based on the subscription data, network operator data, current network conditions, and/or other suitable information. For example, the owner of a first UE may purchase a higher level of service than the owner of a second UE. The PCF may provide the rules associated with the different levels of service. Based on the subscription data of the respective UEs, the network may apply different policies which facilitate different levels of service.

For example, access and mobility policies may relate to service area restrictions, RAT/frequency selection priority (RFSP, where RAT stands for radio access technology), authorization and prioritization of access type (e.g., LTE versus NR), and/or selection of non-3GPP access (e.g., Access Network Discovery and Selection Policy (ANDSP)). The service area restrictions may comprise a list of tracking areas where the UE is allowed to be served (or forbidden from being served). The access and mobility policies may include a UE route selection policy (URSP)) that influences routing to an established PDU session or a new PDU session. As noted above, different policies may be obtained and/or enforced based on subscription data of the UE, location of the UE (i.e., location of the AN and/or AMF), or other suitable factors.

At 1050, AMF #2 may update a context of a PDU session. For example, if the UE has an existing PDU session, the AMF #2 may coordinate with an SMF to activate a user plane connection associated with the existing PDU session. The SMF may update and/or release a session management context of the PDU session (Nsmf_PDUSession_UpdateSMContext, Nsmf_PDUSession_ReleaseSMContext).

At 1060, AMF #2 sends a registration accept message to the AN, which forwards the registration accept message to the UE. The registration accept message may include a new UE identifier and/or a new configured slice identifier. The UE may transmit a registration complete message to the AN, which forwards the registration complete message to the AMF #2. The registration complete message may acknowledge receipt of the new UE identifier and/or new configured slice identifier.

At 1070, AMF #2 may obtain UE policy control information from the PCF. The PCF may provide an access network discovery and selection policy (ANDSP) to facilitate non-3GPP access. The PCF may provide a UE route selection policy (URSP) to facilitate mapping of particular data traffic to particular PDU session connectivity parameters. As an example, the URSP may indicate that data traffic associated with a particular application should be mapped to a particular SSC mode, network slice, PDU session type, or preferred access type (3GPP or non-3GPP).

FIG. 11 illustrates an example of a service request procedure for a wireless device (e.g., a UE). The service request procedure depicted in FIG. 11 is a network-triggered service request procedure for a UE in a CM-IDLE state. However, other service request procedures (e.g., a UE-triggered service request procedure) may also be understood by reference to FIG. 11, as will be discussed in greater detail below.

At 1110, a UPF receives data. The data may be downlink data for transmission to a UE. The data may be associated with an existing PDU session between the UE and a DN. The data may be received, for example, from a DN and/or another UPF. The UPF may buffer the received data. In response to the receiving of the data, the UPF may notify an SMF of the received data. The identity of the SMF to be notified may be determined based on the received data. The notification may be, for example, an N4 session report. The notification may indicate that the UPF has received data associated with the UE and/or a particular PDU session associated with the UE. In response to receiving the notification, the SMF may send PDU session information to an AMF. The PDU session information may be sent in an N1N2 message transfer for forwarding to an AN. The PDU session information may include, for example, UPF tunnel endpoint information and/or QoS information.

At 1120, the AMF determines that the UE is in a CM-IDLE state. The determining at 1120 may be in response to the receiving of the PDU session information. Based on the determination that the UE is CM-IDLE, the service request procedure may proceed to 1130 and 1140, as depicted in FIG. 11. However, if the UE is not CM-IDLE (e.g., the UE is CM-CONNECTED), then 1130 and 1140 may be skipped, and the service request procedure may proceed directly to 1150.

At 1130, the AMF pages the UE. The paging at 1130 may be performed based on the UE being CM-IDLE. To perform the paging, the AMF may send a page to the AN. The page may be referred to as a paging or a paging message. The page may be an N2 request message. The AN may be one of a plurality of ANs in a RAN notification area of the UE. The AN may send a page to the UE. The UE may be in a coverage area of the AN and may receive the page.

At 1140, the UE may request service. The UE may transmit a service request to the AMF via the AN. As depicted in FIG. 11, the UE may request service at 1140 in response to receiving the paging at 1130. However, as noted above, this is for the specific case of a network-triggered service request procedure. In some scenarios (for example, if uplink data becomes available at the UE), then the UE may commence a UE-triggered service request procedure. The UE-triggered service request procedure may commence starting at 1140.

At 1150, the network may authenticate the UE. Authentication may require participation of the UE, an AUSF, and/or a UDM, for example, similar to authentication described elsewhere in the present disclosure. In some cases (for example, if the UE has recently been authenticated), the authentication at 1150 may be skipped.

At 1160, the AMF and SMF may perform a PDU session update. As part of the PDU session update, the SMF may provide the AMF with one or more UPF tunnel endpoint identifiers. In some cases (not shown in FIG. 11), it may be necessary for the SMF to coordinate with one or more other SMFs and/or one or more other UPFs to set up a user plane.

At 1170, the AMF may send PDU session information to the AN. The PDU session information may be included in an N2 request message. Based on the PDU session information, the AN may configure a user plane resource for the UE. To configure the user plane resource, the AN may, for example, perform an RRC reconfiguration of the UE. The AN may acknowledge to the AMF that the PDU session information has been received. The AN may notify the AMF that the user plane resource has been configured, and/or provide information relating to the user plane resource configuration.

In the case of a UE-triggered service request procedure, the UE may receive, at 1170, a NAS service accept message from the AMF via the AN. After the user plane resource is configured, the UE may transmit uplink data (for example, the uplink data that caused the UE to trigger the service request procedure).

At 1180, the AMF may update a session management (SM) context of the PDU session. For example, the AMF may notify the SMF (and/or one or more other associated SMFs) that the user plane resource has been configured, and/or provide information relating to the user plane resource configuration. The AMF may provide the SMF (and/or one or more other associated SMFs) with one or more AN tunnel endpoint identifiers of the AN. After the SM context update is complete, the SMF may send an update SM context response message to the AMF.

Based on the update of the session management context, the SMF may update a PCF for purposes of policy control. For example, if a location of the UE has changed, the SMF may notify the PCF of the UE's a new location.

Based on the update of the session management context, the SMF and UPF may perform a session modification. The session modification may be performed using N4 session modification messages. After the session modification is complete, the UPF may transmit downlink data (for example, the downlink data that caused the UPF to trigger the network-triggered service request procedure) to the UE. The transmitting of the downlink data may be based on the one or more AN tunnel endpoint identifiers of the AN.

FIG. 12 illustrates an example of a protocol data unit (PDU) session establishment procedure for a wireless device (e.g., a UE). The UE may determine to transmit the PDU session establishment request to create a new PDU session, to hand over an existing PDU session to a 3GPP network, or for any other suitable reason.

At 1210, the UE initiates PDU session establishment. The UE may transmit a PDU session establishment request to an AMF via an AN. The PDU session establishment request may be a NAS message. The PDU session establishment request may indicate: a PDU session ID; a requested PDU session type (new or existing); a requested DN (DNN); a requested network slice (S-NSSAI); a requested SSC mode; and/or any other suitable information. The PDU session ID may be generated by the UE. The PDU session type may be, for example, an Internet Protocol (IP)-based type (e.g., IPv4, IPv6, or dual stack IPv4/IPv6), an Ethernet type, or an unstructured type.

The AMF may select an SMF based on the PDU session establishment request. In some scenarios, the requested PDU session may already be associated with a particular SMF. For example, the AMF may store a UE context of the UE, and the UE context may indicate that the PDU session ID of the requested PDU session is already associated with the particular SMF. In some scenarios, the AMF may select the SMF based on a determination that the SMF is prepared to handle the requested PDU session. For example, the requested PDU session may be associated with a particular DNN and/or S-NSSAI, and the SMF may be selected based on a determination that the SMF can manage a PDU session associated with the particular DNN and/or S-NSSAI.

At 1220, the network manages a context of the PDU session. After selecting the SMF at 1210, the AMF sends a PDU session context request to the SMF. The PDU session context request may include the PDU session establishment request received from the UE at 1210. The PDU session context request may be a Nsmf_PDUSession_CreateSM-Context Request and/or a Nsmf_PDUSession_UpdateSM-Context Request. The PDU session context request may indicate identifiers of the UE; the requested DN; and/or the requested network slice. Based on the PDU session context request, the SMF may retrieve subscription data from a UDM. The subscription data may be session management subscription data of the UE. The SMF may subscribe for updates to the subscription data, so that the PCF will send new information if the subscription data of the UE changes. After the subscription data of the UE is obtained, the SMF may transmit a PDU session context response to the AMG. The PDU session context response may be a Nsmf_P-DUSession_CreateSMContext Response and/or a Nsmf_P-DUSession_UpdateSMContext Response. The PDU session context response may include a session management context ID.

At 1230, secondary authorization/authentication may be performed, if necessary. The secondary authorization/authentication may involve the UE, the AMF, the SMF, and the DN. The SMF may access the DN via a Data Network Authentication, Authorization and Accounting (DN AAA) server.

At 1240, the network sets up a data path for uplink data associated with the PDU session. The SMF may select a PCF and establish a session management policy association. Based on the association, the PCF may provide an initial set of policy control and charging rules (PCC rules) for the PDU session. When targeting a particular PDU session, the PCF may indicate, to the SMF, a method for allocating an IP address to the PDU Session, a default charging method for the PDU session, an address of the corresponding charging entity, triggers for requesting new policies, etc. The PCF may also target a service data flow (SDF) comprising one or more PDU sessions. When targeting an SDF, the PCF may indicate, to the SMF, policies for applying QoS requirements, monitoring traffic (e.g., for charging purposes), and/or steering traffic (e.g., by using one or more particular N6 interfaces).

The SMF may determine and/or allocate an IP address for the PDU session. The SMF may select one or more UPFs (a single UPF in the example of FIG. 12) to handle the PDU session. The SMF may send an N4 session message to the selected UPF. The N4 session message may be an N4 Session Establishment Request and/or an N4 Session Modification Request. The N4 session message may include packet detection, enforcement, and reporting rules associated with the PDU session. In response, the UPF may acknowledge by sending an N4 session establishment response and/or an N4 session modification response.

The SMF may send PDU session management information to the AMF. The PDU session management information may be a session service request (e.g., Namf_Communication_N1N2MessageTransfer) message. The PDU session management information may include the PDU session ID. The PDU session management information may be a NAS message. The PDU session management information may include N1 session management information and/or N2 session management information. The N1 session management information may include a PDU session establishment accept message. The PDU session establishment accept message may include tunneling endpoint information of the UPF and quality of service (QoS) information associated with the PDU session.

The AMF may send an N2 request to the AN. The N2 request may include the PDU session establishment accept message. Based on the N2 request, the AN may determine AN resources for the UE. The AN resources may be used by the UE to establish the PDU session, via the AN, with the DN. The AN may determine resources to be used for the PDU session and indicate the determined resources to the UE. The AN may send the PDU session establishment accept message to the UE. For example, the AN may perform an RRC reconfiguration of the UE. After the AN resources are set up, the AN may send an N2 request acknowledge to the AMF. The N2 request acknowledge may include N2 session management information, for example, the PDU session ID and tunneling endpoint information of the AN.

After the data path for uplink data is set up at 1240, the UE may optionally send uplink data associated with the PDU session. As shown in FIG. 12, the uplink data may be sent to a DN associated with the PDU session via the AN and the UPF.

At 1250, the network may update the PDU session context. The AMF may transmit a PDU session context update request to the SMF. The PDU session context update request may be a Nsmf_PDUSession_UpdateSMContext Request. The PDU session context update request may include the N2 session management information received from the AN. The SMF may acknowledge the PDU session context update. The acknowledgement may be a Nsmf_P-

DUSession_UpdateSMContext Response. The acknowledgement may include a subscription requesting that the SMF be notified of any UE mobility event. Based on the PDU session context update request, the SMF may send an N4 session message to the UPF. The N4 session message may be an N4 Session Modification Request. The N4 session message may include tunneling endpoint information of the AN. The N4 session message may include forwarding rules associated with the PDU session. In response, the UPF may acknowledge by sending an N4 session modification response.

After the UPF receives the tunneling endpoint information of the AN, the UPF may relay downlink data associated with the PDU session. As shown in FIG. 12, the downlink data may be received from a DN associated with the PDU session via the AN and the UPF.

Figure 13:
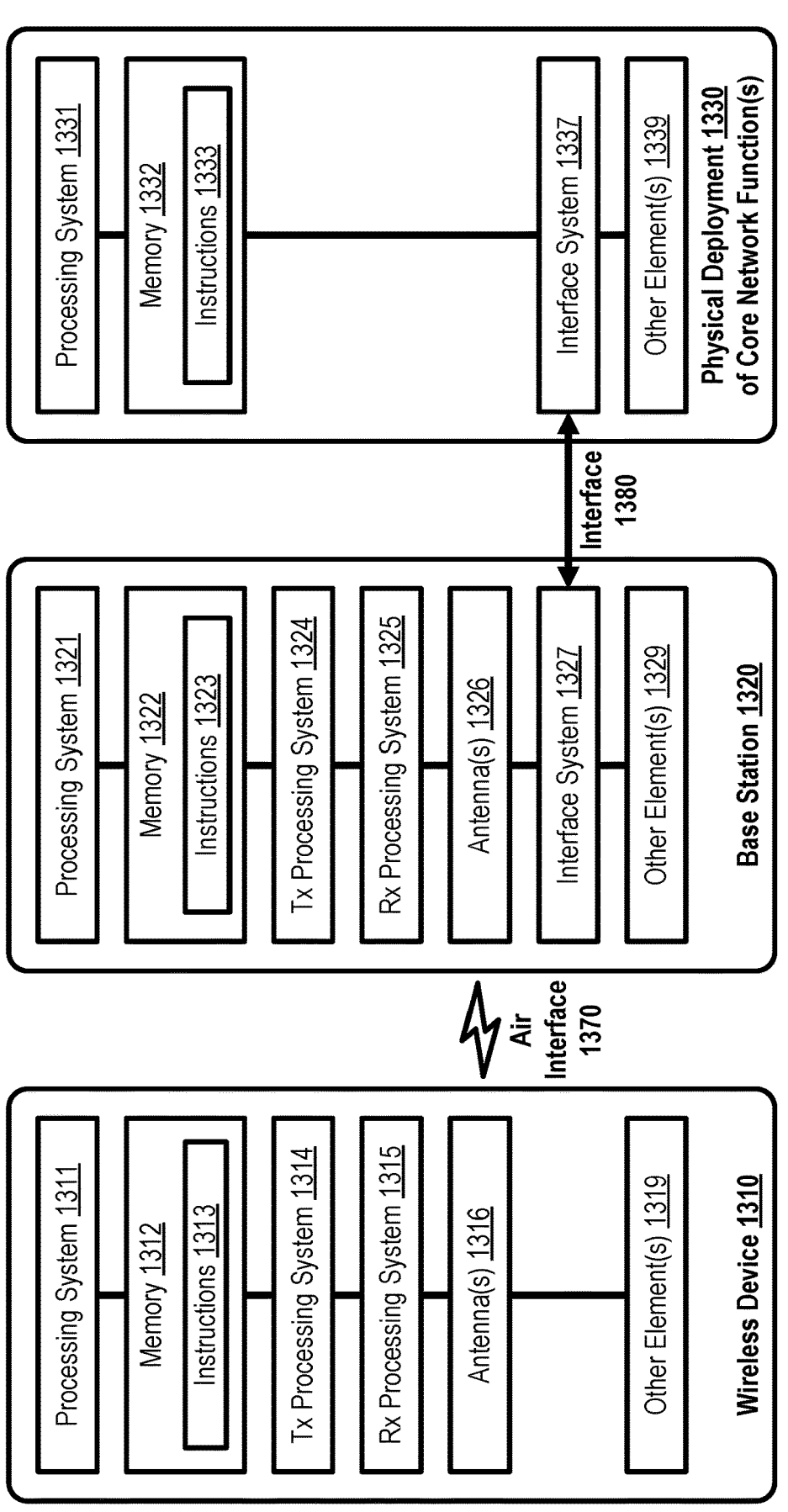
FIG. 13 illustrates examples of components of the elements in a communications network.

FIG. 13 illustrates examples of components of the elements in a communications network. FIG. 13 includes a wireless device 1310, a base station 1320, and a physical deployment of one or more network functions 1330 (henceforth "deployment 1330"). Any wireless device described in the present disclosure may have similar components and may be implemented in a similar manner as the wireless device 1310. Any other base station described in the present disclosure (or any portion thereof, depending on the architecture of the base station) may have similar components and may be implemented in a similar manner as the base station 1320. Any physical core network deployment in the present disclosure (or any portion thereof, depending on the architecture of the base station) may have similar components and may be implemented in a similar manner as the deployment 1330.

The wireless device 1310 may communicate with base station 1320 over an air interface 1370. The communication direction from wireless device 1310 to base station 1320 over air interface 1370 is known as uplink, and the communication direction from base station 1320 to wireless device 1310 over air interface 1370 is known as downlink. Downlink transmissions may be separated from uplink transmissions using FDD, TDD, and/or some combination of duplexing techniques. FIG. 13 shows a single wireless device 1310 and a single base station 1320, but it will be understood that wireless device 1310 may communicate with any number of base stations or other access network components over air interface 1370, and that base station 1320 may communicate with any number of wireless devices over air interface 1370.

The wireless device 1310 may comprise a processing system 1311 and a memory 1312. The memory 1312 may comprise one or more computer-readable media, for example, one or more non-transitory computer readable media. The memory 1312 may include instructions 1313. The processing system 1311 may process and/or execute instructions 1313. Processing and/or execution of instructions 1313 may cause wireless device 1310 and/or processing system 1311 to perform one or more functions or activities. The memory 1312 may include data (not shown). One of the functions or activities performed by processing system 1311 may be to store data in memory 1312 and/or retrieve previously-stored data from memory 1312. In an example, downlink data received from base station 1320 may be stored in memory 1312, and uplink data for transmission to base station 1320 may be retrieved from memory 1312. As illustrated in FIG. 13, the wireless device 1310 may communicate with base station 1320 using a transmission processing system 1314 and/or a reception processing system 1315. Alternatively, transmission processing system 1314 and reception processing system 1315 may be implemented as a single processing system, or both may be omitted and all processing in the wireless device 1310 may be performed by the processing system 1311. Although not shown in FIG. 13, transmission processing system 1314 and/or reception processing system 1315 may be coupled to a dedicated memory that is analogous to but separate from memory 1312, and comprises instructions that may be processed and/or executed to carry out one or more of their respective functionalities. The wireless device 1310 may comprise one or more antennas 1316 to access air interface 1370.

The wireless device 1310 may comprise one or more other elements 1319. The one or more other elements 1319 may comprise software and/or hardware that provide features and/or functionalities, for example, a speaker, a microphone, a keypad, a display, a touchpad, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, a global positioning sensor (GPS) and/or the like). The wireless device 1310 may receive user input data from and/or provide user output data to the one or more one or more other elements 1319. The one or more other elements 1319 may comprise a power source. The wireless device 1310 may receive power from the power source and may be configured to distribute the power to the other components in wireless device 1310. The power source may comprise one or more sources of power, for example, a battery, a solar cell, a fuel cell, or any combination thereof.

The wireless device 1310 may transmit uplink data to and/or receive downlink data from base station 1320 via air interface 1370. To perform the transmission and/or reception, one or more of the processing system 1311, transmission processing system 1314, and/or reception system 1315 may implement open systems interconnection (OSI) functionality. As an example, transmission processing system 1314 and/or reception system 1315 may perform layer 1 OSI functionality, and processing system 1311 may perform higher layer functionality. The wireless device 1310 may transmit and/or receive data over air interface 1370 using one or more antennas 1316. For scenarios where the one or more antennas 1316 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise a processing system 1321 and a memory 1322. The memory 1322 may comprise one or more computer-readable media, for example, one or more non-transitory computer readable media. The memory 1322 may include instructions 1323. The processing system 1321 may process and/or execute instructions 1323. Processing and/or execution of instructions 1323 may cause base station 1320 and/or processing system 1321 to perform one or more functions or activities. The memory 1322 may include data (not shown). One of the functions or activities performed by processing system 1321 may be to store data in memory 1322 and/or retrieve previously-stored data from memory 1322. The base station 1320 may communicate with wireless device 1310 using a transmission processing system 1324 and a reception processing system 1325. Although not shown in FIG. 13, transmission processing system 1324 and/or reception processing system 1325 may be coupled to a dedicated memory that is analogous to but separate from memory 1322, and comprises instructions that may be processed and/or executed to carry out one or more of their respective functionalities. The wireless device 1320 may comprise one or more antennas 1326 to access air interface 1370.

The base station 1320 may transmit downlink data to and/or receive uplink data from wireless device 1310 via air interface 1370. To perform the transmission and/or reception, one or more of the processing system 1321, transmission processing system 1324, and/or reception system 1325 may implement OSI functionality. As an example, transmission processing system 1324 and/or reception system 1325 may perform layer 1 OSI functionality, and processing system 1321 may perform higher layer functionality. The base station 1320 may transmit and/or receive data over air interface 1370 using one or more antennas 1326. For scenarios where the one or more antennas 1326 include multiple antennas, the multiple antennas may be used to perform one or more multi-antenna techniques, such as spatial multiplexing (e.g., single-user multiple-input multiple output (MIMO) or multi-user MIMO), transmit/receive diversity, and/or beamforming.

The base station 1320 may comprise an interface system 1327. The interface system 1327 may communicate with one or more base stations and/or one or more elements of the core network via an interface 1380. The interface 1380 may be wired and/or wireless and interface system 1327 may include one or more components suitable for communicating via interface 1380. In FIG. 13, interface 1380 connects base station 1320 to a single deployment 1330, but it will be understood that wireless device 1310 may communicate with any number of base stations and/or CN deployments over interface 1380, and that deployment 1330 may communicate with any number of base stations and/or other CN deployments over interface 1380. The base station 1320 may comprise one or more other elements 1329 analogous to one or more of the one or more other elements 1319.

The deployment 1330 may comprise any number of portions of any number of instances of one or more network functions (NFs). The deployment 1330 may comprise a processing system 1331 and a memory 1332. The memory 1332 may comprise one or more computer-readable media, for example, one or more non-transitory computer readable media. The memory 1332 may include instructions 1333. The processing system 1331 may process and/or execute instructions 1333. Processing and/or execution of instructions 1333 may cause the deployment 1330 and/or processing system 1331 to perform one or more functions or activities. The memory 1332 may include data (not shown). One of the functions or activities performed by processing system 1331 may be to store data in memory 1332 and/or retrieve previously-stored data from memory 1332. The deployment 1330 may access the interface 1380 using an interface system 1337. The deployment 1330 may comprise one or more other elements 1339 analogous to one or more of the one or more other elements 1319.

One or more of the systems 1311, 1314, 1315, 1321, 1324, 1325, and/or 1331 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. One or more of the systems 1311, 1314, 1315, 1321, 1324, 1325, and/or 1331 may perform signal coding/processing, data processing, power control, input/output processing, and/or any other functionality that may enable wireless device 1310, base station 1320, and/or deployment 1330 to operate in a mobile communications system.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab and/or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise computers, microcontrollers, microprocessors, DSPs, ASICs, FPGAs, and complex programmable logic devices (CPLDs). Computers, microcontrollers and microprocessors may be programmed using languages such as assembly, C, C++ and/or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

The wireless device 1310, base station 1320, and/or deployment 1330 may implement timers and/or counters. A timer/counter may start at an initial value. As used herein, starting may comprise restarting. Once started, the timer/counter may run. Running of the timer/counter may be associated with an occurrence. When the occurrence occurs, the value of the timer/counter may change (for example, increment or decrement). The occurrence may be, for example, an exogenous event (for example, a reception of a signal, a measurement of a condition, etc.), an endogenous event (for example, a transmission of a signal, a calculation, a comparison, a performance of an action or a decision to so perform, etc.), or any combination thereof. In the case of a timer, the occurrence may be the passage of a particular amount of time. However, it will be understood that a timer may be described and/or implemented as a counter that counts the passage of a particular unit of time. A timer/counter may run in a direction of a final value until it reaches the final value. The reaching of the final value may be referred to as expiration of the timer/counter. The final value may be referred to as a threshold. A timer/counter may be paused, wherein the present value of the timer/counter is held, maintained, and/or carried over, even upon the occurrence of one or more occurrences that would otherwise cause the value of the timer/counter to change. The timer/counter may be un-paused or continued, wherein the value that was held, maintained, and/or carried over begins changing again when the one or more occurrence occur. A timer/counter may be set and/or reset. As used herein, setting may comprise resetting. When the timer/counter sets and/or resets, the value of the timer/counter may be set to the initial value. A timer/counter may be started and/or restarted. As used herein, starting may comprise restarting. In some embodiments, when the timer/counter restarts, the value of the timer/counter may be set to the initial value and the timer/counter may begin to run.

FIGS. 14A, 14B, 14C, and 14D illustrate various example arrangements of physical core network deployments, each having one or more network functions or portions thereof. The core network deployments comprise a deployment 1410, a deployment 1420, a deployment 1430, a deployment 1440, and/or a deployment 1450. Each deployment may be analogous to, for example, the deployment 1330 depicted in FIG. 13. In particular, each deployment may comprise a processing system for performing one or more functions or activities, memory for storing data and/or instructions, and an interface system for communicating with other network elements (for example, other core network deployments). Each deployment may comprise one or more network functions (NFs). The term NF may refer to a particular set of functionalities and/or one or more physical elements configured to perform those functionalities (e.g., a processing system and memory comprising instructions that, when executed by the processing system, cause the processing system to perform the functionalities). For example, in the present disclosure, when a network function is described as performing X, Y, and Z, it will be understood that this refers to the one or more physical elements configured to perform X, Y, and Z, no matter how or where the one or more physical elements are deployed. The term NF may refer to a network node, network element, and/or network device.

As will be discussed in greater detail below, there are many different types of NF and each type of NF may be associated with a different set of functionalities. A plurality of different NFs may be flexibly deployed at different locations (for example, in different physical core network deployments) or in a same location (for example, co-located in a same deployment). A single NF may be flexibly deployed at different locations (implemented using different physical core network deployments) or in a same location. Moreover, physical core network deployments may also implement one or more base stations, application functions (AFs), data networks (DNs), or any portions thereof. NFs may be implemented in many ways, including as network elements on dedicated or shared hardware, as software instances running on dedicated or shared hardware, or as virtualized functions instantiated on a platform (e.g., a cloud-based platform).

FIG. 14A illustrates an example arrangement of core network deployments in which each deployment comprises one network function. A deployment 1410 comprises an NF 1411, a deployment 1420 comprises an NF 1421, and a deployment 1430 comprises an NF 1431. The deployments 1410, 1420, 1430 communicate via an interface 1490. The deployments 1410, 1420, 1430 may have different physical locations with different signal propagation delays relative to other network elements. The diversity of physical locations of deployments 1410, 1420, 1430 may enable provision of services to a wide area with improved speed, coverage, security, and/or efficiency.

FIG. 14B illustrates an example arrangement wherein a single deployment comprises more than one NF. Unlike FIG. 14A, where each NF is deployed in a separate deployment, FIG. 14B illustrates multiple NFs in deployments 1410, 1420. In an example, deployments 1410, 1420 may implement a software-defined network (SDN) and/or a network function virtualization (NFV).

For example, deployment 1410 comprises an additional network function, NF 1411A. The NFs 1411, 1411A may consist of multiple instances of the same NF type, co-located at a same physical location within the same deployment 1410. The NFs 1411, 1411A may be implemented independently from one another (e.g., isolated and/or independently controlled). For example, the NFs 1411, 1411A may be associated with different network slices. A processing system and memory associated with the deployment 1410 may perform all of the functionalities associated with the NF 1411 in addition to all of the functionalities associated with the NF 1411A. In an example, NFs 1411, 1411A may be associated with different PLMNs, but deployment 1410, which implements NFs 1411, 1411A, may be owned and/or operated by a single entity.

Elsewhere in FIG. 14B, deployment 1420 comprises NF 1421 and an additional network function, NF 1422. The NFs 1421, 1422 may be different NF types. Similar to NFs 1411, 1411A, the NFs 1421, 1422 may be co-located within the same deployment 1420, but separately implemented. As an example, a first PLMN may own and/or operate deployment 1420 having NFs 1421, 1422. As another example, the first PLMN may implement NF 1421 and a second PLMN may obtain from the first PLMN (e.g., rent, lease, procure, etc.) at least a portion of the capabilities of deployment 1420 (e.g., processing power, data storage, etc.) in order to implement NF 1422. As yet another example, the deployment may be owned and/or operated by one or more third parties, and the first PLMN and/or second PLMN may procure respective portions of the capabilities of the deployment 1420. When multiple NFs are provided at a single deployment, networks may operate with greater speed, coverage, security, and/or efficiency.

FIG. 14C illustrates an example arrangement of core network deployments in which a single instance of an NF is implemented using a plurality of different deployments. In particular, a single instance of NF 1422 is implemented at deployments 1420, 1440. As an example, the functionality provided by NF 1422 may be implemented as a bundle or sequence of subservices. Each subservice may be implemented independently, for example, at a different deployment. Each subservices may be implemented in a different physical location. By distributing implementation of subservices of a single NF across different physical locations, the mobile communications network may operate with greater speed, coverage, security, and/or efficiency.

FIG. 14D illustrates an example arrangement of core network deployments in which one or more network functions are implemented using a data processing service. In FIG. 14D, NFs 1411, 1411A, 1421, 1422 are included in a deployment 1450 that is implemented as a data processing service. The deployment 1450 may comprise, for example, a cloud network and/or data center. The deployment 1450 may be owned and/or operated by a PLMN or by a non-PLMN third party. The NFs 1411, 1411A, 1421, 1422 that are implemented using the deployment 1450 may belong to the same PLMN or to different PLMNs. The PLMN(s) may obtain (e.g., rent, lease, procure, etc.) at least a portion of the capabilities of the deployment 1450 (e.g., processing power, data storage, etc.). By providing one or more NFs using a data processing service, the mobile communications network may operate with greater speed, coverage, security, and/or efficiency.

As shown in the figures, different network elements (e.g., NFs) may be located in different physical deployments, or co-located in a single physical deployment. It will be understood that in the present disclosure, the sending and receiving of messages among different network elements is not limited to inter-deployment transmission or intra-deployment transmission, unless explicitly indicated.

In an example, a deployment may be a 'black box' that is preconfigured with one or more NFs and preconfigured to communicate, in a prescribed manner, with other 'black box' deployments (e.g., via the interface 1490). Additionally or alternatively, a deployment may be configured to operate in accordance with open-source instructions (e.g., software) designed to implement NFs and communicate with other deployments in a transparent manner. The deployment may operate in accordance with open RAN (O-RAN) standards.

In an implementation, a service provider (e.g., a game operator, a factory operator, etc.) may determine to request a dedicated network slice for its service from a network operator. Based on the request, the network operator may configure and provide the dedicated network slice. The service provider may allow its users to access an application server of the service provider via the dedicated network slice. The service provider may want to sponsor its users, if the users access the application server via the dedicated network slice. For example, to provide reliable connectivity services to its users, the service provider may set a maximum number of users accessing the dedicated network slice.

In an implementation, for a network slice, to support the maximum number of users accessing the dedicated network slice, a network slice admission/access control function NSACF) may manage a number of registered UEs for the network slice and/or a number of PDU Sessions established for the network slice. For example, the network slice may be subject to admission control to limit the number of UEs that register to the network slice and/or to limit the number of PDU sessions that are established for the network slice. The NSACF may be configured with the maximum number of registered UEs for the network slice and/or the maximum number of PDU sessions established for the network slice. The NSACF may be configured with information of access type(s) for the network slice. For example, the access type may be 3GPP access and/or non-3GPP access.

In an implementation, the NSACF may track the number of UEs registered for the network slice and may ensure that the number does not exceed the maximum number of UEs registered with the network slice. The NSACF may maintains a list of identities of UEs registered with the network slice. If the number of UEs registered with the network slice needs to increase for a UE, the NSACF may determine whether the identity of the UE is included in the list of identities of UEs registered with the network slice. If the identity of the UE is not included in the list of identities of the UEs registered with the network slice, the NSACF may determine whether the number of UEs registered with the network slice for the network slice is reached to the maximum number of UEs registered with the network slice. If it is determined that the maximum number of UEs registered with the network slice is reached, the NSACF may apply admission control. For example, the NSACF may not allow the UE to register for the network slice.

In an implementation, the NSACF may track the number of PDU sessions established for the network slice and may ensure that the number does not exceed the maximum number of PDU sessions established with the network slice. If a PDU session for a UE cause the number of PDU sessions established for the network slice to increase, the NSACF determines whether the number of PDU sessions established for the network slice reaches the maximum number of PDU sessions established for the network slice. If it is determined that the maximum number of PDU sessions established with the network slice is reached, the NSACF may apply admission control. For example, the NSACF may not allow the PDU session for the UE to be established.

Figure 15:
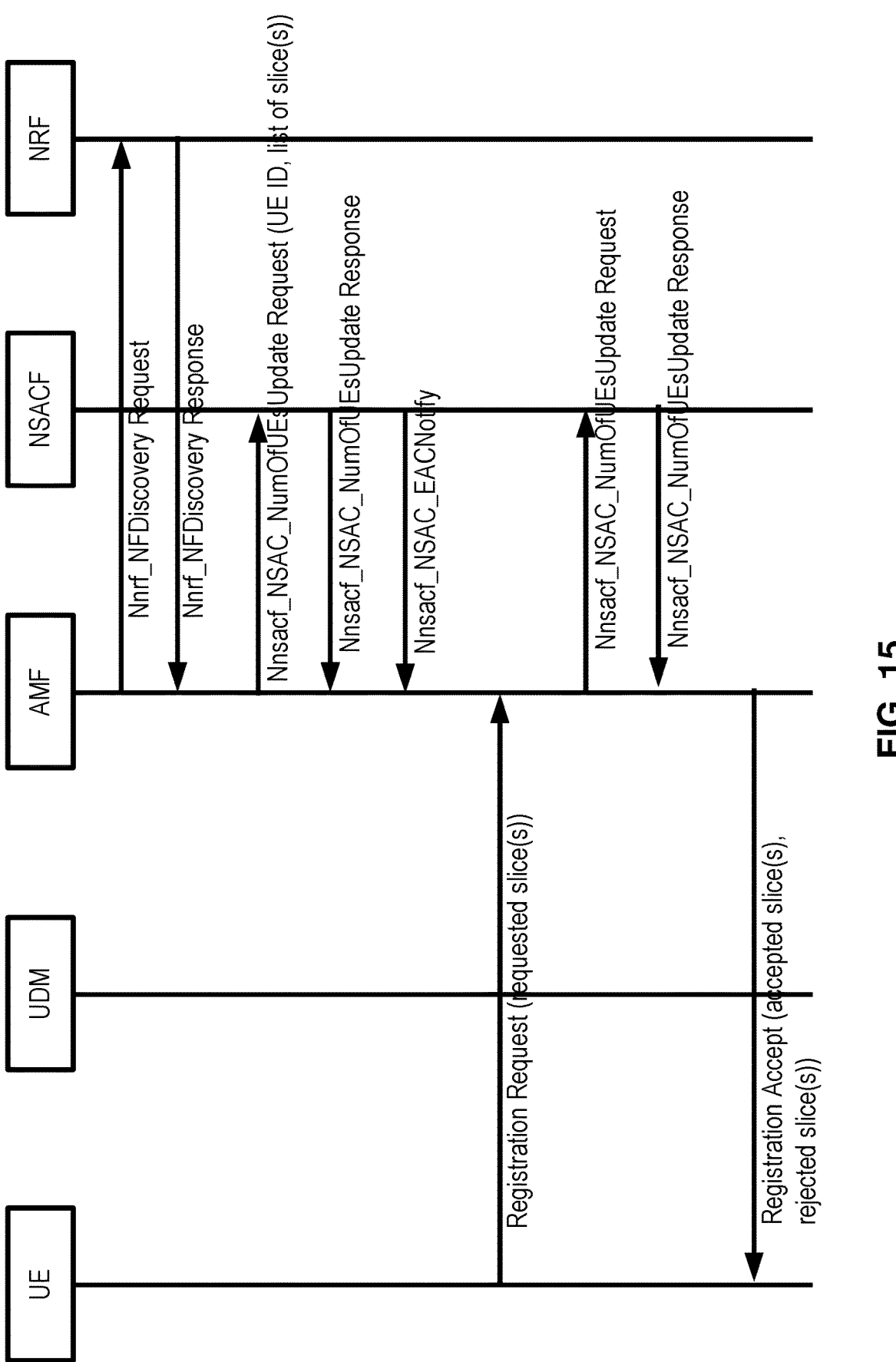
FIG. 15 is an example diagram of an aspect of an embodiment of the present disclosure

FIG. 15 depicts an example implementation of controlling admission to a network slice, by limiting the number of UEs registered for a network slice.

In an implementation, for a network slice, an AMF may be configured with the information indicating whether the network slice is subject to network slice admission control (NSAC). For the network slice subject to NSAC, to find a NSACF for the network slice, the AMF may perform NSACF discovery procedure. For example, the AMF may send Nnrf_NFDiscovery Request message to a NRF, requesting information of the NSACF which is in charge of the network slice. Based on the Nnrf_NFDiscovery Request, the AMF may receive Nnrf_NFDiscovery Response message from the NRF. The Nnrf_NFDiscovery Response message may comprise information of the NSACF. Based on the information of the NSACF received from the NRF, the AMF may send Nnsacf_NSAC_NumOfUEsUpdate Request message to the NSACF. The Nnsacf_NSAC_NumOfUEsUpdate Request may comprise at least one of identity of the network slice (e.g., S-NSSAI(s)), identity of UE(s) (e.g., SUPI), NF ID, access type, update flag. The NF ID may indicate the identity of the network node which sends the Nnsacf_NSAC_NumOfUEsUpdate Request. The access type may indicate an access type over which the UE(s) requests registration. The update flag may indicate whether the number of UEs registered with the network slice needs to be increased or decreased. In response to the Nnsacf_NSAC_NumOfUEsUpdate Request, the AMF may receive Nnsacf_NSAC_NumOfUEsUpdate Response message from the NSACF. The Nnsacf_NSAC_NumOfUEsUpdate Response message may comprise a result indication. The result indication may comprise an outcome of update and/or check operation in the NSACF, may comprise indication of whether 'maximum number of UEs for the S-NSSAI not reached' or 'maximum number of UEs for the S-NSSAI reached'.

In an example of FIG. 15, the NSACF may send Nnsacf_NSAC_EACNotify message to the AMF. The NSACF may send the Nnsacf_NSAC_EACNotify message to one or more network nodes (e.g., AMFs) to indicate activation or deactivation of Early Availability Check (EAC) mode for the network slice. The EAC mode may indicate whether the AMF needs to check with the NSACF before it determines to allow the UE to register with the network slice. For example, for the network slice subject to NSAC, when the number of the UEs registered with the network slice is above certain threshold (e.g., 100 UEs, 500 UEs, 20%, 50%), the NSACF may activate the EAC mode. The NSACF may send the Nnsacf_NSAC_EACNotify message to one or more network nodes (e.g., AMFs) to indicate deactivation of Early Availability Check (EAC) mode for the network slice. For example, for the network slice subject to NSAC, when the number of the UEs registered with the network slice is below certain threshold (e.g., 90 UEs, 400 UEs, 10%, 40%), the NSACF may deactivate the EAC mode. The Nnsacf_NSAC_EACNotify message may comprise at least one of the identity of the network slice and/or EAC flag. The EAC flag may indicate whether the EAC mode is deactivated or activated for the network slice. When the number of registered UE for the network slice is low, the EAC mode may be deactivated to reduce signaling between the AMF and the NSACF. In the example of FIG. 15, the NSACF may indicate to the AMF that the EAC mode is activated.

In an implementation, the AMF may receive a registration request message from a UE. The registration message may comprise at least one of the identity of the UE and/or the list of one or more identities of one or more requested network slices. One or more network slices requested by the UE may be subject to NSAC. For one or more network slices subject to NSAC, the AMF may determine for which one or more network slices NSAC is required. For one or more requested network slices which requires NSAC, the AMF may determine whether the EAC mode is activated.

In an implementation, for a requested network slice for which the EAC mode is activated, the AMF may send Nnsacf_NSAC_NumOfUEsUpdate Request message to the NSACF. The Nnsacf_NSAC_NumOfUEsUpdate Request may comprise the update flag indicating that the number of UEs registered for the network slice is to be increased. Based on the received Nnsacf_NSAC_NumOfUEsUpdate Request, the NSACF may determine whether the number of UEs registered for the network slice reaches the maximum number of UEs registered for the network slice. If the maximum number of UEs registered for the network slice is not reached, the NSACF may send to the AMF the Nnsacf_NSAC_NumOfUEsUpdate Response comprising indication of the maximum number of UEs registered with the network slice not reached. If the maximum number of UEs registered for the network slice is reached, the NSACF may send to the AMF the Nnsacf_NSAC_NumOfUEsUpdate Response comprising indication of the maximum number of UEs registered with the network slice reached.

In an implementation, based on the received Nnsacf_NSAC_NumOfUEsUpdate Response, the AMF may send a registration response message to the UE. For example, the registration response message may comprise at least one of a registration accept message or registration reject message to the UE. For example, the registration response message may comprise at least one of a list of one or more accepted network slices and/or a list of at least one or more rejected network slices. Based on the response from the NSACF indicating the maximum number of UEs registered with the network slice reached, the AMF may include the network slice in the list of one or more rejected network slices. Based on the response from the NSACF indicating the maximum number of UEs registered with the network slice not reached, the AMF may include the network slice in the list of one or more accepted network slices.

Figure 16:
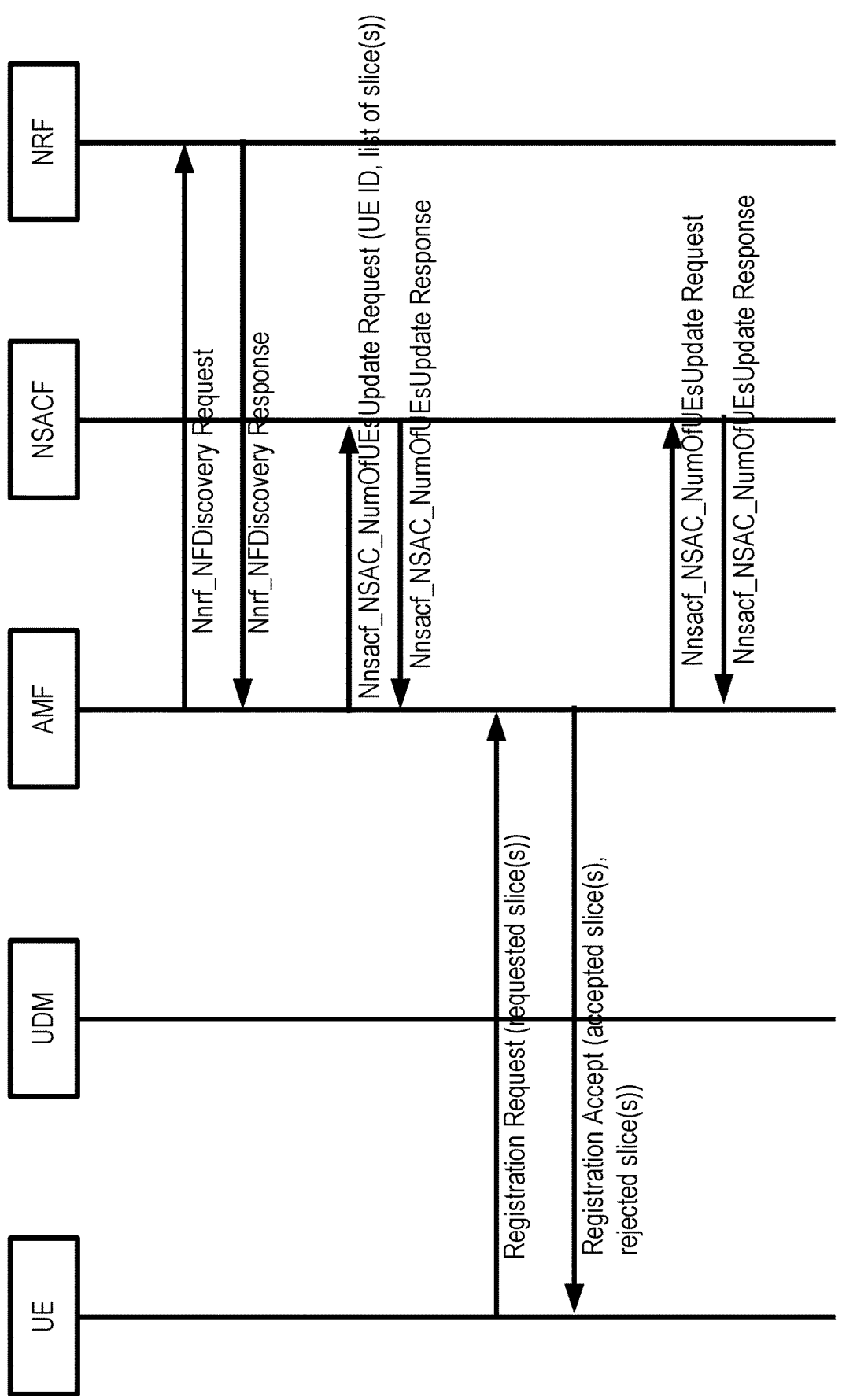
FIG. 16 is an example diagram of an aspect of an embodiment of the present disclosure.

FIG. 16 depicts an example implementation of network slice admission control. In the example of FIG. 16, a NSACF may determine not to activate an EAC mode for a network slice for which NSAC applies. For example, an AMF may determine that the EAC mode is deactivated for the network slice, based on that a NSACF does not send any Nnsacf_NSAC_EACNotify message to the AMF for the network slice. For example, the AMF may determine that the EAC mode is deactivated for the network slice, based on that the NSACF sends Nnsacf_NSAC_EACNotify message indicating deactivation of the EAC mode for the network slice.

In an implementation, the AMF may receive a registration request from a UE. The registration request may comprise one or more identities of one or more requested network slices. The one or more identities of one or more requested network slices may comprise at least the network slice for which NSAC applies. Based on that the EAC mode is deactivated for the network slice, the AMF may determine to allow the network slice for the UE. For example, the AMF may send to the UE, a registration accept message comprising a list of one or more accepted network slices including the network slice. Based on sending the registration accept message to the UE, the AMF may send to the NSACF, Nnsacf_NSAC_NumOfUEsUpdate Request message. The Nnsacf_NSAC_NumOfUEsUpdate Request may comprise at least of the update flag indicating that the number of UEs registered for the network slice is to be increased and/or the identity of the UE. Based on the received Nnsacf_NSAC_NumOfUEsUpdate Request, the NSACF may determine whether the UE is already included in the list of UEs registered for the network slice. Based on the received Nnsacf_NSAC_NumOfUEsUpdate Request, the NSACF may determine whether the number of UEs registered for the network slice reaches the maximum number of UEs registered for the network slice. If the maximum number of UEs registered for the network slice is not reached, the NSACF may send to the AMF the Nnsacf_NSAC_NumOfUEsUpdate Response comprising indication of the maximum number of UEs registered with the network slice not reached. If the maximum number of UEs registered for the network slice is reached, the NSACF may send to the AMF the Nnsacf_NSAC_NumOfUEsUpdate Response comprising indication of the maximum number of UEs registered with the network slice reached.

Figure 17:
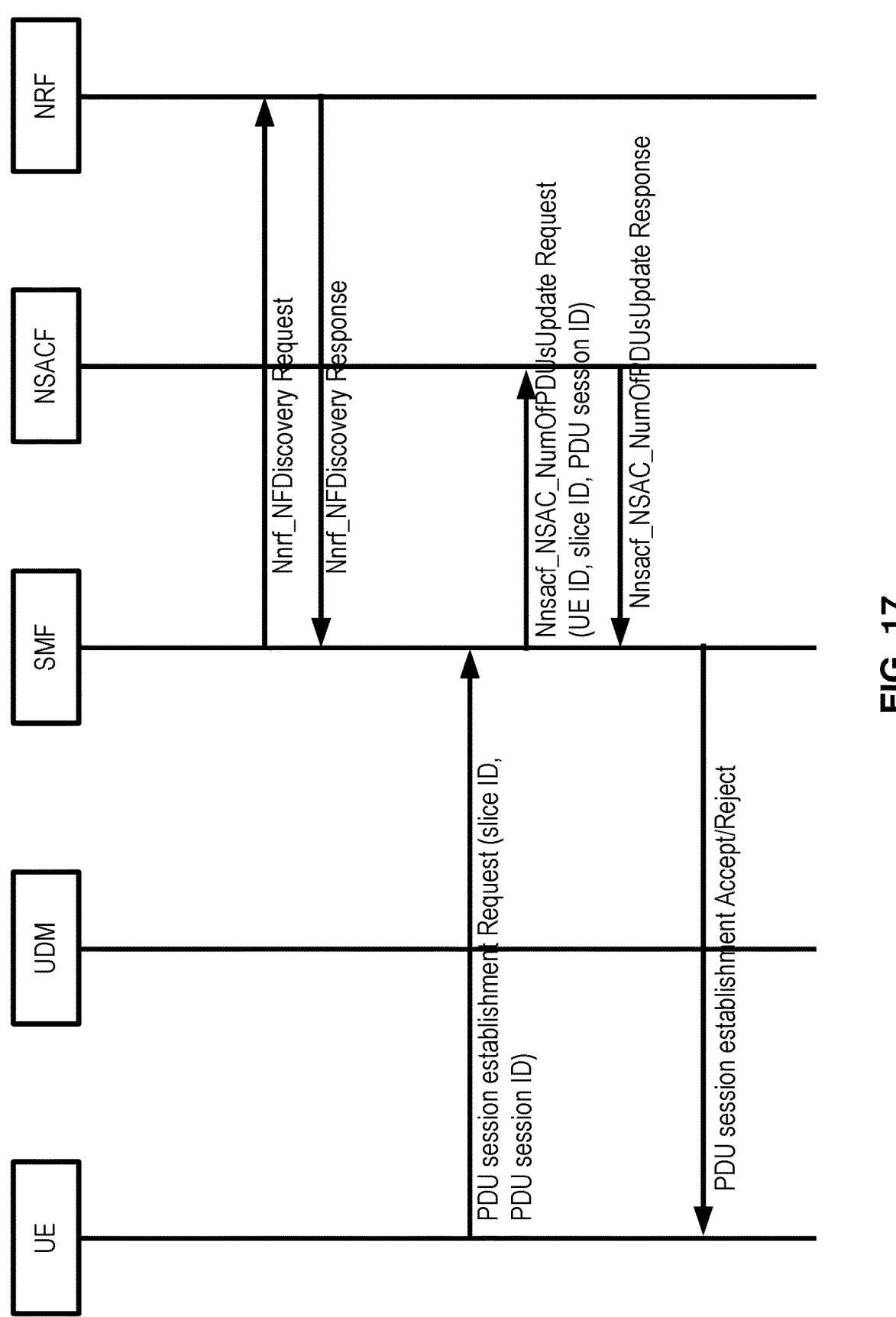
FIG. 17 is an example diagram of an aspect of an embodiment of the present disclosure.

FIG. 17 depicts an example implementation of controlling admission to a network slice, by limiting the number of PDU sessions established for a network slice.

In an implementation, for a network slice, an SMF may be configured with an information indicating whether the network slice is subject to NSAC (Network slice admission control). For the network slice subject to NSAC, the SMF may perform NSACF discovery procedure. For example, the SMF may send Nnrf_NFDiscovery Request message to a NRF, requesting information of the NSACF which is in charge of the network slice. Based on the Nnrf_NFDiscovery Request, the SMF may receive Nnrf_NFDiscovery Response message from the NRF. The Nnrf_NFDiscovery Response message may comprise information of the NSACF.

In an implementation, the SMF may receive a PDU session establishment request message from a UE. The PDU session establishment request may comprise at least one of a PDU session ID for a PDU session, identity of a network slice over which the PDU session is to be established, QoS parameter for the PDU session. Based on the identity of the network slice of the PDU session establishment request, the SMF may send Nnsacf_NSAC_NumOfPDUsUpdate Request message to the NSACF. The Nnsacf_NSAC_NumOfPDUsUpdate Request may comprise at least one of identity of the network slice (e.g., S-NSSAI(s)), identity of UE(s) (e.g., SUPI), PDU session ID, NF ID, access type, update flag. The NF ID may indicate the identity of the network node which sends the Nnsacf_NSAC_NumOfPDUsUpdate Request. The PDU session ID may indicate an identity of PDU session requested to be established by the UE. The access type may indicate an access type over which the UE(s) requests establishment of the PDU session. The update flag may indicate whether the number of PDU sessions established for the network slice needs to be increased or decreased. In response to the Nnsacf_NSAC_NumOfPDUsUpdate Request, the SMF may receive Nnsacf_NSAC_NumOfPDUsUpdate Response message from the NSACF. The Nnsacf_NSAC_NumOfPDUsUpdate Response message may comprise a result indication. The result indication may comprise an outcome of update and/or check operation in the NSACF for the network slice, may comprise indication of whether maximum number of PDU sessions for the S-NSSAI not reached or maximum number of PDU sessions for the S-NSSAI reached. Based on the received Nnsacf_NSAC_NumOfPDUsUpdate Response message, the SMF may send a response message to the UE.

The response message may comprise at least one of PDU session establishment accept message and/or PDU session establishment reject message. For example, if the response from the NSACF comprises indication of maximum number of PDU sessions for the S-NSSAI not reached, the SMF may send to the UE the PDU session establishment accept message. For example, if the response from the NSACF comprises indication of maximum number of PDU sessions for the S-NSSAI reached, the SMF may send to the UE the PDU session establishment reject message.

In an example, a timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to change of the value). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a network slice inactivity window timer (e.g., a NS UE monitoring timer, a NS PDU monitoring timer) may be used for measuring a window of time for measuring the network slice inactivity. In an example, instead of starting and expiry of a network slice inactivity window timer, the time difference between two time stamps may be used. When a timer is restarted, a process for measurement of time window may be restarted. Other example implementations may be provided to restart a measurement of a time window.

Figure 18:
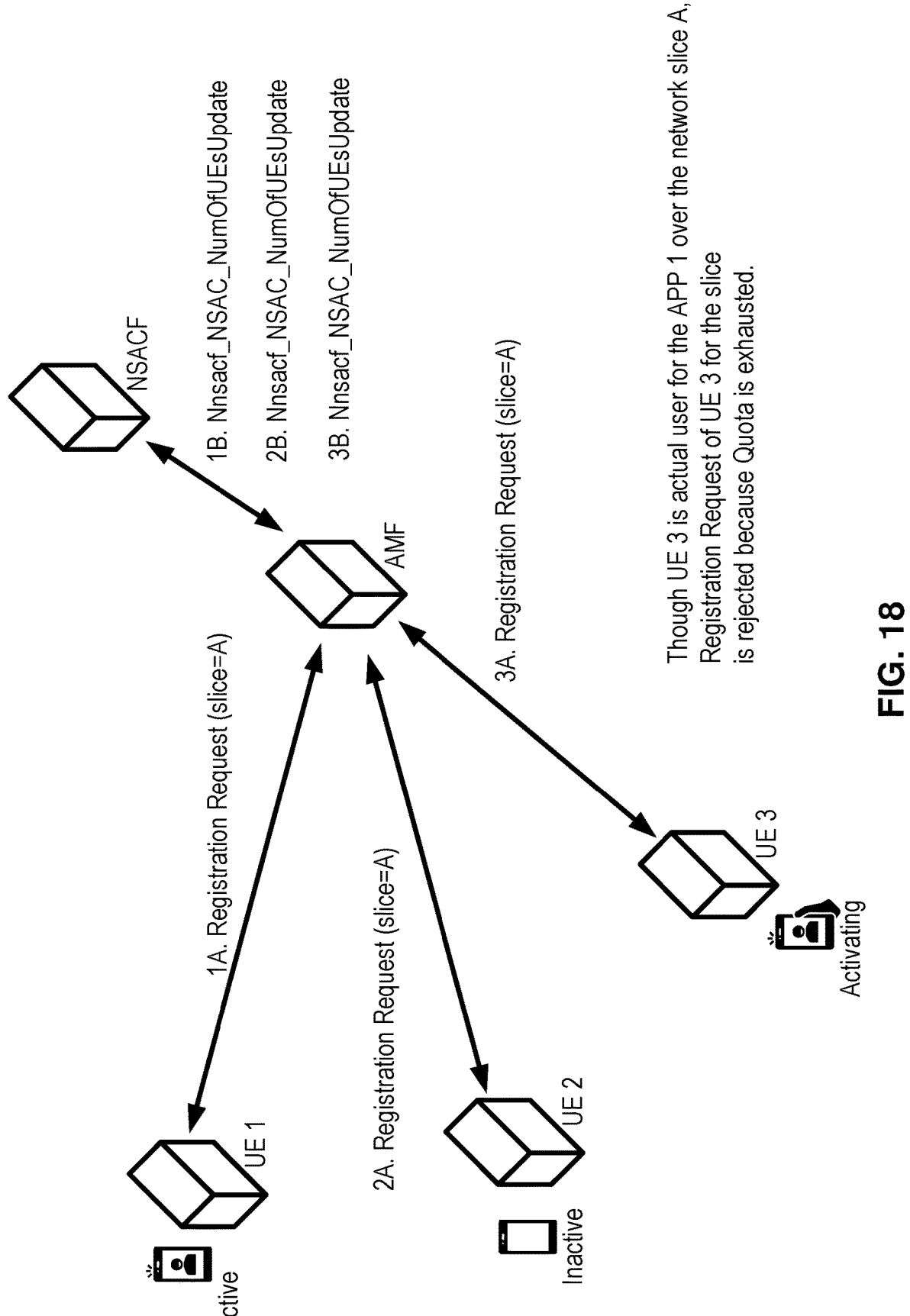
FIG. 18 is an example diagram of an aspect of an embodiment of the present disclosure.

FIG. 18 depicts an example implementation in which one or more UEs perform registration with a network slice (slice A) for which NSAC applies. The one or more UEs may comprise a first UE (UE1), a second UE (UE2) and/or a third UE (UE3). In an example, a NSACF in charge of NSAC for the network slice may be configured with a maximum number of UEs registered for the network slice. In one example, the maximum number may be set to two UEs. The first UE may send, to an AMF, a first registration request message comprising a list of requested network slices comprising the network slice (slice A). Based on the received first registration request message and that NSAC applies to the network slice, the AMF may send, to the NSACF, a first Nnsacf_NSAC_NumOfUEsUpdate request message. The first Nnsacf_NSAC_NumOfUEsUpdate request message may comprise an identifier of the first UE and/or the identifier of the network slice. Based on the first Nnsacf_N-SAC_NumOfUEsUpdate request message and that a number of UEs registered with the network slice is zero, the NSACF may determine to allow the registration of the first UE for the network slice. Based on the determination, the NSACF may increment the number of UEs registered with the network slice from zero to one. Based on the determination, the NSACF may send, to the AMF, a first Nnsacf_N-SAC_NumOfUEsUpdate response message comprising a result indication that the maximum number of UEs registered for the network slice is not reached. Based on the first response message from the NSACF, the AMF may send, to the first UE, a first registration accept message comprising a list of one or more accepted network slices. The list of one or more accepted network slices may comprise an identifier of the network slice (e.g., slice A). The second UE may send, to the AMF, a second registration request message comprising a list of requested network slices including the network slice (slice A). Based on the received second registration request message and that NSAC applies to the network slice, the AMF may send to the NSACF, a second Nnsacf_N-SAC_NumOfUEsUpdate request message. The second Nnsacf_NSAC_NumOfUEsUpdate request message may comprise an identifier of the second UE and/or the identifier of the network slice. Based on the second Nnsacf_N-SAC_NumOfUEsUpdate request message and that the number of UEs registered with the network slice is one, the NSACF may determine to allow the registration of the second UE for the network slice. Based on the determination, the NSACF may increment the number of UEs registered with the network slice from one to two. Based on the determination, the NSACF may send to the AMF, a second Nnsacf_NSAC_NumOfUEsUpdate response message comprising a result indication that the maximum number of UEs registered for the network slice is not reached. Based on the second response message from the NSACF, the AMF may send, to the second UE, a second registration accept message comprising a list of one or more accepted network slices. The list of one or more accepted network slices may comprise the identifier of the network slice (e.g., slice A). The third UE may send, to the AMF, a third registration request message comprising a list of requested network slices including the network slice. Based on the received third registration request message and that NSAC applies to the network slice, the AMF may send to the NSACF, a third Nnsacf_NSAC_NumOfUEsUpdate request message. The third Nnsacf_NSAC_NumOfUEsUpdate request message may comprise an identifier of the third UE and/or the identifier of the network slice. Based on the third Nnsacf_N-SAC_NumOfUEsUpdate request message and that the number of UEs registered with the network slice is two, the NSACF may determine to reject/deny the registration of the third UE for the network slice. Based on the determination, the NSACF may send, to the AMF, a third Nnsacf_N-SAC_NumOfUEsUpdate response message comprising a result indication that the maximum number of UE registered for the network slice is reached. Based on the third response message from the NSACF, the AMF may send, to the third UE, a registration response message (e.g., a registration accept message and/or a registration reject message) comprising at least a list of one or more rejected network slices. The list of one or more rejected network slices may comprise the network slice (slice A).

In an example, the first UE may be used by an application (e.g., a user, a software) which has a data to send and/or to receive over the network slice. In an example, the second UE may not have an application which has a data to send over the network slice. In an example, the third UE may be used by an application which has a data to send over the network slice. In the existing implementation, the AMF and/or the NSACF may not consider whether the one or more UEs have a data to send or not for the network slice. For example, the AMF and/or the NSACF may allow the second UE to register with the network slice and/or respond to the second UE with the list of one or more accepted network slices comprising the network slice. For example, the AMF and/or the NSACF may not allow the third UE to register with the network slice and/or responds to the third UE with the list of one or more rejected network slices comprising the network slice. In the existing technologies, the AMF and/or the NSACF may not consider actual activity of one or more UEs, for example, UEs having data to send and/or receive over the network slice. As a consequence, the AMF and/or the NSACF may not be able to allocate network slice resources to those one or more UEs having data to send and/or receive over the network slice, degrading user service experience for those one or more UEs. In the existing technologies, the AMF and/or the NSACF may not consider actual activity of one or more UEs, for example, UEs not having data to send and/or receive over the network slice. As a consequence, the AMF and/or the NSACF may allocate network slice resources to those one or more UEs not having data to send and/or receive over the network slice, leading to inefficient use of network resources.

Figure 19:
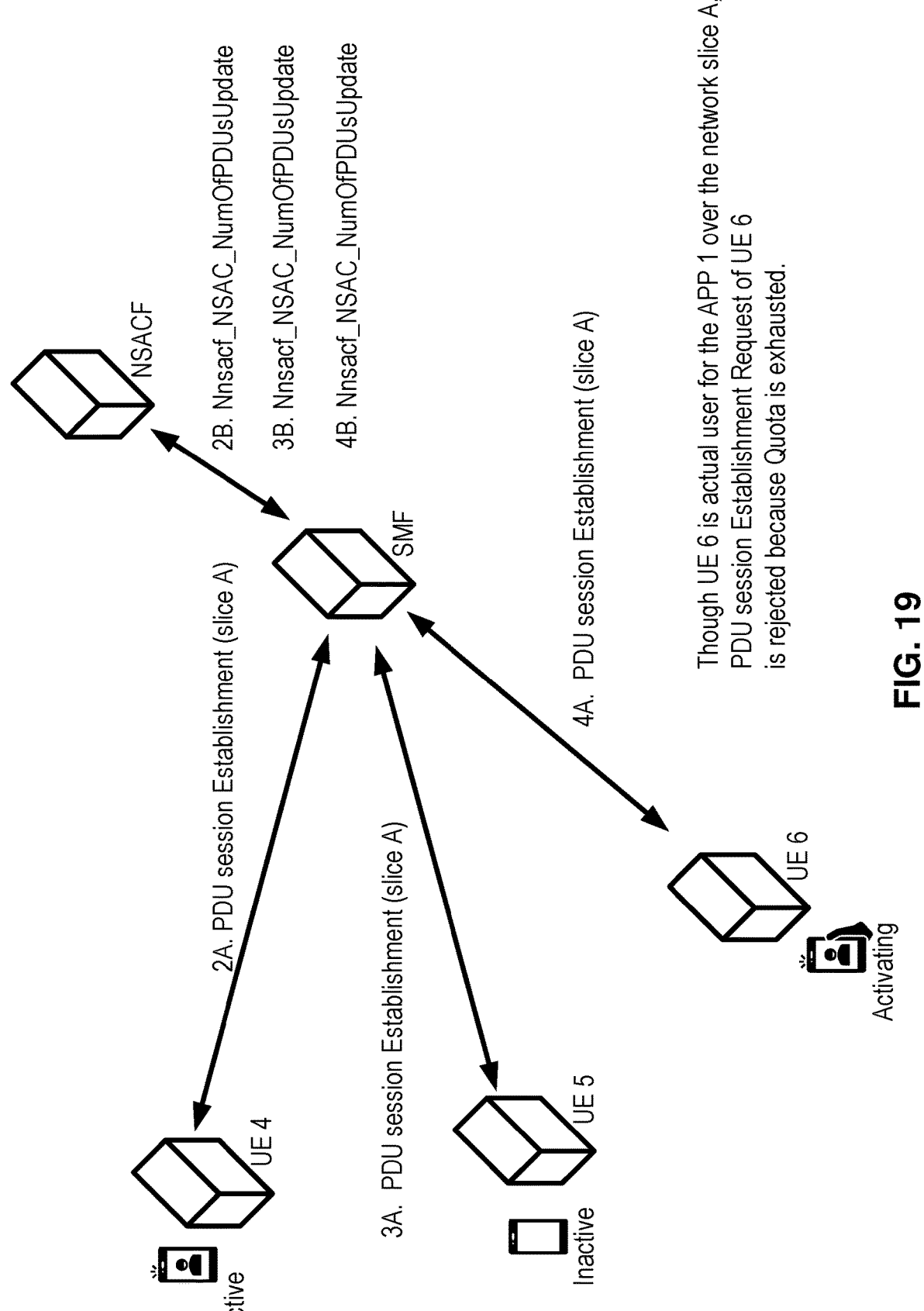
FIG. 19 is an example diagram of an aspect of an embodiment of the present disclosure.

FIG. 19 depicts an example implementation in which one or more UEs perform PDU session establishment procedure for a network slice (e.g., slice A) for which NSAC applies. The one or more UEs may comprise a first UE (UE4), a second UE (UE5), and/or a third UE (UE6). In an example, a NSACF in charge of NSAC for the network slice may be configured with a maximum number of PDU sessions established for the network slice. In one example, the maximum number may be set to two. The first UE may send, to an SMF, a first PDU session establishment request message comprising an identifier of the network slice. Based on the received first PDU session establishment request message and that NSAC applies to the network slice, the SMF may send to the NSACF, a first Nnsacf_NSAC_NumOfPDUsUpdate request message. The first Nnsacf_NSAC_NumOfPDUsUpdate request message may comprise an identifier of the first UE and/or the identifier of the network slice and/or the identifier of a PDU session. Based on the first Nnsacf_NSAC_NumOfPDUsUpdate request message and that a number of PDU sessions established with the network slice is zero, the NSACF may determine to allow the establishment of the PDU session of the first UE for the network slice. Based on the determination, the NSACF may increment the number of PDU sessions established with the network slice from zero to one. Based on the determination, the NSACF may send, to the SMF, a first Nnsacf_NSAC_NumOfPDUsUpdate response message comprising a result indication that the maximum number of PDU sessions for the network slice is not reached. Based on the first response message from the NSACF, the SMF may send, to the first UE, a first PDU session establishment accept message. The second UE may send, to an SMF, a second PDU session establishment request message comprising an identifier of the network slice. Based on the received second PDU session establishment request message and that NSAC applies to the network slice, the SMF may send, to the NSACF, a second Nnsacf_NSAC_NumOfPDUsUpdate request message. The second Nnsacf_NSAC_NumOfPDUsUpdate request message may comprise an identifier of the second UE and/or the identifier of the network slice. Based on the second Nnsacf_NSAC_NumOfPDUsUpdate request message and that the number of PDU sessions established with the network slice is one, the NSACF may determine to allow the establishment of a PDU session of the second UE for the network slice. Based on the determination, the NSACF may increment the number of PDU sessions established with the network slice from one to two. Based on the determination, the NSACF may send, to the SMF, a second Nnsacf_NSAC_NumOfPDUsUpdate response message comprising a result indication that the maximum number of PDU session is not reached. Based on the second response message from the NSACF, the SMF may send, to the second UE, a second PDU session establishment accept message. The third UE may send, to an SMF, a third PDU session establishment request message comprising the identifier of the network slice. Based on the received third PDU session establishment request message and that NSAC applies to the network slice, the SMF may send, to the NSACF, a third Nnsacf_NSAC_NumOfPDUsUpdate request message. The third Nnsacf_NSAC_NumOfPDUsUpdate request message may comprise an identifier of the third UE and/or the identifier of the network slice. Based on the third Nnsacf_NSAC_NumOfPDUsUpdate request message and that the number of PDU sessions established with the network slice is two, the NSACF may determine to reject the establishment of a PDU session of the third UE for the network slice. Based on the determination, the NSACF may send, to the SMF, a third Nnsacf_NSAC_NumOfPDUsUpdate response message comprising a result indication that the maximum number of PDU sessions is reached. Based on the third response message from the NSACF, the SMF may send, to the third UE, a first PDU session establishment reject message.

In an example, the first UE may be used by an application (e.g., a user, a software) that has a data to send and/or to receive over the network slice. In an example, the second UE may not have an application which has a data to send over the network slice. In an example, the third UE may be used by an application which has a data to send over the network slice. In existing implementations, the SMF and/or the NSACF does not consider whether the one or more UEs have a data to send or not. For example, the SMF and/or the NSACF may allow the second UE to establish the PDU session for the network slice. For example, the SMF and/or the NSACF may not allow the third UE to establish the PDU session for the network slice. In existing technologies, the SMF and/or the NSACF do not consider actual activity of one or more UEs and do not allocate network slice resources to one or more UEs with data to send and/or receive over the network slice, degrading user service experience. In existing technologies, the SMF and/or the NSACF do not consider actual activity of one or more UEs and allocate network slice resources to one or more UEs without data to send and/or receive over the network slice, leading to inefficient use of network resources.

Figure 20:
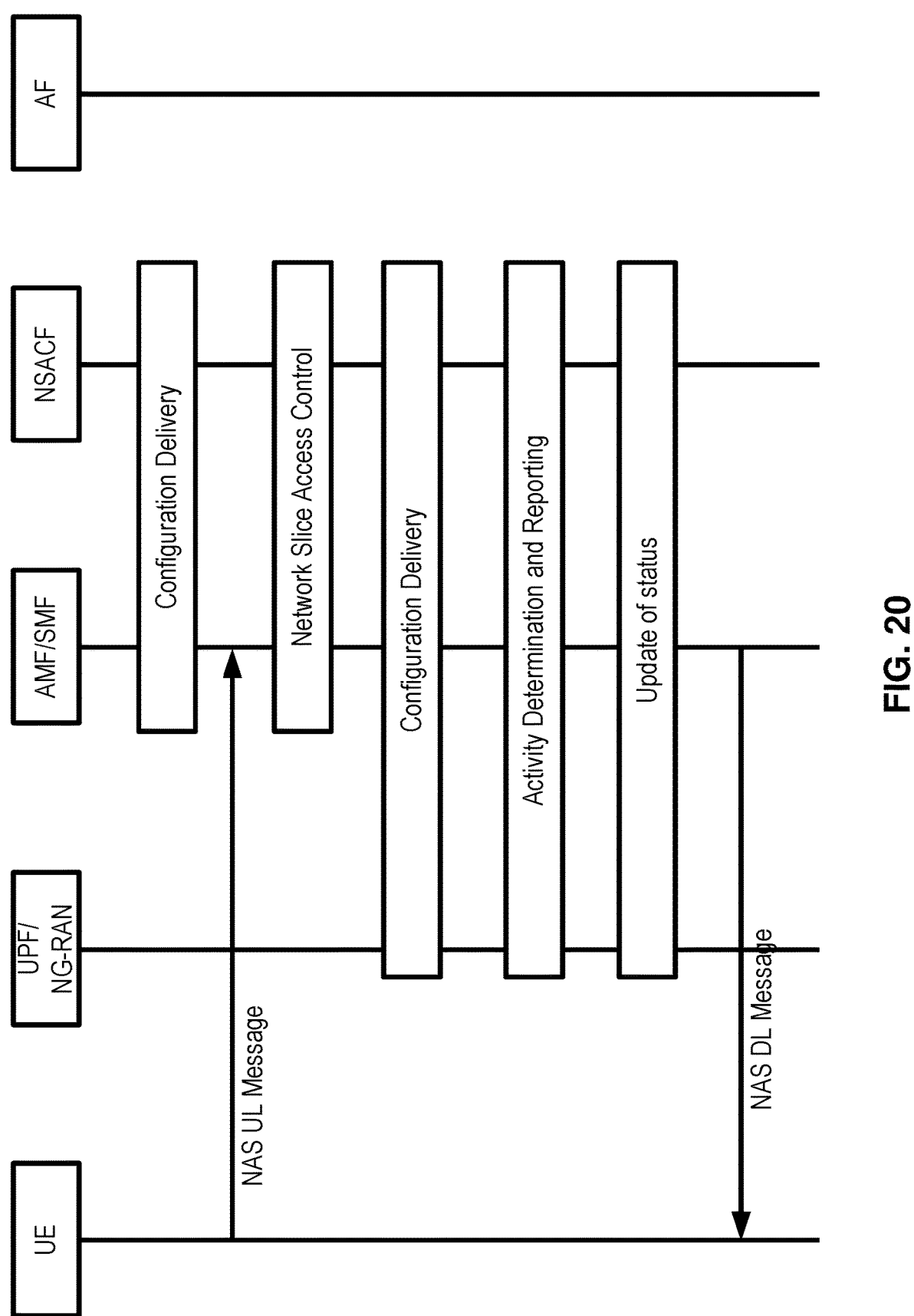
FIG. 20 is an example diagram of an aspect of an embodiment of the present disclosure.

As depicted in FIG. 20, example embodiments of the present disclosure improve system efficiency and management of network slice resource by using signaling enhancement among network nodes, UEs, and/or the like. For example, with configuration information delivery for a network slice quota management, one or more network nodes may determine activities of one or more UEs and/or activities of one or more PDU sessions over the network slice. For example, based on the determined activities over the network slice for network slice quota management, one or more network nodes may report and/or share information to adjust the use of the network slice for one or more UEs and/or for one or more PDU sessions. For example, for a network slice, one or more network nodes may track activity status for one or more PDU sessions and/or for one or more UEs, for network slice quota management. For example, for a network slice, one or more network nodes may determine whether to release one or more PDU sessions and/or to deactivate one or more PDU sessions and/or to keep one or more PDU sessions, based on data communication activity associated with the network slice and/or based on status of network slice quota of the network slice. For example, for a network slice, the one or more network nodes may determine whether to update registration status of one or more UEs, based on the activity of the one or more UEs and/or based on status of network slice quota of the network slice. The example embodiments of the present disclosure support efficient allocation of network slice resources among one or more UEs and/or one or more PDU sessions.

In the specification, the term "NG-RAN" may be interpreted as a base station, which may comprise at least one of a gNB, an eNB, a ng-eNB, a NodeB, an access node, an access point, an N3IWF, a relay node, a base station central unit (e.g., gNB-CU), a base station distributed unit (e.g., gNB-DU), and/or the like.

In the specification, the term "AMF" may be interpreted as a core network device, which may comprise at least one of a mobility management function/entity, an access management function, and/or the like. In the specification, the term "SMF" may be interpreted as a core network device, which may comprise at least one of a session management function/entity, a serving gateway, a PDN gateway, and/or the like.

In the specification, the term "NSACF" may be interpreted as a core network device, which may comprise at least one of a network slice admission management function/entity, a network slice access management function, network slice quota management function/entity, activity-based network slice admission control function/entity and/or the like.

In the specification, the term "core network node" may be interpreted as a core network device, which may comprise at least one of an AMF, a SMF, a NSSF, a UPF, a NRF a UDM, a PCF, a NSACF and/or the like. In the specification, the term "core network" may be interpreted as a core network node. In the specification, the term of "an access node" may be interpreted as a base station, which may comprise a NG-RAN, and/or the like. In the specification, the term "network node" may be interpreted as a core network node and/or an access node and/or a UE and/or the like.

In the specification, the term "network slice quota" for a network slice may be interpreted as a maximum number of UEs allowed to be registered for the network slice, a maximum number of PDU sessions allowed to be established for the network slice, a maximum number of PDU sessions allowed to be activated for the network slice, a maximum number of PDU sessions allowed to be deactivated for the network slice, and/or maximum number of countable resources for the network slice, and/or the like. In the specification, the term "quota" for a network slice may be interpreted as a network slice quota.

In the specification, the term "network slice admission control (NSAC)" may be interpreted as network slice quota management. In the specification, the network slice quota management for a network slice may comprise controlling access to the network slice. The network slice quota management for a network slice may comprise controlling admission to the network slice for a UE and/or for a PDU session and so on. For example, the network slice quota management may or may not allow establishment of a PDU session for the network slice. For example, the network slice quota management may or may not determine to allow a registration for the network slice.

In the specification, the term "activity-based network slice quota management" may be interpreted as network slice quota management based on activity of a UE and/or a PDU session for a network slice. In the specification, the term "activity-based network slice quota management" may be interpreted as activity-based network slice admission control (ABNSAC). For example, the ABNSAC may determine whether there is an activity (e.g., data exchange, signaling) for a network slice allowed for the UE. For example, the ABNSAC may determine whether there is an activity (e.g., data exchange) for/via the PDU session established for a network slice. For example, based on the determination, the ABNSAC may release/activate/deactivate/keep the PDU session and/or may reject/keep/disallow/deallocate registration of the network slice for the UE and/or may update/change allocation of network resources for the network slice. For example, the ABNSAC may comprise activating/deactivating/releasing resources allocated to the network slice. For example, the ABNSAC may or may not allow activation of an established PDU session for the network slice. For example, the ABNSAC may or may not determine to deactivate the established PDU session for the network slice. For example, the ABNSAC may or may not determine to release the established PDU session for the network slice. For example, the ABNSAC may or may not determine to request deregistration for the network slice.

Figure 21:
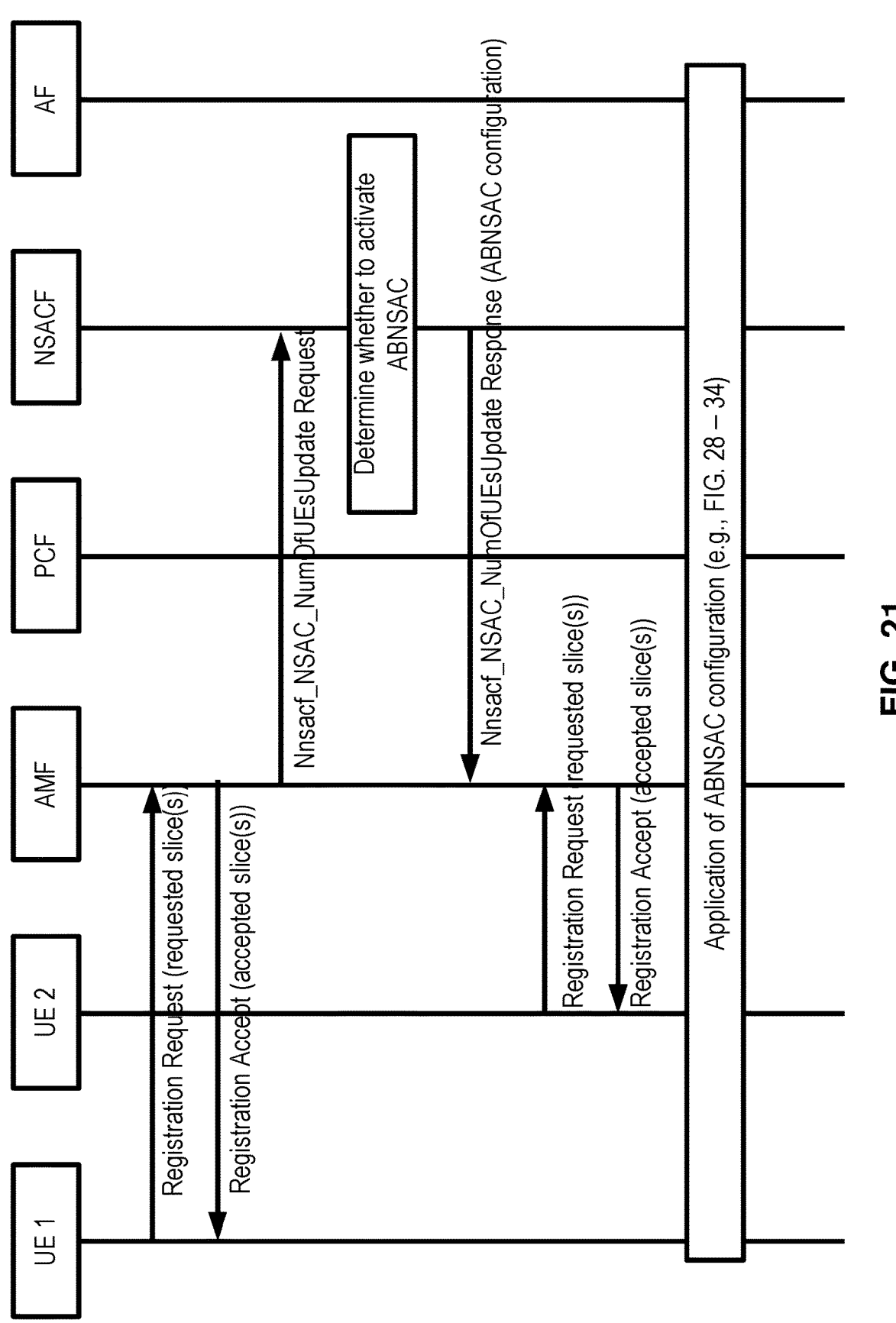
FIG. 21 is an example diagram of an aspect of an embodiment of the present disclosure.

FIG. 21 depicts one example embodiment of the present disclosure. In an example, one or more network nodes may generate and/or receive ABNSAC configuration for one or more UEs.

In an example, a UE (UE 1) may perform a registration procedure to a network, by sending a Registration Request message to an AMF. The Registration Request message may comprise a list of requested network slices. The list of requested network slices may comprise information of one or more network slices that the UE (UE 1) wants to register. For example, the information of one or more network slices may comprise one or more S-NSSAIs (Single Network Slice Selection Assistance Information), indicating one or more identifiers of the one or more network slices. For example, the list of requested network slices may comprise a first network slice (e.g., S-NSSAI 1), a second network slice (e.g., S-NSSAI 2), a fourth network slice (e.g., S-NSSAI 4), and/or a fifth network slice (e.g., S-NSSAI 5). In response to the Registration Request, the AMF may determine whether to allow or reject, for the UE (UE 1), each network slice indicated by the list of requested network slices. For example, based on that EAC mode is not activated for one or more network slices indicated in the list of requested network slices, the AMF may determine to allow the UE to register for the one or more network slices. Based on the determination to allow the one or more network slices, the AMF may respond to the UE (UE 1), by sending a Registration Accept message. The Registration Accept message may comprise at least one of a list of accepted network slices and/or a list of rejected network slices. The list of accepted network slices may comprise information of one or more network slices that the AMF allows the UE (UE 1) to register. For example, the list of accepted network slice may comprise an identifier of the first network slice (e.g., S-NSSAI 1). The list of rejected network slices may comprise information of one or more network slices that the AMF rejects the UE (UE 1) to register. For example, the list of rejected network slice may comprise an identifier of the second network slice (e.g., S-NSSAI 2).

In an example, for the registration procedure, the AMF may send to the NSACF, a Nnsacf service request (e.g., Nnsacf_NSAC_NumOfUEsUpdate Request) message. If one or more first-type network slices (e.g., S-NSSAI 1, S-NSSAI 2) indicated by the list of the requested network slices of the Registration Request message are set to subject to NSAC, the Nnsacf service request message to the NSACF may indicate the one or more first-type network slices. If one or more second-type network slices (e.g., S-NSSAI 4, S-NSSAI 5) in the list of requested network slices in the Registration Request message are not set to subject to NSAC, the Nnsacf service request message to the NSACF may not indicate the one or more second-type network slices. The Nnsacf service request may comprise at least one of a UE ID, information of one or more first-type network slices (e.g., S-NSSAI 1, S-NSSAI 2) subject to NSAC, and/or update flag. The update flag may indicate whether a number of UEs registered with a first-type network slice (e.g., of the one or more first-network slices) needs to be increased or decreased. For example, the update flag in the Nnsacf service request may indicate that the number of UEs registered with one or more first-type network slices (e.g., S-NSSAI 1) needs to be increased. For example, the update flag in the Nnsacf service request may indicate that the number of UEs registered with one or more second-type network slice (e.g., S-NSSAI-2, S-NSSAI 3) needs to be decreased.

Figure 27:
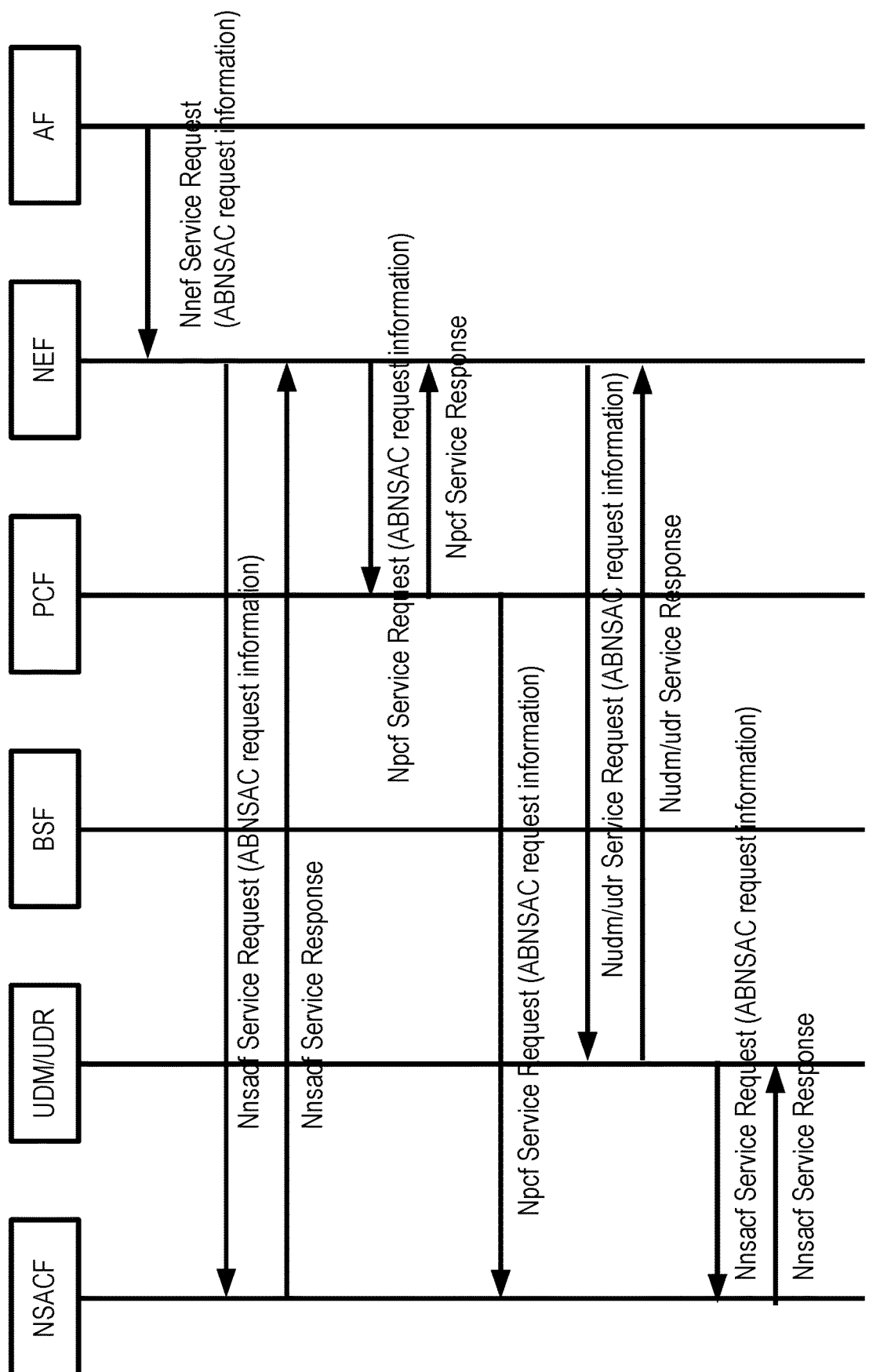
FIG. 27 is an example diagram of an aspect of an embodiment of the present disclosure.

In an example, based on the received Nnsacf service request (e.g., Nnsacf_NSAC_NumOfUEsUpdate Request) message, the NSACF may determine whether to activate and/or configure the ABNSAC. For example, if a number of UE registered for the first-type network slice (e.g., S-NSSAI 1) is above threshold (e.g., 100 UEs, 200 UEs, 80% of quota, 90% of quota), the NSACF may determine to activate the ABNSAC for the first-type network slice (e.g., S-NSSAI 1). For example, if a number of UE registered for the first-type network slice (e.g., S-NSSAI 2) is below threshold (e.g., 90 UEs, 150 UEs, 75% of quota, 85% of quota), the NSACF may determine not to activate ABNSAC for the first-type network slice (e.g., S-NSSAI 2). For example, for the determination of whether to activate the ABNSAC, the NSACF may use the ABNSAC request information, as shown in the example of FIG. 27.

In an example, in response to the received Nnsacf service request, the NSACF may send a Nnsacf service response (e.g., Nnsacf_NSAC_NumOfUEsUpdate Response) message to the AMF. Based on the determination of activating the ABNSAC for one or more network slices (e.g., S-NSSAI 1), the Nnsacf service response message may comprise ABNSAC configuration information for the one or more network slices. For example, the ABNSAC configuration information may indicate one or more network slices (e.g., S-NSSAI 1) for which the ABNSAC applies. For example, the ABNSAC configuration information may comprise at least one of one or more values for one or more network slice UE monitoring timers (NS UE monitoring timers) for the one or more network slices for which ABNSAC applies, a validity period information, and/or an area information. In an example, a NS UE monitoring timer (e.g., of the NS US monitoring timers in the ABNSAC configuration information) for a network slice may be used to indicate/control a time period during which the UE may be allowed to remain inactive for the network slice, the UE may not use the network slice, the UE may not send or receive signaling message for the network slice, and/or the UE may not send or receive user data for the network slice. For example, for the first network slice (e.g., S-NSSAI 1), the value for NS UE monitoring timer may be set to 30 second, 500 milliseconds, 60 seconds, and so on. In an example, the validity period information may comprise information of when the ABNSAC configuration information is used and/or valid for the one or more network slices. For example, the validity period information may indicate the start time (e.g., 9:00 AM) and/or end time (e.g., 10:00 AM). In an example, an area information may comprise information of where the ABNSAC configuration information is used/valid for the one or more network slices. For example, the area information may comprise one or more GPS coordinates, a list of TAs, a list of cells, and/or the like. The AMF may receive the Nnsacf service response message sent by the NSACF. The AMF may store the received ABNSAC configuration information of the Nnsacf service response message. Based on the ABNSAC configuration information, the AMF may determine to apply the ABNSAC for one or more network slices indicated by the ABNSAC configuration information. The AMF may store the ABNSAC configuration information.

In an example, a UE (UE 2) may perform a registration procedure to the network, by sending a Registration Request message to the AMF. The Registration Request message may comprise a list of requested network slices. The list of requested network slices may comprise information of one or more network slices that the UE (UE 2) wants to register. For example, the information of one or more network slices may comprise one or more S-NSSAIs (e.g., S-NSSAI 1, S-NSSAI 3).

In response to the Registration Request received from the UE (UE 2), the AMF may determine whether the ABNSAC applies to one or more network slices indicated by the list of the requested network slices. For example, based on that the one or more network slices are indicated in the ABNSAC configuration information, the AMF may determine that the ABNSAC applies to the one or more network slices. For example, based on that the ABNSAC configuration information comprises information of the S-NSSAI 1 and/or that the list of the requested network slices comprises the S-NSSAI 1, the AMF may determine that the ABNSAC applies for the S-NSSAI 1. For example, based on that the ABNSAC configuration does not comprise information of the S-NSSAI 3 and/or that the list of the requested network slices comprises the S-NSSAI 3, the AMF may determine that the ABNSAC does not apply for the S-NSSAI 3. In response to the received Registration Request message, the AMF may respond to the UE (UE 2) with the Registration Accept message. The Registration Accept message may comprise at least one of a list of allowed network slices and/or a ABNSAC configuration information. For example, the list of allowed network slices of the Registration Accept message may comprise information of one or more network slices (e.g., S-NSSAI 1, S-NSSAI 3). For example, the ABNSAC configuration information of the Registration Accept may comprise one or more information of the ABNSAC configuration information that the AMF has. For example, the ABNSAC configuration information that the AMF has may be the ABNSAC configuration information of the Nnsacf service response. Examples of usage of the ABNSAC configuration is further described in the FIG. 28, 29, 30, 31, 32, 33, 34.

Figure 22:
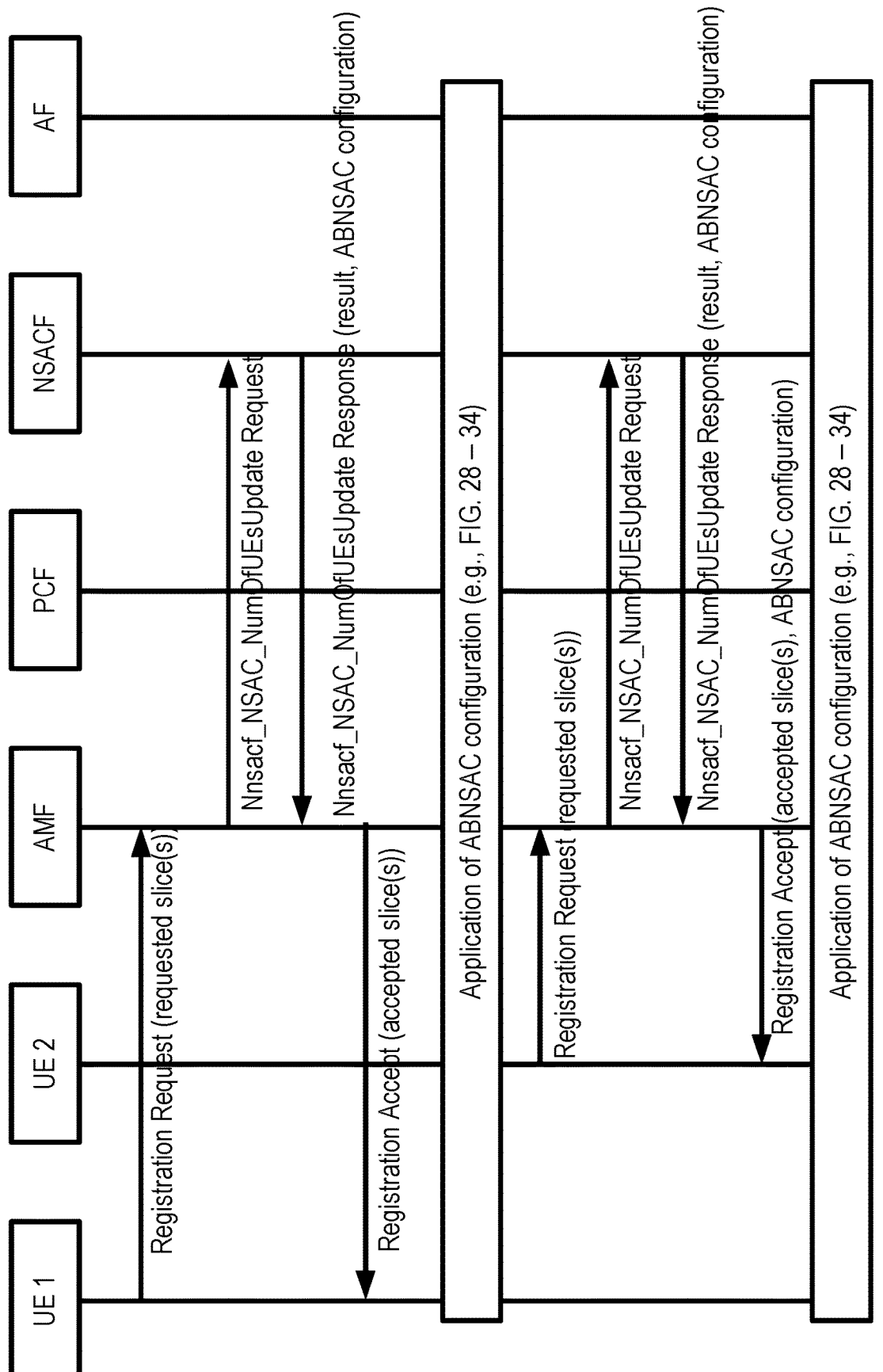
FIG. 22 is an example diagram of an aspect of an embodiment of the present disclosure.

FIG. 22 depicts one example embodiment of the present disclosure. In an example, one or more network nodes may generate and/or receive ABNSAC configuration for one or more UEs.

In an example, a UE (UE 1) may perform a registration procedure to a network, by sending a Registration Request message to an AMF. The Registration Request message may comprise a list of requested network slices. The list of requested network slices may comprise information of one or more network slices that the UE (UE 1) wants to register. For example, the information of one or more network slices may comprise one or more S-NSSAI (Single Network Slice Selection Assistance Information), indicating one or more identifiers of the one or more network slices. For example, the list of requested network slices may comprise a first network slice (e.g., S-NSSAI 1), a second network slice (e.g., S-NSSAI 2), a fourth network slice (e.g., S-NSSAI 4) and/or a fifth network slice (e.g., S-NSSAI 5). In response to the Registration Request, the AMF may determine whether to allow or reject, for the UE (UE 1), each network slice indicated by the list of requested network slices. For example, based on that EAC mode is activated for one or more network slices indicated in the list of requested network slices, the AMF may determine to send to a NSACF, a Nnsacf service request (e.g., Nnsacf_NSAC_NumOfUEsUpdate Request) message.

In an example, if one or more first-type network slices (e.g., S-NSSAI 1, S-NSSAI 2) indicated by the list of the requested network slices of the Registration Request message are set to subject to NSAC, the Nnsacf service request message to the NSACF may indicate the one or more first-type network slices. If one or more second-type network slices (e.g., S-NSSAI 4, S-NSSAI 5) indicated by the list of requested network slices in the Registration Request message are not set to subject to NSAC, the Nnsacf service request message to the NSACF may not indicate the one or more second-type network slices. The Nnsacf service request may comprise at least one of a UE ID, information of one or more first-type network slices (e.g., S-NSSAI 1, S-NSSAI 2) subject to NSAC, and/or update flag. The update flag may indicate whether a number of UEs registered with a first-type network slice (e.g., of the one or more first-type network slices) needs to be increased or decreased. For example, the update flag in the Nnsacf service request may indicate that the number of UEs registered with one or more network slices (e.g., S-NSSAI 1, S-NSSAI 2) needs to be increased. For example, the update flag in the Nnsacf service request may indicate that the number of UEs registered with one or more second-type network slice (e.g., S-NSSAI 3) needs to be decreased.

In an example, based on the received Nnsacf service request (e.g., Nnsacf_NSAC_NumOfUEsUpdate Request) message, the NSACF may determine whether to activate ABNSAC and/or configure the ABNSAC. The example of FIG. 21 may be used for the determination.

In an example, in response to the received Nnsacf service request, the NSACF may send a Nnsacf service response (e.g., Nnsacf_NSAC_NumOfUEsUpdate Response) message to the AMF. Based on the determination of activating the ABNSAC for one or more network slices (e.g., S-NSSAI 1, S-NSSAI 4, etc.), the Nnsacf service response message may comprise the ABNSAC configuration information for the one or more network slices.

In an example, the AMF may receive the Nnsacf service response message. The AMF may store the ABNSAC configuration information of the Nnsacf service response message. Based on the received Nnsacf service response and/or based on the Registration Request message from the UE (UE 1), the AMF may send a Registration Accept message to the UE (UE 1). The Registration Accept message may comprise at least one of a list of accepted network slices, a list of rejected network slices and/or the ABNSAC configuration information. The list of accepted network slices may comprise information of one or more network slices that the AMF allows the UE (UE 1) to register. For example, the list of accepted network slice may comprise information of the first network slice (e.g., S-NSSAI 1). The list of rejected network slices may comprise information of one or more network slices that the AMF rejects the UE (UE 1) to register. For example, the list of rejected network slice may comprise information of the second network slice (e.g., S-NSSAI 2). For example, the ABNSAC configuration information of the Registration Accept may comprise one or more information based on the ABNSAC configuration information of the Nnsacf service response. Examples of usage of the ABNSAC configuration is further described in the FIG. 28, 29, 30, 31, 32, 33, 34.

In an example, a UE (UE 2) may perform a registration procedure to the network, by sending a Registration Request message to the AMF. The Registration Request message may comprise a list of requested network slices. The list of requested network slices may comprise information of one or more network slices that the UE (UE 2) wants to register. For example, the information of one or more network slices may comprise one or more identifiers (e.g., S-NSSAI 1, S-NSSAI 3) of the one or more network slices. In response to the Registration Request, the AMF may determine whether to allow or reject, for the UE (UE 2, each network slice indicated by the list of requested network slices. For example, based on that EAC mode is activated for one or more network slices indicated in the list of requested network slices, based on that ABNSAC applies for one or more network slices indicated by the list of requested network slices, and/or based on the stored ABNSAC configuration, the AMF may determine to send to a NSACF, a Nnsacf service request (e.g., Nnsacf_NSAC_NumOfUEsUpdate Request) message.

In an example, if one or more network slices (e.g., S-NSSAI 1, S-NSSAI 3) indicated by the list of the requested network slices of the Registration Request message are set to subject to NSAC, for the one or more network slices, the AMF may send the Nnsacf service request message to the NSACF. The Nnsacf service request message may comprise at least one of a UE ID, information of one or more network slices subject to NSAC (e.g., S-NSSAI 1, S-NSSAI 3), and/or update flag.

In an example, based on that ABNSAC applies for one or more network slices of the received Nnsacf service request message, the NSACF may determine whether to keep activation of the ABNSAC and/or whether to deactivate the ABNSAC. For example, if the number of the UEs registered for a network slice (e.g., of the one or more network slices) is above threshold, the NSACF may keep the activation of the ABNSAC for the network slice. For example, if the number of the UEs registered for a network slice (e.g., of the one or more network slices) is below threshold, the NSACF may deactivate the ABNSAC for the network slice.

In an example, in response to the received Nnsacf service request, the NSACF may send a Nnsacf service response (e.g., Nnsacf_NSAC_NumOfUEsUpdate Response) message to the AMF. Based on the determination of keeping activation of the ABNSAC for one or more network slices (e.g., S-NSSAI 1), the Nnsacf service response message may comprise the ABNSAC configuration information for the one or more network slices.

In an example, based on the received Nnsacf service response and/or based on the Registration Request message from the UE (UE 2), the AMF may send a Registration Accept message to the UE. The Registration Accept message may comprise at least one of a list of accepted network slices, a list of rejected network slices, and/or a ABNSAC configuration information. The list of accepted network slices may comprise information of one or more network slices that the AMF allows the UE (UE 2) to register. For example, the list of accepted network slices may comprise information of the first network slice (e.g., S-NSSAI 1). For example, the ABNSAC configuration information of the Registration Accept may comprise one or more information based on the ABNSAC configuration information of the Nnsacf service response. The UE (UE 2) may store the received ABNSAC configuration information. Examples of usage of the ABNSAC configuration is further described in the FIG. 28, 29, 30, 31, 32, 33, 34.

Figure 23:
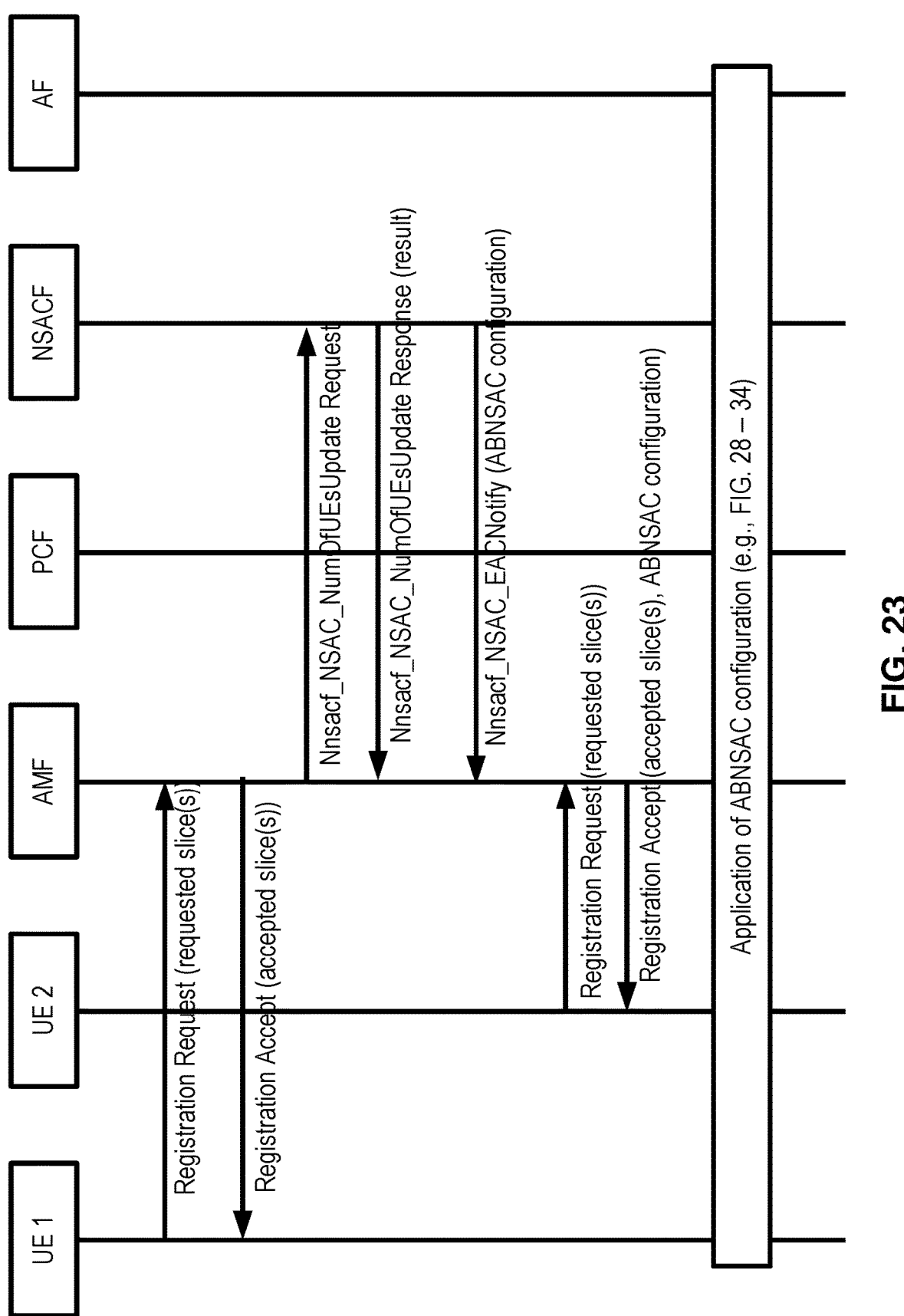
FIG. 23 is an example diagram of an aspect of an embodiment of the present disclosure.

FIG. 23 depicts one example embodiment of the present disclosure. In an example, one or more network nodes may generate and/or receive ABNSAC configuration for one or more UEs.

As shown in the example of FIG. 21, the UE (UE 1) may perform the registration procedure to the network by sending the Registration Request message to the AMF, the AMF may send the Registration Accept message to the UE, the AMF may send to the NSACF the Nnsacf service request message, and/or the AMF may receive from the NSACF the Nnsacf service response. In an example, the NSACF may store information (e.g., contact information, address) of the AMF. For example, the NSACF may use the stored information to communicate updated information regarding the ABNSAC.

In an example, the NSACF may determine to activate the EAC mode for a network slice. For example, if the number of UE registered for the first-type network slice (e.g., S-NSSAI 1) is above threshold (e.g., 100 UEs, 200 UEs, 80% of quota, 90% of quota), the NSACF may determine to activate the EAC mode for the first-type network slice (e.g., S-NSSAI 1). For example, if the number of UE registered for the first-type network slice (e.g., S-NSSAI 3) is below threshold (e.g., 90 UEs, 150 UEs, 75% of quota, 85% of quota), the NSACF may determine not to activate the EAC mode for the first-type network slice (e.g., S-NSSAI 3). If the NSACF determine to activate the EAC mode, the NSACF may determine to activate ABNSAC. For example, for the determination whether to activate the ABNSAC, the NSACF may use information (e.g., ABNSAC request information) received from an AF, as shown in the example of FIG. 27. Based on the determination to activate the EAC mode and/or the ABNSAC, the NSACF may send to the AMF, a Nnsacf_NSAC_EACNotify message to indicate activation of the EAC mode and/or the ABNSAC. The Nnsacf_NSAC_EACNotify message may comprise the ABNSAC configuration information. The AMF may store the ABNSAC configuration information received from the NSACF. Examples of usage of the ABNSAC configuration is further described in the FIG. 28, 29, 30, 31, 32, 33, 34.

In an example, as shown in the example of FIG. 21, the UE (UE 2) may send the Registration Request message to the AMF and/or the AMF may send the Registration Accept message to the UE. Based on that the ABNSAC configuration information comprises the one or more network slices indicated by the list of the requested network slices, the AMF may determine that the ABNSAC applies to the one or more network slices requested by the UE (UE 2). Based on that the ABNSAC applies for the one or more network slices, the AMF may respond to the UE (UE 2) with the Registration Accept message. The Registration Accept message may comprise at least one of a list of allowed network slices and/or the ABNSAC configuration information.

Figure 24:
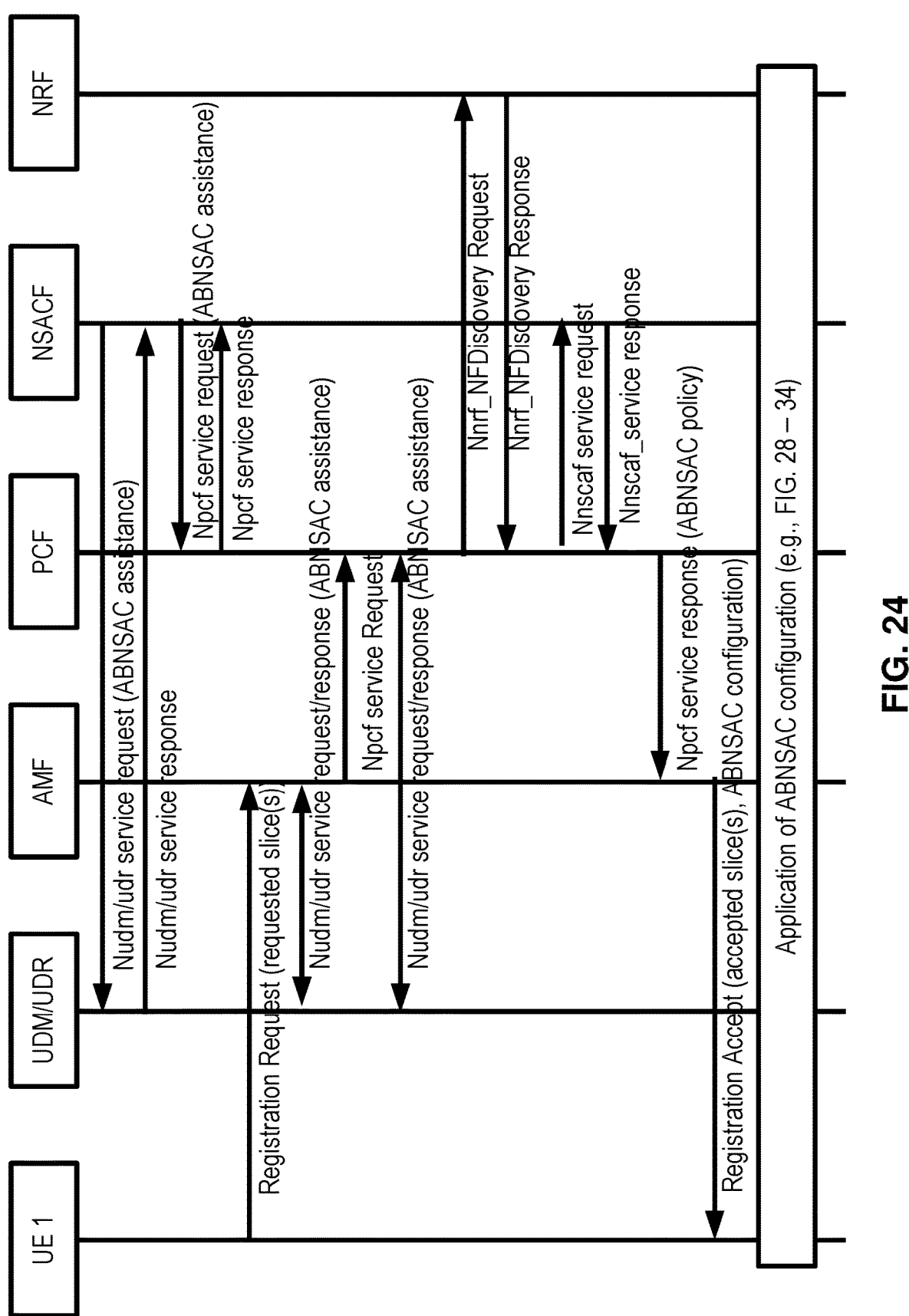
FIG. 24 is an example diagram of an aspect of an embodiment of the present disclosure.

FIG. 24 depicts one example embodiment of the present disclosure. In an example, one or more network nodes may generate and/or receive ABNSAC configuration for one or more UEs.

In an example, a NSACF may send to a UDM, a Nudm service request (e.g., Nudm_ParameterProvision_Create, Nudm_ServiceSpecificAuthorization_Create, and/or the like) message. The Nudm service request message may comprise at least one of:

ABNSAC assistance information. This may comprise at least one of ABNSAC configuration information, and/or assistance information related to determining ABNSAC configuration information. For example, this information may comprise a value for a timer to determine whether a UE and/or a PDU session is idle/inactive for a network slice. For example, this information may comprise a value for a timer to determine whether a UE and/or a PDU session needs to be deactivated or to be released. For example, this information may comprise an information necessary to determine the value for the timer.

Expected UE Behaviour parameters: This may comprise information related to potential mobility of a UE.

Network Configuration parameters: This may comprise information related to communication availability and/or reachability of a UE.

Service Parameters: This may be a service specific information which needs to be provisioned in a network and/or a UE for the service associated with a network slice.

For the received Nudm service request message, the UDM may store the received information. The UDM may send to a UDR, a Nudr service request (e.g., Nudr_DM_Create and/or the like) message. The Nudr service request message may comprise at least of:

The ABNSAC assistance information:

AF traffic influence request information: This may comprise information of traffic steering.

Access and Mobility Subscription data: This may comprise information related to the handling of access and mobility of a UE.

Session Management Subscription data: This may comprise information related to packet data session handling.

For the received Nudr service request message, the UDR may store the information delivered by the Nudr service request message. For the received Nudr service request message, the UDR may send to the UDM, the Nudr service response (e.g., Nudr_DM_Create and/or the like) message. For the received Nudm service request message, the UDM may send to the NSACF, the Nudm service response (e.g., Nudm_ParameterProvision_Create and/or Nudm_Service-SpecificAuthorization_Create and/or the like) message. In one example, the NSACF may send directly to the UDR, the Nudr service request message. For the Nudr service request message received from the NSACF, the UDR may send to the NSACF, the Nudr service response message.

In one example, the NSACF may send to a PCF, a Npcf service request (e.g., Nnsacf_SliceEventExposure and/or Npcf_AMPolicyAuthorization and/or Npcf_SMPolicyAuthorization and/or the like) message. The Npcf service request message may comprise at least one of the ABNSAC assistance information, a list of one or more UE for which the ABNSAC assistance information applies, and/or a list of one or more network slices for which the ABNSAC assistance information applies. In an example, to select the PCF to which the Npcf service request is sent, the NSACF may query a NRF to receive a list of one or more PCFs which are associated with one or more network slices for which the ABNSAC assistance information applies.

In an example, a UE (UE 1) may perform a registration procedure to a network, by sending a Registration Request message to the AMF. The Registration Request message may comprise at least one of an identity of the UE, and/or a list of requested network slices. The list of requested network slices may comprise information of one or more network slices that the UE (UE 1) wants to register. For example, the information of one or more network slices may comprise one or more identifiers (e.g., S-NSSAIs) of the one or more network slices. For example, the list of requested network slices may comprise a first network slice (e.g., S-NSSAI 1).

In an example, based on the received Registration Request message, the AMF may send a request to the UDM to retrieve a subscription information of the UE. The subscription information of the UE may comprise a list of one or more network slices for which the UE subscribes to, and/or the ABNSAC assistance information applicable to the one or more network slices. In response to the request from the AMF, the UDM may send a response message to the AMF. In an example, the AMF may receive from the UDM, the response message comprising the subscription information. Based on the subscription information of the UE received from the UDM, the AMF may send to the PCF, a Npcf service request (e.g., Npcf_AMPolicyControl_Create request) message, to get a policy decision for the UE and/or for the one or more network slices. The Npcf service request may comprise at least one of the identifier of the UE, the list of one or more network slices, and/or the ABNSAC assistance information.

In an example, for the received Npcf service request message, the PCF may determine to retrieve policy subscription information for the one or more network slices and/or for the ABNSAC. For example, the PCF may send to the UDR, a Nudr service request (e.g., Nudr_DM_Query request). The Nudr service request may comprise one or more identifiers of the one or more network slices. In response to the Nudr service request, the UDR may send a Nudr service response message. The PCF may receive from the UDR, the Nudr service response (e.g., Nudr_DM_Query response) message. The Nudr service response message may comprise at least one of policy subscription information for one or more network slices and/or the ABNSAC assistance information. In one example, the PCF may determine to send a Nnsacf service request, to retrieve the ABNSAC information from a NSACF. For example, to select the NSACF to which the Nnsacf service request (a request for ABNSAC assistance information) is sent, the PCF may query a NRF to receive a list of one or more NSACFs which handle the one or more network slices. Based on the response from the NRF, the PCF may select the NSACF to which the Nnsacf service request message is sent. For the selected NSACF, the PCF may send the Nnsacf service request message, requesting the ABNSAC assistance information. In response to the Nnsacf service request message, the NSACF may send a Nnsacf service response message comprising the ABNSAC assistance information. The PCF may receive the Nnsacf service response message from the NSACF. In an example, based on the information received from the AMF, the information received from the UDR and/or information received from the NSACF, the PCF may determine the ABNSAC policy information. The ABNSAC policy information may comprise at least one of a policy information associated with the one or more network slices and/or ABNSAC configuration information for the one or more network slices and/or ABNSAC assistance information.

In an example, based on the information (e.g., ABNSAC assistance information) received from the UDM and/or the information (e.g., ABNSAC policy information) received from the PCF, the AMF may determine the ABNSAC configuration information for the UE. Based on the determined ABNSAC configuration information, the AMF may send a Registration Accept message to the UE. The Registration Accept message may comprise at least one of a list of accepted network slices, and/or the ABNSAC configuration information. The UE (UE 1) may store the received ABN- SAC configuration information. Examples of usage of the ABNSAC configuration is further described in the FIG. 28, 29, 30, 31, 32, 33, 34.

Figure 25:
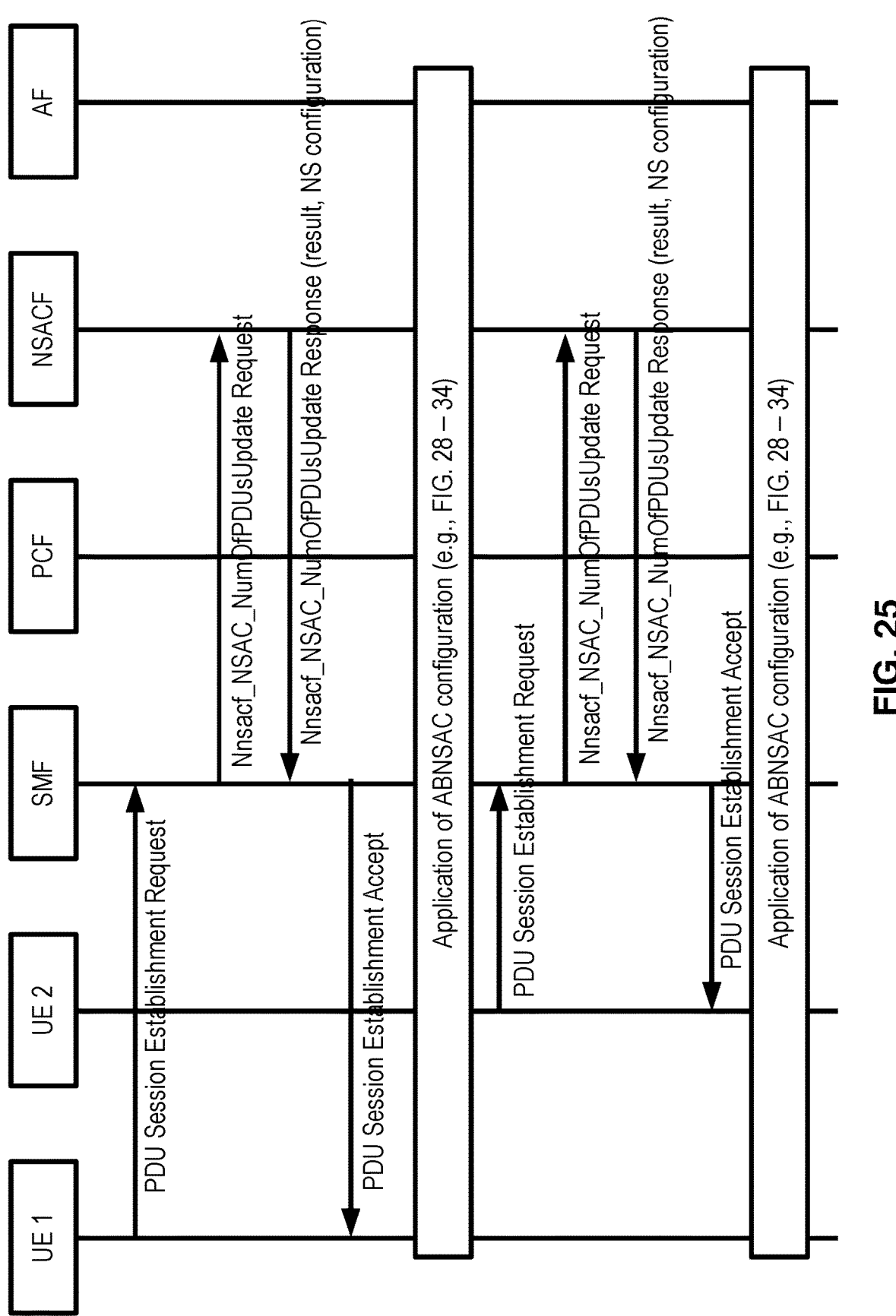
FIG. 25 is an example diagram of an aspect of an embodiment of the present disclosure.

FIG. 25 depicts one example embodiment of the present disclosure. In an example, one or more network nodes may receive ABNSAC configuration for one or more PDU sessions.

In an example, to establish a PDU session, a UE (UE 1) may perform a PDU session establishment procedure, by sending a PDU Session Establishment Request message to an SMF. The PDU Session Establishment Request message may comprise at least one of an identifier of a network slice, a PDU session ID, and/or a requested session type. For example, the identifier of the network slice may indicate which network slice is used for establishment of the PDU session. For example, the requested session type may indicate whether IP session is needed or ethernet session is needed. For example, the identifier of the network slice may indicate a S-NSSAI (e.g., S-NSSAI 1).

In an example, based on the received PDU Session Establishment Request message, the SMF may send to a NSACF, a Nnsacf service request (e.g., Nnsacf_NSAC_NumOfPDUsUpdate Request) message. For example, if the network slice indicated by the PDU Session Establishment Request message is set to subject to NSAC, the SMF may send the Nnsacf service request message to the NSACF. For example, if the network slice indicated by the PDU Session Establishment Request message is not set to subject to NSAC, the SMF may not send the Nnsacf service request message to the NSACF. The Nnsacf service request may comprise at least one of a UE ID, an identifier of the network slice, update flag, and/or the PDU session ID. The update flag may indicate whether a number of PDU sessions established with the network slice needs to be increased or decreased. For example, the update flag may indicate that the number of PDU sessions established with the network slice needs to be increased. The NSACF may receive the Nnsacf service request sent by the SMF.

In an example, based on the received Nnsacf service request (e.g., Nnsacf_NSAC_NumOfPDUsUpdate Request) message, the NSACF may determine to activate ABNSAC for the PDU session for the network slice. For example, if a number of PDU sessions established for the network slice (e.g., S-NSSAI 1) is above threshold (e.g., 100 PDU sessions, 200 PDU sessions, 80% of quota, 90% of quota), the NSACF may determine to activate the ABNSAC for the network slice (e.g., S-NSSAI 1). For example, if a number of PDU sessions established for the network slice (e.g., S-NSSAI 3) is below threshold (e.g., 90 PDU sessions, 150 PDU sessions, 75% of quota, 85% of quota), the NSACF may determine not to activate ABNSAC for the network slice (e.g., S-NSSAI 3). For example, if a number of PDU sessions activated for the network slice (e.g., S-NSSAI 1) is above threshold (e.g., 110 PDU sessions, 210 PDU sessions, 85% of quota, 95% of quota), the NSACF may determine to activate the ABNSAC for the network slice (e.g., S-NSSAI 1). For example, if a number of PDU sessions established for the network slice (e.g., S-NSSAI 3) is below threshold (e.g., 95 PDU sessions, 155 PDU sessions, 80% of quota, 90% of quota), the NSACF may determine not to activate ABNSAC for the network slice (e.g., S-NSSAI 3).

In an example, in response to the received Nnsacf service request, the NSACF may send a Nnsacf service response (e.g., Nnsacf_NSAC_NumOfPDUsUpdate Response) message to the SMF. Based on the determination of activating the ABNSAC for the PDU session, the Nnsacf service response message may comprise ABNSAC configuration information. For example, the ABNSAC configuration information may indicate to the SMF that the ABNSAC applies for the PDU session. For example, the ABNSAC configuration information may comprise at least one of a value for a network slice PDU monitoring timer (NS PDU monitoring timer) for the network slice for which the ABNSAC applies, a validity period information and/or an validity area information. In an example, the value for the NS PDU monitoring timer may be used to indicate/control a time period during which the PDU session may remain inactive, the PDU session does not use the network slice, the PDU session does not send or receive signaling message for the network slice, and/or the PDU session does not send or receive user data for the network slice. For example, for the network slice (e.g., S-NSSAI 1), the value for NS PDU monitoring timer may be set to 30 second or set to 60 second. In an example, the valid period information may comprise information of when the ABNSAC configuration information is used and/or valid for the network slices and/or for the PDU session. For example, the valid period information may indicate the start time and/or end time. In an example, the validity area information may comprise information of where the ABNSAC configuration information is used/valid for the network slice and/or for the PDU session. For example, the validity area information may comprise at least one of one or more GPS coordinates, list of TAs, list of cells, and/or the like. The SMF may receive the Nnsacf service response message sent by the NSACF. The SMF may store the received ABNSAC configuration information of the Nnsacf service response message. Based on the ABNSAC configuration information, the SMF may determine to apply the ABNSAC for the PDU session. Based on the Nnsacf service response message, the SMF may send to the UE, a PDU Session Establishment Accept message. The PDU Session Establishment Accept message may comprise the ABNSAC configuration information. For example, the ABNSAC configuration information of the PDU Session Establishment Accept may comprise one or more information of the ABNSAC configuration information of the Nnsacf service response. For example, the SMF may send the ABNSAC configuration information to a UPF handing the PDU session and/or to a NG-RAN handling the PDU session. In an example, the PDU session establishment procedure of the UE (UE1) may be applicable to a UE (UE2). Examples of usage of the ABNSAC configuration is further described in FIGS. 28, 29, 30, 31, 32, 33, 34.

Figure 26:
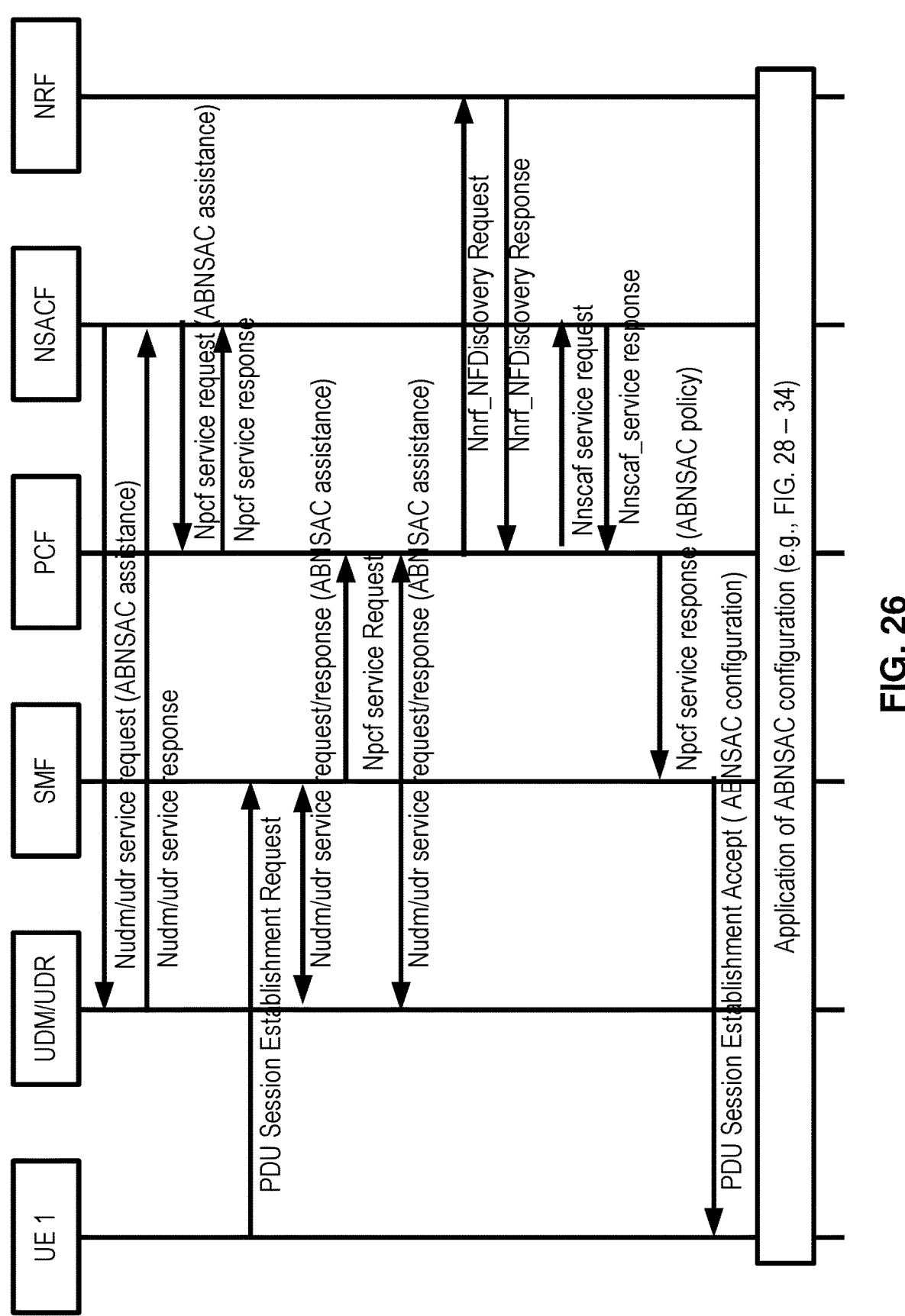
FIG. 26 is an example diagram of an aspect of an embodiment of the present disclosure.

FIG. 26 depicts one example embodiment of the present disclosure. In an example, one or more network nodes may generate and/or receive ABNSAC configuration for one or more PDU sessions.

As shown in the example of FIG. 24, the NSACF may send to the UDM, the Nudm service request (e.g., Nudm_ParameterProvision_Create, Nudm_ServiceSpecificAuthorization_Create, and/or the like) message. The UDM may store the received information. The UDM may send to the UDR, the Nudr service request (e.g., Nudr_DM_Create and/or the like) message. The UDR may store the received information. The NSACF may send to the UDR, the Nudr service request message. The UDR may send the Nudr service response (e.g., Nudr_DM_Create, and/or the like) message. The UDM may send the Nudm service response (e.g., Nudm_ParameterProvision_Create, Nudm_ServiceSpecificAuthorization_Create, and/or the like) message.

Reverting back to FIG. 26, in an example, the NSACF may send to the PCF, a Npcf service request (e.g., Nnsacf_SliceEventExposure, Npcf_AMPolicyAuthorization, Npcf_SMPolicyAuthorization, and/or the like) message. The Npcf service request message may comprise at least one of the ABNSAC assistance information, a list of one or more UE for which the ABNSAC assistance information applies, a list of one or more network slices for which the ABNSAC assistance information applies, and/or a list of one of more PDU sessions for which the ABNSAC assistance information applies. In an example, to select the PCF to which the Npcf service request is sent, the NSACF may query a NRF to receive a list of one or more PCFs which serve the one or more network slices for which the ABNSAC assistance information applies and/or which serve the one or more PDU sessions associated with the network slice for which the ABNSAC assistance information applies. In response to the query, the NRF may send to the NSACF, information of the PCF. In response to the Npcf service request message, the PCF may store information delivered via the Npcf service request message. The PCF may send Npcf service response to the NSACF.

In an example, a UE (UE 1) may perform PDU Session Establishment procedure to establish a PDU session for the network slice, by sending a PDU Session Establishment Request message to a SMF. The PDU Session Establishment Request message may comprise at least one of an identifier of the UE, an identity of the network slice, and/or a PDU session ID for the PDU session. In an example, based on the received PDU Session Establishment Request message, the SMF may send a request to the UDM to retrieve a subscription information of the UE. The subscription information of the UE may comprise a session-related subscription information and/or the ABNSAC assistance information applicable to the network slice. The UDM may send to the SMF, a response comprising the subscription information. Based on the subscription information received from the UDM, the SMF may send to the PCF, a Npcf service request (e.g., Npcf_SMPolicyControl_Create request) message, to get a policy information for the PDU session. The Npcf service request may comprise at least one of the identifier of the UE, the identifier of the network slice, the ABNSAC assistance information, and/or the subscription information received from the UDM. The PCF may receive the Npcf service request message.

In an example, for the received Npcf service request message, the PCF may determine to retrieve a policy-related subscription data from a UDR. For example, the PCF may send to the UDR, a Nudr service request (e.g., Nudr_DM_Query request). The Nudr service request may comprise the identifier of the network slice over which the PDU session is established. In response to the Nudr service request, the UDR may send a Nudr service response (e.g., Nudr_DM_Query response) message. The PCF may receive from the UDR, the Nudr service response. The Nudr service response message may comprise at least one of policy-related subscription data for the PDU session, policy-related subscription data for the network slice and/or the ABNSAC assistance information for the network slice. Based on the Npcf service request received from the SMF, the PCF may send to a NSACF, the Nnsacf service request message, to request the ABNSAC assistance information. For example, to select the NSACF to which the Nnsacf service request is sent, the PCF may query a NRF to receive an information of the NSACF which handle the network slice. Based on the response from the NRF, the PCF may select the NSACF and/or may send the Nnsacf service request message to the NSACF In response to the Nnsacf service request message received from the PCF, the NSACF may send Nnsacf service response message to the PCF. The PCF may receive from the NSACF, the Nnsacf service response message. The Nnsacf service response message may comprise the ABNSAC assistance information. In an example, based on the information from the SMF, based on the information from the UDR, and/or based on the information from the NSACF, the PCF may determine the ABNSAC policy information for the PDU session. The ABNSAC policy information may comprise at least one of a policy information associated with the network slice, a policy information associated with the PDU session, a ABNSAC configuration information, and/or a ABNSAC assistance information. The PCF may send to the SMF, a Npcf service response message comprising the ABNSAC policy information.

Based on the information from the UDM and/or the information from the PCF, the SMF may determine the ABNSAC configuration information for the PDU session. Based on the determined ABNSAC configuration information, the SMF may send a PDU Session Establishment Accept message to the UE. The PDU Session Establishment Accept message may comprise at least one of QoS information of the PDU session, and/or the ABNSAC configuration information. Based on the determined ABNSAC configuration information, the SMF may send a N2 message (e.g., PDU Session Resource Setup Request) to a NG-RAN and/or a N4 message (e.g., N4 Session configuration message) to UPF. For example, the N2 message may comprise the ABNSAC configuration information and/or the N4 message may comprise the ABNSAC configuration information. Example of usage of the ABNSAC configuration information is further described in FIGS. 28, 29, 30, 31, 32, 33, 34.

FIG. 27 depicts one example embodiment of the present disclosure. In an example, an AF may provide information that assists determination of ABNSAC configuration information.

In an example of FIG. 24 and/or FIG. 26, the NSACF may store the ABNSAC assistance information in the UDR, in the UDM, and/or in the PCF. Reverting back to FIG. 27, to generate the ABNSAC assistance information, the NSACF may use information delivered from an application function (AF). For example, to assist a network to efficiently manage a network slice, the AF may send a ABNSAC request information to the network. The AF may be an owner of the network slice for which the ABNSAC applies, an administrator of the network slice for which the ABNSAC applies, and/or an application server whose traffic may be delivered over the network slice.

In an example, to assist the network, the AF may send to a NEF, a Nnef service request (e.g., Nnef_ParameterProvision_Create Request, Nnef_ServiceParameter_Create Request and/or Nnef_ApplyPolicy_Create Request, and/or the like) message. The Nnef service request may comprise at least one of following:

Expected UE Behaviour parameters: This may comprise information related to potential mobility of a UE.

Network Configuration parameters information: This may comprise information related to communication availability, and/or reachability of a UE.

Service Description information: This may be information to identify a service. This may comprise DNN, S-NSSAI, an AF-Service-Identifier, and/or an Application Identifier.

ABNSAC request information: This may comprise at least one of information associated with the network slice, information associated with ABNSAC configuration information, information associated with ABNSAC assistance information, and/or information of one or more network slices. For example, this information may comprise information on how to determine an inactivity of a UE, and/or an inactivity of a PDU session over the network slice. For example, this information may comprise information of time periodicity when the UE and/or the PDU session is expected to be active. For example, based on this time periodicity, the NSACF may determine the value for the timer (e.g., NS UE monitoring timer, NS PDU monitoring timer).

In an example, based on the received Nnef service request message from the AF, the NEF may determine a NSACF associated with the one or more network slices indicated by the Nnef service request message. Based on the determination of the NSACF, the NEF may send to the determined NSACF, a Nnsacf service request (e.g., Nnsacf_NSAC_Authorization Request and/or the like) message. The Nnsacf service request message (e.g., Nnsacf_NSAC_Authorization Request and/or the like) may comprise a ABNSAC request information. For example, the ABNSAC request information of the Nnsacf service request message may comprise one or more information of the ABNSAC request information of the Nnef service request message. The NSACF may receive the Nnsacf service request message sent by the NEF and/or may store the ABNSAC request information of the Nnsacf service request message. In response to the received Nnsacf service request message, the NSACF may send to the NEF, a Nnsacf service response (e.g., Nnsacf_NSAC_Authorization Response and/or the like) message.

In an example, based on the received Nnef service request message from the AF, the NEF may determine a PCF associated with the one or more network slices indicated by the Nnef service request message. Based on the determination of the PCF, the NEF may send to the determined PCF, a Npcf service request (e.g., Nnsacf_SliceEventExposure Request, Npcf_AMPolicyAuthorization Request, Npcf_SMPolicyAuthorization Request, and/or the like) message. The Npcf service request message may comprise the ABNSAC request information. For example, the ABNSAC request information of the Npcf service request message may comprise one or more information of the ABNSAC request information of the Nnef service request message. The PCF may receive the Npcf service request message sent by the NEF. Based on the Npcf service request message, the PCF may store the ABNSAC request information and/or may determine a network slice policy for the network slice indicated by the Nnef service request. In response to the received Npcf service request message, the PCF may send to the NEF, a Npcf service response (e.g., Nnsacf_SliceEventExposure Response, Npcf_AMPolicyAuthorization Response, Npcf_SMPolicyAuthorization Response, and/or the like) message. Based on the received ABNSAC request information, the PCF may send to the NSACF, the Nnsacf service request (e.g., Nnsacf_NSAC_Authorization Request, and/or the like) message. The Nnsacf service request message may comprise a ABNSAC request information. Based on the received ABNSAC request information, the NSACF may generate a ABNSAC configuration information.

In an example, based on the received Nnef service request message from the AF, the NEF may determine a UDM/UDR associated with the one or more network slices indicated by the Nnef service request message. Based on the determination of the UDM/UDR, the NEF may send to the determined UDM/UDR, a Nudm/udr service request (e.g., Nudm_ParameterProvision_Create and/or Nudm_ServiceSpecificAuthorization_Create and/or the like) message. The Nudm/udr service request message may comprise the ABNSAC request information. For example, the ABNSAC request information of the Nudm/udr service request message may comprise one or more information of the ABNSAC request information of the Nnef service request message. The UDM/UDR may receive the Nudm/udr service request message sent by the NEF. The UDM/UDR may store the ABNSAC request information of the Nudm/udr service request message. In response to the received Nudm/udr service request message, the UDM/UDR may send to the NEF, a Nudm/udr service response (e.g., Nudm_ParameterProvision_Create Response, Nudm_ServiceSpecificAuthorization_Create Response, and/or the like) message. In an example, based on the received ABNSAC request information, the UDM/UDR may determine the NSACF associated with the network slice of the ABNSAC request information. Based on the determined NSACF, the UDM/UDR may send the Nnsacf service request (e.g., Nnsacf_NSAC_Authorization Request, and/or the like) message. The Nnsacf service request may comprise a ABNSAC request information. For example, the ABNSAC request information of the Nnsacf service request message may comprise one or more information of the ABNSAC request information of the Nudm/udr service request message. The NSACF may receive the Nnsacf service request message sent by the UDM/UDR. The NSACF may store the ABNSAC request information of the Nnsacf service request message.

Figure 28:
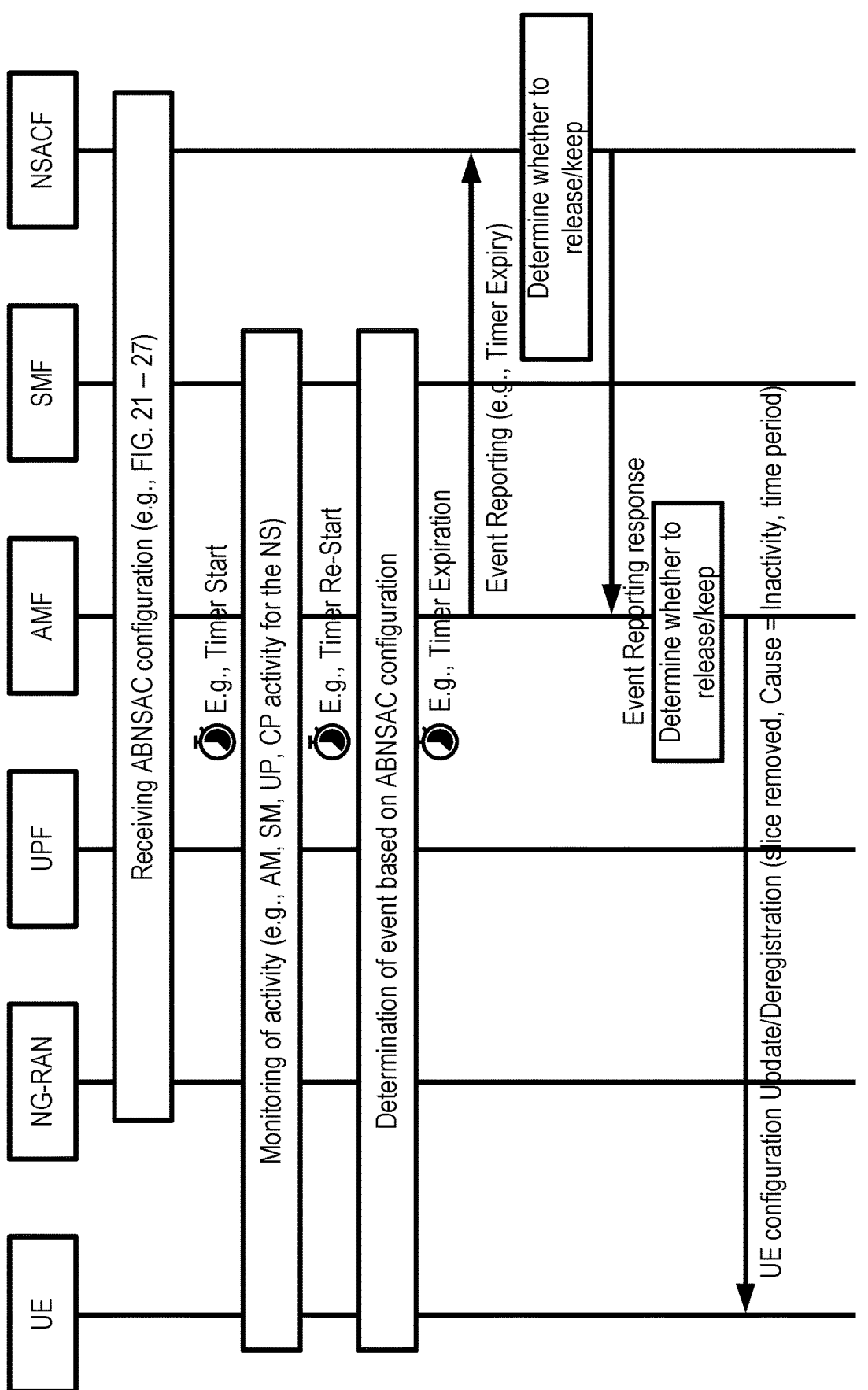
FIG. 28 is an example diagram of an aspect of an embodiment of the present disclosure.

FIG. 28 depicts one example embodiment of the present disclosure. In an example, a network node may use the ABNSAC configuration, to monitor activity of a UE, for network slice quota management. In an example, a network node may use the ABNSAC configuration, to manage resources for the UE.

In an example, one or more network nodes (e.g., the NSACF and/or the SMF and/or the AMF and/or UPF and/or NG-RAN and/or a UE) may receive the ABNSAC configuration information. To receive the ABNSAC configuration information, the one or more examples as shown in FIG. 21, 22, 23, 24, 25, 26, 27 may be used.

In an example, the ABNSAC configuration information may comprise information for one or more network slices configured for NSAC and/or ABNSAC. The ABNSAC configuration information may comprise at least one of:

The value for NS UE monitoring timer.

The value for NS PDU monitoring timer

The validity period information.

The validity area information.

The identifier of the network slice.

Information of whether one or more reporting is required: This may indicate whether the network node (e.g., the UE, the AMF, the SMF, the UPF, the NG-RAN and/or the NSACF) which manages the timer (e.g., the NS UE monitoring timer, the NS PDU monitoring timer) needs to report, when the timer expires.

Information of where to report: This may indicate to which a network node (e.g., the UE, the AMF, the SMF, the UPF, the NG-RAN, the NSACF, the AF, the PCF) an expiration of the timer needs to be reported, when the timer expires.

Information of what to report: This may indicate what information needs to be reported when the network node (e.g., the UE, the AMF, the SMF, the UPF, the NG-RAN) reports the expiration of the timer. For example, the information may comprise an identifier of the network slice for which the timer expires, activity status of one or more network slices, activity status of one or more PDU sessions, amount of data exchanged over the network slice, an identifier of the UE for which the timer is associated, an identifier of the PDU session for which the timer is associated, and/or so on.

Information of action to be performed at expiration of the timer: This may indicate what action the network node (e.g., the UE, the AMF, the SMF, the UPF, the NG-RAN, the NSACF) needs to take when the timer expires. For example, the UE may start a registration related procedure (e.g., a registration update procedure to deregister the network slice for which the timer expires, a deregistration procedure to deregister the UE from the network), a PDU session related procedure (e.g., PDU Session Release Procedure to release the PDU session established over the network slice, and/or PDU Session Deactivation Procedure to deactivate the PDU session established over the network slice), and/or a connection management procedure (e.g., a RRC connection release request to release a RRC connection, a RRC connection release request to request transition to RRC Inactive state, a NAS connection release request to release a N1 connection). For example, the AMF may start a procedure (e.g., a UE configuration update procedure to deallocate/remove/reject the network slice for which the timer expires, or a UE deregistration procedure to deregister the UE) to update a list of allowed network slices for the UE. For example, the SMF may start a procedure (e.g., a PDU session release/deactivation procedure, a N2 procedure to deallocate a resource of the PDU session, a N4 procedure to release/deactivate N3 resource for the PDU session) to manage a PDU session for which the timer expires. For example, the UPF may start a procedure to manage N3 resources allocated for the PDU session for which the timer expires. For example, the NG-RAN may start a procedure (e.g., release of one or more radio bearers allocated/established for the PDU session of the network slice, release of RRC connection, transition of the UE to RRC inactive state when there is no other active PDU sessions), to manage RRC resources allocated for the PDU session for which the timer expires. For example, the information of action to be performed at the expiration of the timer may indicate that the network node needs to perform reporting of the expiration of the timer.

Information of target of monitoring: For example, this may indicate one or more UEs and/or one or more PDU sessions. For the one or more UEs and/or for the one or more PDU sessions, activity/inactivity is monitored, the ABNSAC configuration may be applied, and/or the timer may be managed.

Information of when to start the timer: This may comprise information of one or more criterion of when the timer needs to be started. For example, this may indicate that the timer is started when the network slice is allowed/registered for the UE, when AMF sends a Registration Accept message comprising the network slice to the UE, when the UE receives the Registration Accept message, when SMF establishes the PDU session with the UE for the network slice, when SMF sends a PDU Session Establishment Accept message to the UE for the network slice, when UPF activates a resources for the PDU session of the network slice, and/or when NG-RAN establishes a resource for the PDU session of the network slice.

Information of when to stop the timer: This may comprise information of one or more criterion of when the timer needs to be stopped. For example, the timer may be stopped when the UE deregister the network slice, and/or when the UE establishes the PDU session over the network slice.

Information of when to restart the timer: This may comprise information of one or more criterion of when the timer needs to be restarted. For example, the timer may be restarted, when a signaling message is exchanged between the UE and the SMF, and/or when a packet is delivered for the PDU session of the network slice. For example, the timer may be restarted, when a packet is exchanged between the UE and/or the UPF and/or the NG-RAN, and/or when a packet is delivered for the PDU session of the network slice.

Time period information: This may indicate a time period during which the UE may not request the network slice, and/or a PDU session over the network slice, if the timer expires. For example, when the timer expires, until the time period indicated by the time period information elapses, the UE may not request registration for the network slice, PDU session establishment for the network slice, and/or PDU session Activation for the network slice.

For example, to provide information for one or more network slices, a ABNSAC configuration information may comprise information for one or more network slices. As an example, if the ABNSAC configuration comprise information for a network slice K and/or for a network slice M, the ABNSAC configuration may comprise a first value for NS UE monitoring timer for the network slice K and/or a second value for NS UE monitoring timer for the network slice M. For example, to provide information for one or more network slices, one or more ABNSAC configuration information (e.g., using a first ABNSAC configuration and/or a second ABNSAC configuration) may be used. For example, the first ABNSAC configuration may comprise information for the network slice K, and/or the second ABNSAC configuration may comprise information for the network slice M.

In an example, the AMF may receive the ABNSAC configuration information from the network node (e.g., the UDM, the NSACF, the PCF) for the network slice for which the ABNSAC may apply. In one example, the ABNSAC configuration information may be locally configured in the AMF.

In an example, based on the ABNSAC configuration information, the AMF may start a NS UE monitoring timer for a UE. For example, the AMF may start the NS UE monitoring timer, based on that the AMF sends to the UE, a NAS message (e.g., a Registration Accept message, a UE configuration update message) comprising the identifier of the network slice with which the NS UE monitoring timer is associated. The NAS message may indicate that the network slice is allowed and/or registered for the UE. For example, the AMF may start the NS UE monitoring timer with the value for NS UE monitoring timer, based on the ABNSAC configuration information. For example, if condition indicated by the information of when to start the timer is met, the AMF may start the NS UE monitoring timer for the network slice for the UE.

In an example, based on the ABNSAC configuration information, the AMF may manage the NS UE monitoring timer for the UE. For example, when the AMF receives from the UE, a NAS message (e.g., a Registration Request message comprising information of the network slice, PDU session related message for the network slice (e.g., PDU Session Establishment Request message, PDU Session Modification Request message)) for the network slice, the AMF may restart the NS UE monitoring timer for the network slice for the UE. For example, when the AMF sends to the UE, a NAS message (e.g., a Registration Accept message comprising the information of the network slice, PDU session related message for the network slice (e.g., PDU Session Establishment Accept message, PDU Session Modification Accept message)) for the network slice, the AMF may restart the NS UE monitoring timer for the network slice for the UE. For example, when the AMF sends to and/or receives from a NG-RAN, a N2 message (e.g., PDU Session Resource Setup Request/Accept) for the network slice associated with the timer, the AMF may restart the NS UE monitoring timer for the network slice for the UE. For example, the AMF may restart the time for the network slice for the UE when the AMF detects an activity for the network slice (e.g., when the AMF receives and/or sends a message associated with the network slice, when the UE sends and/or receives a data for the network slice).

In an example, based on the ABNSAC configuration information, the AMF may determine whether an event occurs for the network slice for the UE. For example, the event may comprise that the NS UE monitoring timer expires for the network slice for the UE. If the timer expires, the AMF may send a report message (e.g., a Nnsacf_NSAC_NumOfUEsUpdate Request and/or the like) to a network node (e.g., NSACF, a network node indicated by the information of where to report), indicating the expiration of the timer for the network slice for the UE. The report message sent by the AMF may comprise at least one of the identifier of the UE, the identifier of the network slice and/or the indication of expiration of the timer.

In an example, the NSACF may receive the report message sent by the AMF. Based on the report message, the NSACF may determine whether to release/keep the network slice for the UE. For the determination, the NSACF may use information of the number of UEs registered for the network slice. For example, if a condition (e.g., the number of UEs registered for the network slice reaches the maximum number of UEs registered for the network slice, the number of UEs registered for the network slice is above a threshold, and/or the expiration of the timer) is met, the NSACF may determine to release the network slice for the UE. The release of the network slice for the UE may be that the network slice is removed from the list of accepted network slice for the UE, that the network does not accept registration of the UE for the network slice, and/or that the network revokes/reject registration of the UE for the network slice. For example, if the condition is not met, the NSACF may determine to keep the network slice for the UE. The keeping of the network slice for the UE may be that the network slice is not removed from the list of accepted network slice for the UE, that the network may continue to accept registration of the UE for the network slice, and/or that the network does not revokes/reject registration of the UE for the network slice.

In an example, in response to the report request message, the NSACF may send a report response message (e.g., a Nnsacf_NSAC_NumOfUEsUpdate Response and/or the like) to the AMF. The report response message may comprise at least one of the information of the network slice, information of whether to keep/release the network slice for the UE, the time period information during which the UE may not request the network slice, and/or the identifier of the UE. The information of the network slice may indicate the identifier of the network slice for which the report response message is associated. The information of whether to keep/release the network slice may indicate whether the registration of the UE for the network slice is to be kept or released. The time period information during which the UE may not request the network slice may indicate the time period during which the UE may not re-request the registration for the network slice if the network slice is to be released. Based on the received report response message, the AMF may determine whether to keep/release the registration of the network slice for the UE. For example, if the received report response message indicates that the network slice is to be released for the UE, the AMF may send a message (e.g., UE configuration update message, Deregistration Request message), to the UE. The message sent to the UE may comprise at least one of a list of rejected/removed network slices comprising the network slice, a cause value indicating that the network slice is to be released due to inactivity, a cause value indicating reaching quota of the network slice (e.g., reaching the maximum number of UEs registered for the network slice), the time period information during which the UE may not request the network slice, and/or information that the network slice is deregistered for the UE due to inactivity.

Figure 29:
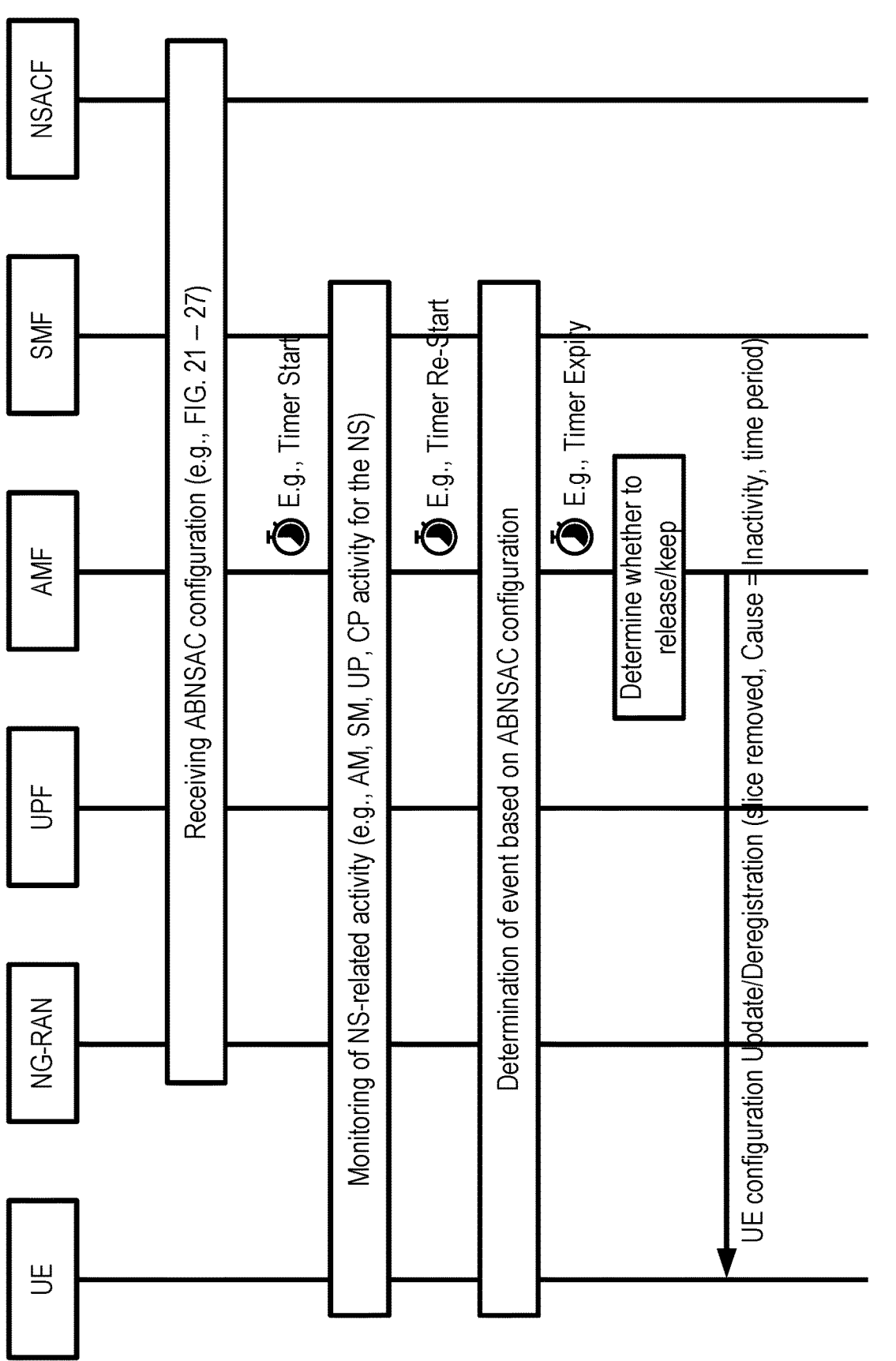
FIG. 29 is an example diagram of an aspect of an embodiment of the present disclosure.

FIG. 29 depicts one example embodiment of the present disclosure. In an example, a network node may use the ABNSAC configuration, to monitor activity of a UE, for network slice quota management. In an example, a network node may use the ABNSAC configuration, to manage resources for the UE.

In an example, one or more network nodes (e.g., the NSACF, the SMF, the AMF, UPF, NG-RAN, and/or the UE) may receive the ABNSAC configuration information. To receive the ABNSAC configuration information, the one or more examples as shown in FIG. 21, 22, 23, 24, 25, 26, 27 may be used.

In an example, the AMF may determine the expiration of the timer, based on the ABNSAC configuration, as shown in the example of FIG. 28.

In an example, the information of action to be performed at the expiration of the timer may indicate one or more actions to be performed by the AMF and/or may be locally configured. When the timer expires for the network slice for the UE, the AMF may perform one or more actions. For example, the AMF may perform the one or more actions, based on the information of action to be performed at the expiration of the timer. For example, the information of action may indicate whether the AMF needs to keep/release the registration of the UE for the network slice for which the timer expires. For example, the AMF may determine whether to release/deregister/revoke the registration of the network slice for the UE. Based on the determination, the AMF may send a message (e.g., UE configuration update message, Deregistration Request message), to the UE. For example, the message sent to the UE may comprise at least one of a list of rejected/removed network slices comprising the network slice, a list of accepted network slice not including the network slice, a cause value indicating that the network slice is released due to inactivity, a cause value indicating reaching the quota of the network slice (e.g., reaching the maximum number of UEs registered for the network slice), the time period information during which the UE may not request the network slice, and/or information that the network slice is deregistered for the UE due to inactivity. The UE may receive the message sent by the AMF.

Figure 30:
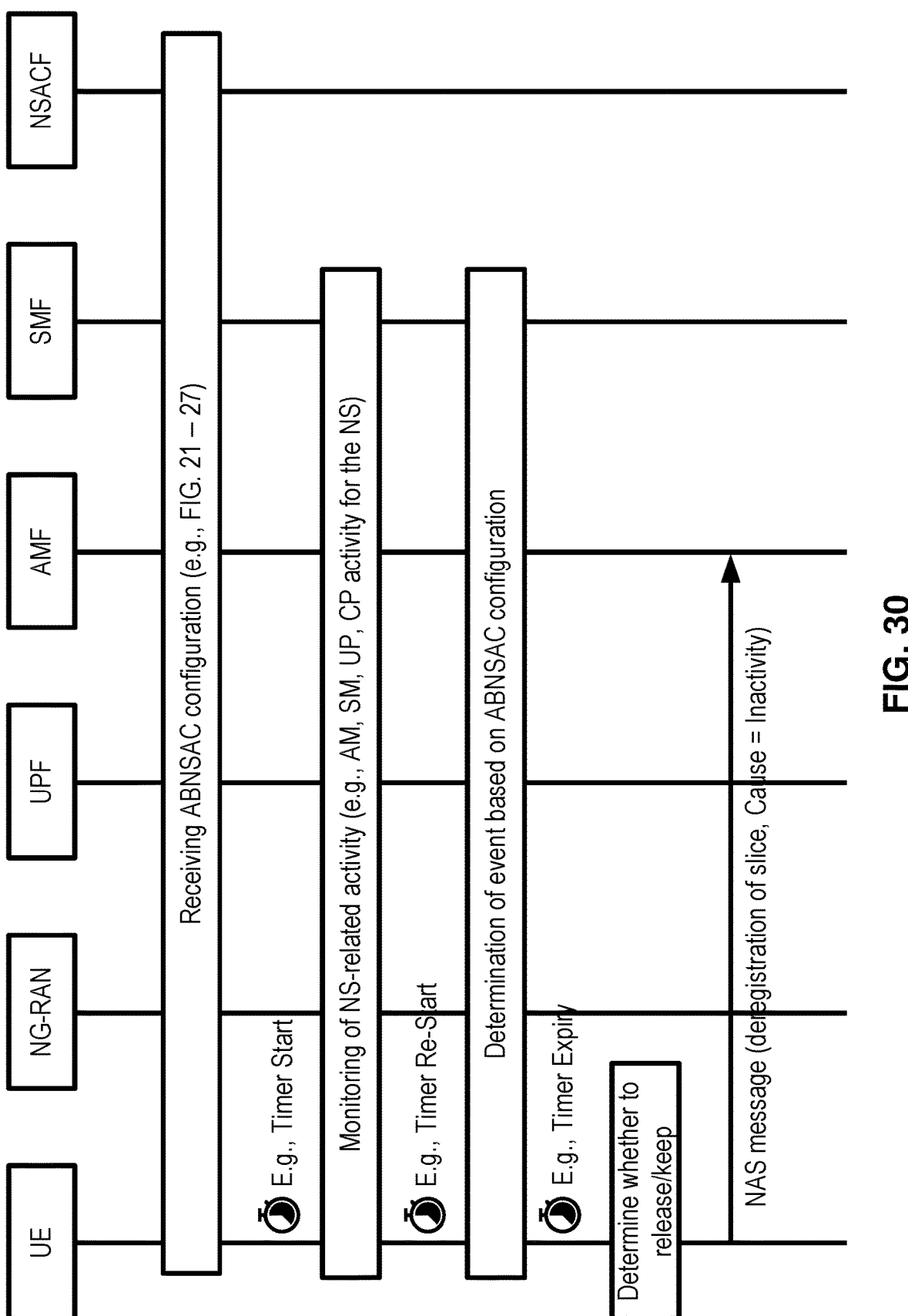
FIG. 30 is an example diagram of an aspect of an embodiment of the present disclosure.

FIG. 30 depicts one example embodiment of the present disclosure. In an example, a network node may use the ABNSAC configuration, to monitor activity for a network slice, for network slice quota management. In an example, a network node may use the ABNSAC configuration, to manage resources for the network slice.

In an example, one or more network nodes (e.g., the NSACF, the SMF, the AMF, UPF, NG-RAN, the UE) may receive the ABNSAC configuration information, and/or may be locally configured with ABNSAC configuration information. To receive the ABNSAC configuration information, the one or more examples as shown in FIG. 21, 22, 23, 24, 25, 26, 27 may be used.

In an example, the UE may receive the ABNSAC configuration information from the network node (e.g., the AMF, the UDM, the NSACF, the PCF, the SMF) for the network slice for which the ABNSAC may apply, using a NAS message (e.g., Registration Accept message, UE Configuration Update message, etc.). If the UE supports one or more network slices for which the ABNSAC applies, the ABNSAC configuration information may comprise information for the one or more network slices.

In an example, based on the received ABNSAC configuration information, the UE may start a NS UE monitoring timer for a network slice for which the ABNSAC configuration information applies. For example, the UE may start the NS UE monitoring timer based on that the UE receives the NAS message (e.g., a Registration Accept message, UE configuration Update message) comprising a list of allowed network slices which comprises the network slice and/or the ABNSAC configuration information for the network slice. For example, the UE may start the NS UE monitoring timer for the network slice based on receiving the ABNSAC configuration information associated with the network slice.

In an example, based on the ABNSAC configuration information, the UE may manage the NS UE monitoring timer for the network slice. For example, when the UE sends and/or receives a NAS message (e.g., a Registration Request/Accept message comprising the information of the network slice, PDU session related message for the network slice (e.g., PDU Session Establishment Request/Accept message, PDU Session Modification Request/Accept message)) for the network slice, the UE may restart the NS UE monitoring timer for the network slice. For example, when the UE sends and/or receives a traffic for the network slice, the UE may restart the NS UE monitoring timer for the network slice.

In an example, the UE may determine whether an event occurs for the network slice for the UE. For example, the event may be that the NS UE monitoring timer expires for the network slice. When the timer expires for the network slice, the UE may perform one or more actions. For example, the UE may perform one or more actions, based on the information of action to be performed at the expiration of the timer. For example, the information of action may indicate whether the UE needs to keep/release the registration of the network slice for which the timer expires. For example, the UE may determine to release the registration of the network slice and/or to deregister the network slice. Based on the determination, the UE may send a message (e.g., Registration Request message, Deregistration request), to the AMF. The message sent by the UE may comprise a list of requested network slices and/or a cause value. The list of requested network slice may not comprise the network slice for which the timer expires. The cause value may indicate that inactivity is detected for the network slice and/or that the timer expires for the network slice.

In an example, for the network slice for which the timer expires, if there is a PDU session established for the network slice, the UE may determine to release the PDU session. Based on the determination, the UE may send a SM-related message (e.g., PDU Session Release message) to a SMF which controls the PDU session.

Figure 31:
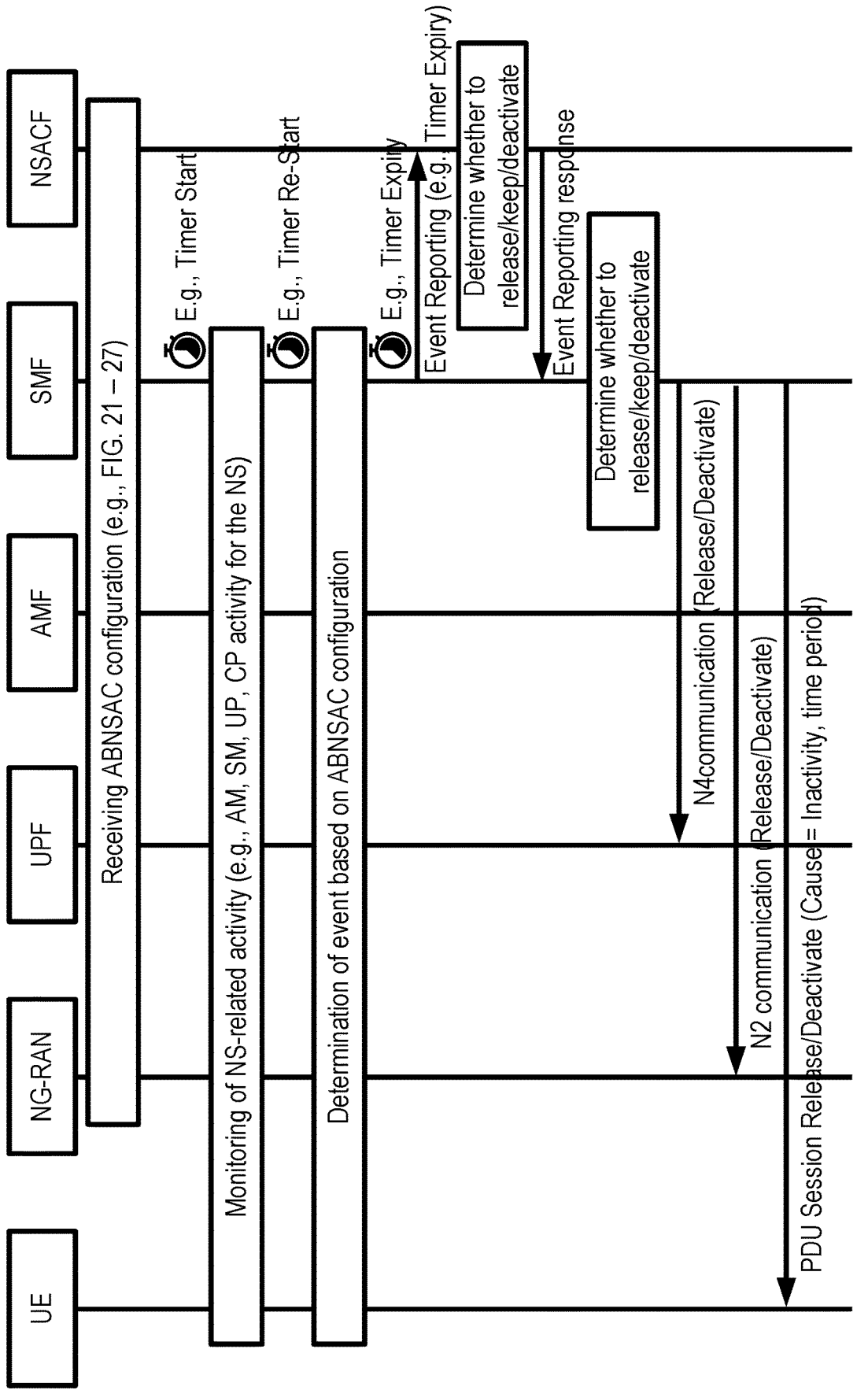
FIG. 31 is an example diagram of an aspect of an embodiment of the present disclosure.

FIG. 31 depicts one example embodiment of the present disclosure. In an example, a network node may use the ABNSAC configuration, to monitor activity of a PDU session, for network slice quota management. In an example, a network node may use the ABNSAC configuration, to manage resources for the PDU session.

In an example, one or more network nodes (e.g., the NSACF, the SMF, the AMF, the UPF, NG-RAN, the UE) may receive the ABNSAC configuration information. To receive the ABNSAC configuration information, the one or more examples as shown in FIG. 21, 22, 23, 24, 25, 26, 27 may be used. In an example, the ABNSAC configuration information may be the ABNSAC configuration as shown in the example of FIG. 28.

In an example, the SMF may receive the ABNSAC configuration information from the network node (e.g., the UDM, the NSACF, the PCF) for the PDU session for the network slice for which the ABNSAC may apply.

In an example, the SMF may start a NS PDU monitoring timer for a PDU session of a UE. For example, the SMF may start the NS PDU monitoring timer based on that the SMF sends to the UE, a NAS message (e.g., a PDU Session Establishment Accept message) for the PDU session of the network slice with which the NS PDU monitoring timer is associated. For example, based on the ABNSAC configuration information, the SMF may start the NS PDU monitoring timer for the PDU session of the UE. For example, if a condition indicated by the information of when to start the timer is met, the SMF may start the NS PDU monitoring timer for the PDU session. For example, the SMF may start the NS PDU monitoring timer, based on the notification from a UPF managing the PDU session. For example, the UPF may monitor whether there is an activity for the PDU session or not. When the UPF detects inactivity for the PDU session (e.g., no data sent from the UE and/or no data sent to the UE) for a configured amount of time, the UPF may report the inactivity of the PDU session to the SMF. For the UPF to detect the inactivity, the SMF may send to the UPF, an information on the configured amount of time. Based on the notification of the inactivity of the PDU session from the UPF, the SMF may start the timer (NS PDU monitoring timer) for the PDU session.

In an example, the SMF may manage the NS PDU monitoring timer for the PDU session. For example, based on the ABNSAC configuration information, the SMF may manage the NS PDU monitoring timer for the PDU session. For example, when the SMF sends to and/or receives from the UE, a NAS message (e.g., PDU Session Establishment Request/Accept message, PDU Session Modification Request/Accept message) for the PDU Session of the network slice, the SMF may restart the NS PDU monitoring timer for the PDU Session of the network slice. For example, when the SMF sends to (and/or receives from) a NG-RAN a N2 message (e.g., PDU Session Resource message) and/or when the SMF sends to (and/or receives from) an AMF a N11 message (e.g., Nsmf_PDUSession_UpdateSMcontext message) for the PDU Session of the network slice, the SMF may restart the NS PDU monitoring timer for the PDU Session of the network slice. For example, the SMF may restart/stop the timer for the PDU Session for the network slice when the SMF detects an activity for the PDU session of the network slice and/or when the SMF receives a notification for the PDU session for the network slice. For example, when the NG-RAN and/or the UPF receives a data for the PDU session of the network slice, the NG-RAN and/or the UPF may send the notification to the SMF that data traffic activity for the PDU session is detected.

In an example, the SMF may determine whether an event occurs for the PDU session of the network slice. For example, based on the ABNSAC configuration information, the SMF may determine whether an event occurs for the PDU session of the network slice. For example, the event may be that the NS PDU monitoring timer expires for the network slice for the PDU session. For example, if the timer expires, the SMF may send a report message (e.g., a Nnsacf_NSAC_NumOfPDUsUpdate Request and/or the like) to a network node (e.g., NSACF, a network node indicated by the information of where to report of the ABNSAC configuration information). The report may indicate the expiration of the timer for the PDU session for the network slice. The report message sent by the SMF may comprise at least one of an identifier of the UE, an identifier of the PDU session, an identifier of the network slice, and/or an indication of expiration of the timer.

In an example, the NSACF may receive the report message sent by the SMF. Based on the report message, the NSACF may determine whether to release/keep the PDU session of the network slice.

In one example, for the determination of whether to release/keep the PDU session of the network slice, the NSACF may use information of the number of PDU sessions established for the network slice. For example, if a condition (e.g., the number of PDU sessions established for the network slice reaches the maximum number of PDU sessions established for the network slice, the number of PDU sessions established for the network slice is above a threshold, the expiration of the timer) is met, the NSACF may determine to release the PDU session for the network slice. The release of the PDU session for the network slice may be performed by the SMF and/or the UE. For example, if the condition is not met, the NSACF may determine to keep the PDU session for the network slice. The keeping of the PDU session for the network slice may be that the PDU session may not be released and/or that the PDU session for the network slice may be de-activated and/or that a status (e.g., active/inactive) of the PDU session for the network slice may not change.

In one example, for the determination of whether to release/keep the PDU session of the network slice, the NSACF may use information of a number of PDU sessions activated for the network slice. For example, if a condition (e.g., the number of PDU sessions activated for the network slice reaches the maximum number of PDU sessions activated for the network slice, the number of PDU sessions activated for the network slice is above a threshold, the expiration of the timer) is met, the NSACF may determine to deactivate the PDU sessions for the network slice. The deactivation of the PDU sessions for the network slice may be that the PDU session is deactivated and/or that the PDU session is released. For example, if the condition is not met, the NSACF may determine to keep the PDU session for the network slice. The keeping of the PDU session for the network slice may be that the PDU session may not be released and/or that the PDU session for the network slice may be de-activated and/or that status of the PDU session for the network slice may not change.

In one example, for the determination of whether to release/keep the PDU session of the network slice, the NSACF may use information of a number of PDU sessions activated for the network slice and/or a number of PDU sessions established for the network slice. For example, if a first condition (e.g., the number of PDU sessions established for the network slice reaches the maximum number of PDU sessions established for the network slice) is met, the NSACF may determine to release the PDU session for the network slice. For example, if a second condition (e.g., the number of PDU sessions established for the network slice does not reach the maximum number of PDU sessions established for the network slice, the number of PDU sessions activated for the network slice reaches the maximum number of PDU sessions activated for the network slice, and/or the expiration of the timer) is met, the NSACF may determine to de-activate, and/or to release the PDU session for the network slice. For example, if a third condition (e.g., the number of PDU sessions activated for the network slice does not reach the maximum number of PDU sessions activated for the network slice, the expiration of the timer) is met, the NSACF may determine to keep the PDU session for the network slice.

For example, the NSACF may manage the number of PDU sessions activated for the network slice and/or the maximum number of PDU sessions activated for the network slice. The number of PDU sessions activated for the network slice may be used to count the number of PDU sessions that are activated for the network slice. The PDU session for the network slice may be interpreted as activated if a network resource for the PDU session is allocated in the NG-RAN and/or in the UPF. For example, the NG-RAN may allocate a network resource (e.g., a radio resource, RLC, MAC, PDCP) for the PDU session. For example, the UPF may allocate a network resource (e.g., N3 tunnel endpoint for NG-RAN, etc.) for the PDU session. For an established PDU session, the PDU session may be active (activated) or inactive (deactivated). A number of established PDU sessions for a network slice may be a sum of a number of active PDU sessions for the network slice and the number of inactive PDU sessions for the network slice. If one or more PDU sessions for the network slice is deactivated, the number of PDU sessions activated for the network slice may be equal or smaller than the number of PDU sessions established for the network slice.

In an example, based on the determination of whether to release/keep the PDU session of the network slice, the NSACF may send a report response message (e.g., a Nnsacf_NSAC_NumOfPDUsUpdate Response and/or the like) to the SMF. The report response message may comprise at least one of the information of the network slice, information of whether to keep/release/deactivate the PDU session for the network slice, the time period information (e.g., time period during which the UE may not request activation of the PDU session and/or time period during which the UE may not request establishment of a PDU session for the network slice), the identifier of the PDU session, the identifier of the UE. Based on the received report response message, the SMF may determine whether to keep/release/deactivate the PDU session of the network slice for the UE.

In an example, if the received report response message indicates that the PDU session for the network slice is to be released, the SMF may send a message (e.g., PDU session release command), to the UE. In an example, if the received report response message indicates that the PDU session for the network slice is to be keep(deactivate), the SMF may send a message (e.g., PDU session deactivation command), to the UE. The message sent to the UE may comprise at least one of the identifier of the PDU session, the identifier of the UE, the identifier of the network slice, a cause of the release/deactivation (e.g., the PDU session is to be released/deactivated due to inactivity, reaching quota of the network slice (e.g., reaching the maximum number of PDU sessions established for the network slice, reaching the maximum number of PDU sessions activated for the network slice)), the time period information during which the UE may not request activation of the PDU session, the time period information during which the UE may not request establishment of a PDU session for the network slice, and/or information that the PDU session is released/deactivated due to inactivity.

In an example, the UE may receive the message sent by the SMF. If the message sent by the SMF comprises the time period information during which the UE may not request activation of the PDU session, the UE may start a timer based on the time period information. If the timer is running and/or if the time period is not elapsed, the UE may not request activation of the PDU session. If the message sent by the SMF comprise the time period information during which the UE may not request establishment of a PDU session for the network slice, the UE may start a timer based on the time period information. If the timer is running and/or if the time period is not elapsed, the UE may not request establishment of a PDU session for the network slice.

In an example, if the received report response message indicates that the PDU session for the network slice is to be released (deactivated), the SMF may send a N2 message (e.g., N2 SM Resource Release request) to the NG-RAN. Based on the received N2 message, the NG-RAN may release the RRC connection with the UE, release radio resources allocated for the PDU session, and/or may transit the UE into RRC Inactive mode. In an example, if the received report response message indicates that the PDU session for the network slice is to be released and/or deactivated, the SMF may send a N4 message (e.g., N4 session release request) to the UPF. Based on the received message, the UPF may release N3 resources of the PDU session.

Figure 32:
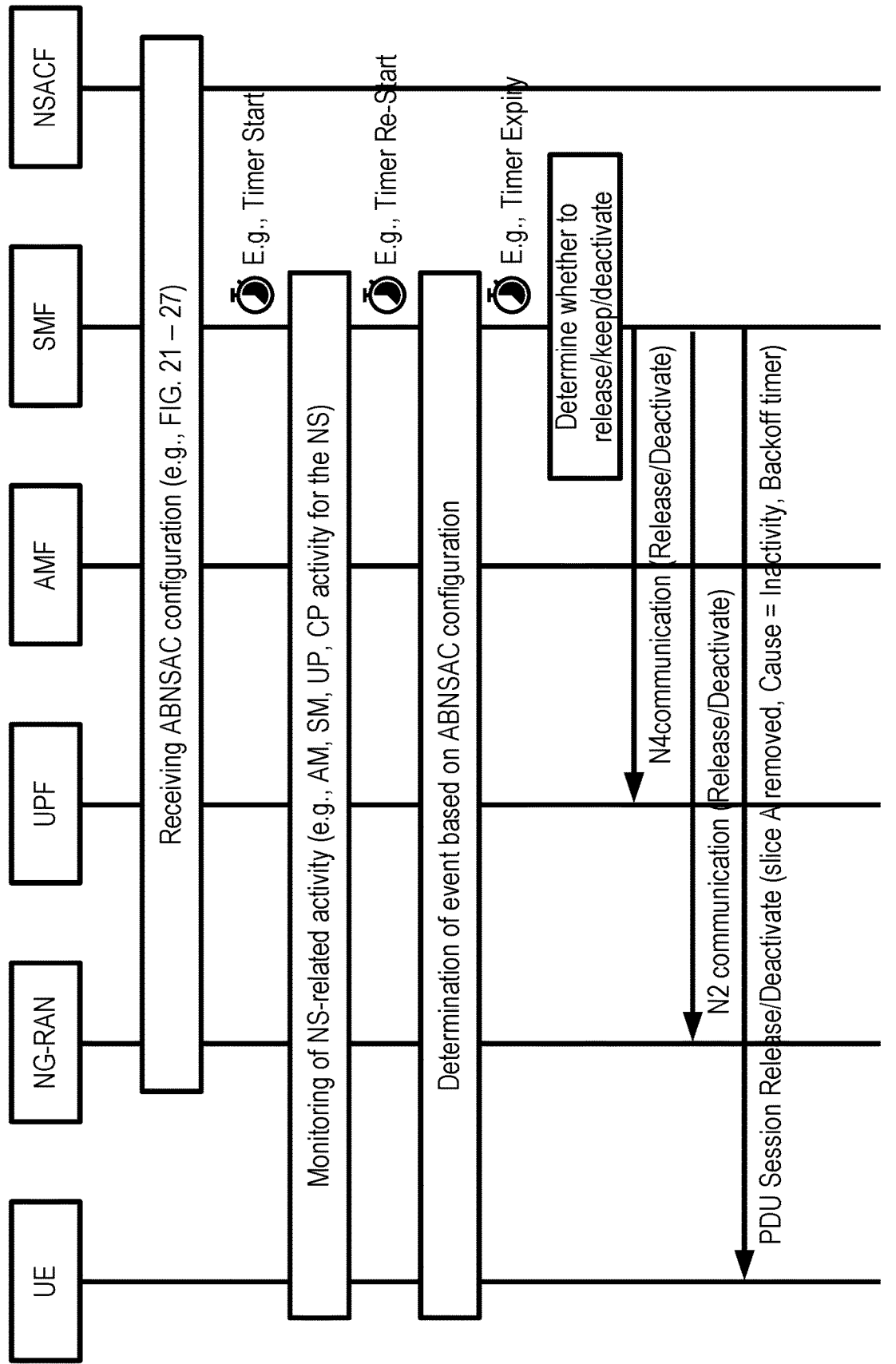
FIG. 32 is an example diagram of an aspect of an embodiment of the present disclosure.

FIG. 32 depicts one example embodiment of the present disclosure. In an example, a network node may use the ABNSAC configuration, to monitor activity of a PDU session, for network slice quota management. In an example, a network node may use the ABNSAC configuration, to manage resources for the PDU session.

In an example, one or more network nodes (e.g., the NSACF, the SMF, the AMF, the UPF, NG-RAN, and/or the UE) may receive the ABNSAC configuration information. To receive the ABNSAC configuration information, the one or more examples as shown in FIG. 21, 22, 23, 24, 25, 26, 27 may be used. In an example, the ABNSAC configuration information may be the ABNSAC configuration as shown in the example of FIG. 28, 31. In an example, the SMF may determine the expiration of the timer, as shown in the example of FIG. 31.

In an example, when the timer expires for the PDU session for the network slice, the SMF may perform one or more actions. For example, the one or more actions may be based on the information of action to be performed at the expiration of the timer, and/or based on the locally configuration information. The one or more actions may indicate one or more actions to be performed by the SMF at the timer expiration. For example, when the timer expires for the PDU session for the network slice, the SMF may determine whether to keep/release/deactivate the PDU session for the network slice, based on the one or more actions. For example, based on that the one or more actions indicates to release, the SMF may determine to release the PDU session for the network slice. Based on the determination to release, the SMF may send a message (e.g., PDU Session Release command message) to the UE, as shown in the example of FIG. 31. For example, based on that the one or more actions indicates to deactivate, the SMF may determine to deactivate the PDU session for the network slice. Based on the determination to deactivate, the SMF may send a message (e.g., a N2 message (e.g., N2 SM Resource Release request) and/or N4 message (e.g., N4 session release request)) to the NG-RAN and/or to the UPF, as shown in the example of FIG. 31.

Figure 33:
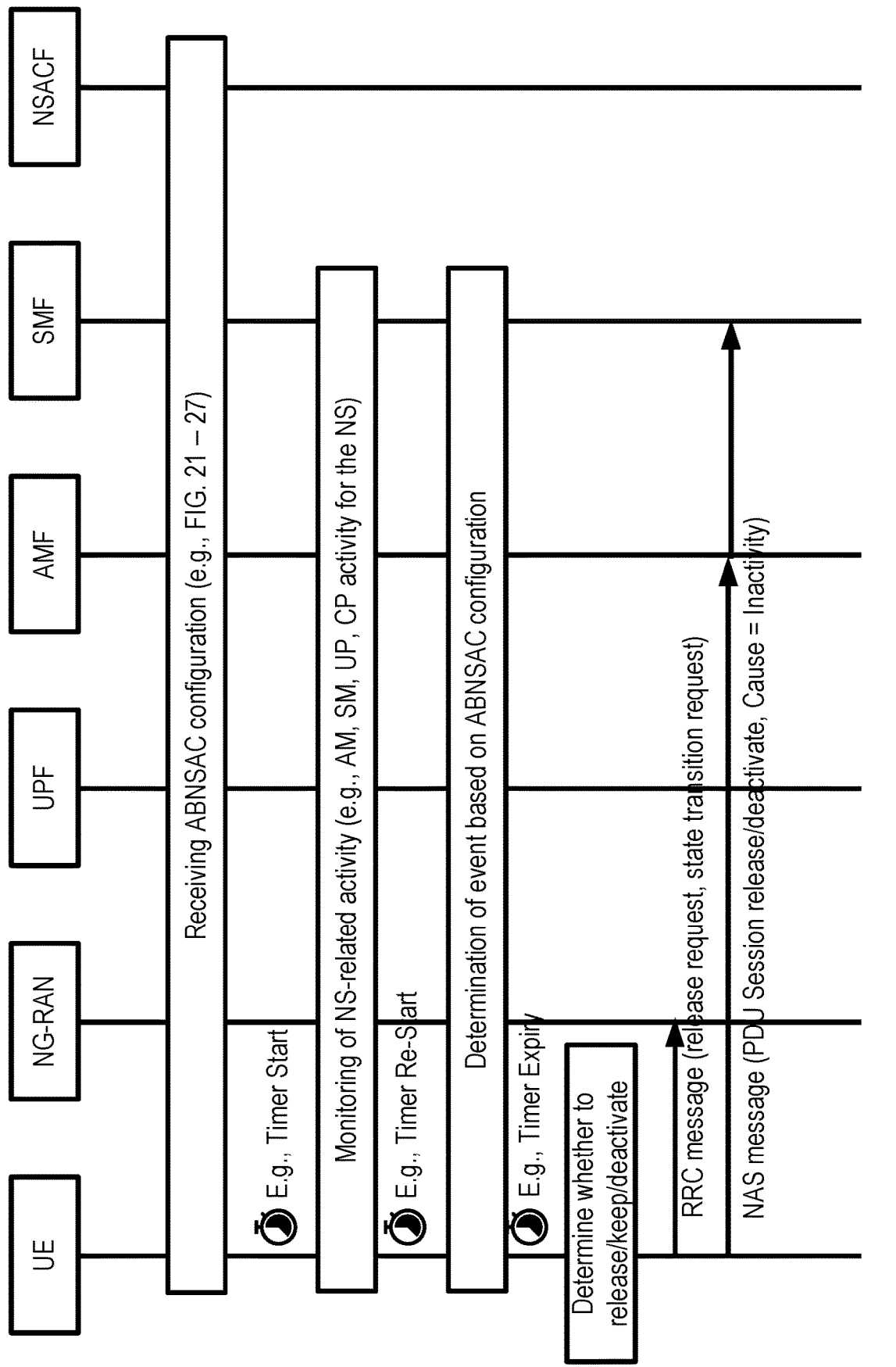
FIG. 33 is an example diagram of an aspect of an embodiment of the present disclosure.

FIG. 33 depicts one example embodiment of the present disclosure. In an example, a network node may use the ABNSAC configuration, to monitor activity of a PDU session, for network slice quota management. In an example, a network node may use the ABNSAC configuration, to manage resources for the PDU session.

In an example, one or more network nodes (e.g., the NSACF, the SMF, the AMF, the UPF, the NG-RAN, and/or the UE) may receive the ABNSAC configuration information. To receive the ABNSAC configuration information, the one or more examples as shown in FIG. 21, 22, 23, 24, 25, 26, 27 may be used. In an example, the ABNSAC configuration information may be the ABNSAC configuration as shown in the example of FIG. 28.

In an example, the UE may receive the ABNSAC configuration information from the network node (e.g., the AMF, the UDM, the NSACF, the PCF, the SMF) for the network slice for which the ABNSAC may apply, using a NAS message (e.g., a PDU Session Establishment Accept message, UE configuration Update, etc.). If the UE supports one or more network slices for which the ABNSAC applies, the ABNSAC configuration information may comprise information for the one or more network slices and/or for the one or more PDU sessions.

In an example, based on the ABNSAC configuration information, the UE may start a NS PDU monitoring timer for the PDU session of the network slice. For example, the UE may start the NS PDU monitoring timer based on that the UE receives a NAS message (e.g., a PDU Session Establishment Accept message, UE configuration Update, etc.). For example, the UE may start the NS PDU monitoring timer for the PDU session for the network slice, based on that the ABNSAC configuration information associated with the PDU session for the network slice is received. For example, the UE may start the NS PDU monitoring timer, with the value for the timer of the ABNSAC configuration information.

In an example, based on the ABNSAC configuration information, the UE may manage the NS PDU monitoring timer for the network slice. For example, when the UE sends and/or receives a NAS message (e.g., a PDU session modification Request/Accept message) for the PDU session for the network slice, the UE may restart the NS PDU monitoring timer for the network slice. For example, when the UE sends and/or receives a traffic for the PDU session for the network slice, the UE may restart the NS PDU monitoring timer for the PDU session for the network slice.

In an example, the UE may determine whether an event occurs for the PDU session for the network slice. For example, based on the ABNSAC configuration information, the UE may determine whether an event occurs for the PDU session for the network slice. For example, the UE may determine whether the NS PDU monitoring timer expires for the PDU session for the network slice expires. When the timer expires for the PDU session for the network slice and/or when the event occurs, the UE may perform one or more actions. For example, the information of action to be performed at the expiration of the timer may indicate the one or more actions to be performed by the UE when the timer expires. For example, the UE may determine whether to keep/release/deactivate the PDU session for the network slice for which the timer expires. For example, based on that the one or more actions indicate to release, the UE may determine to release the PDU session of the network slice. Based on the determination, the UE may send a message (e.g., PDU session release message), to the SMF. The message sent by the UE may comprise at least one of the identifier of the PDU session, and/or a cause value. The cause value may indicate that inactivity is detected for the PDU session for the network slice, and/or that the timer expires for the PDU session. For example, based on that the one or more actions indicate to deactivation, the UE may determine to request deactivation of the PDU session of the network slice, to request release of RRC connection and/or to request transition to RRC Inactive state. Based on the determination, the UE may send a message (e.g., PDU session deactivation request message) to the SMF, the UE may send a message (e.g., service request message, service release message, N1 release message) to the AMF, and/or the UE may send a message (e.g., RRC connection release message, RRC Inactive state Request) to the NG-RAN. The message sent by the UE to the SMF may comprise at least one of the identifier of the PDU session, a cause value, and/or request for deactivation. The cause value may indicate that inactivity is detected for the PDU session for the network slice, and/or that the timer expires for the PDU session. The message sent by the UE to the AMF may comprise at least one of the identifier of the PDU session, the cause value, request for deactivation of the PDU session, and/or a request to release N1 connection. The message sent by the UE to the NG-RAN may comprise at least one of the identifier of the PDU session, the cause value, request for state transition to RRC-Inactive state, and/or information of radio resource associated with the PDU session for which the timer expires. Based on the message sent by the UE, the AMF, the SMF, and/or the NG-RAN may deactivate the resources for the PDU session associated with the network slice.

Figure 34:
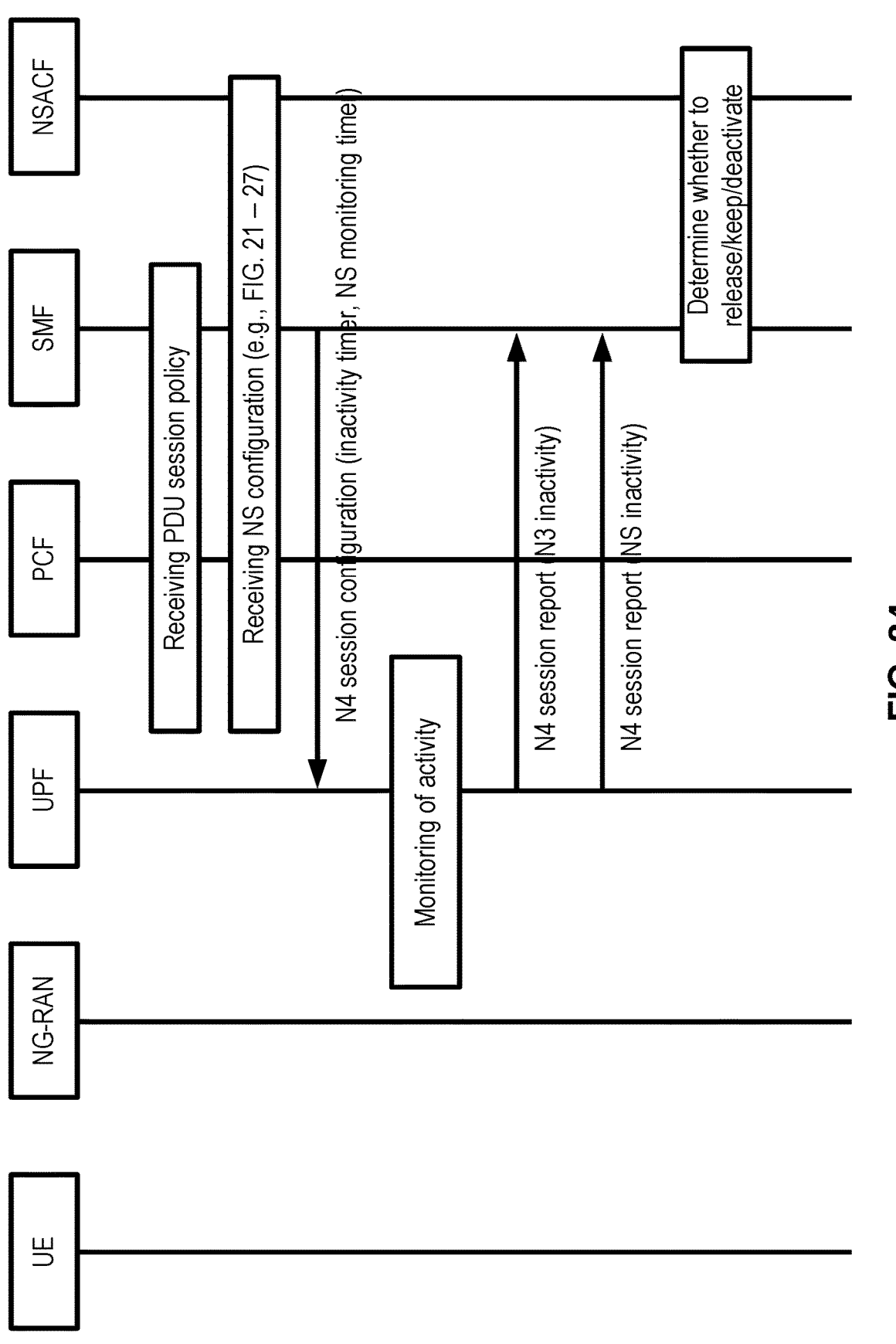
FIG. 34 is an example diagram of an aspect of an embodiment of the present disclosure.

FIG. 34 depicts one example embodiment of the present disclosure. In an example, a network node may use the ABNSAC configuration, to monitor activity of a PDU session, for network slice quota management. In an example, a network node may use the ABNSAC configuration, to manage resources for the PDU session.

In an example, one or more network nodes (e.g., the NSACF, the SMF, the AMF, the UPF, NG-RAN, and/or the UE) may receive the ABNSAC configuration information. To receive the ABNSAC configuration information, the one or more examples as shown in FIG. 21, 22, 23, 24, 25, 26, 27 may be used. In an example, the ABNSAC configuration information may be the ABNSAC configuration as shown in the example of FIG. 28.

In an example, for a PDU session, the PCF may determine one or more parameters for a PDU session. For example, the PCF may determine one or more configuration information for the PDU session. The one or more configuration information may comprise a first time interval (e.g., an inactivity detection time) and/or a second time interval (a NS monitoring time). The first time interval may be used to manage a resources (e.g., N3 tunnel resources) at a UPF and/or a NG-RAN. For example, when there is no data traffic for the PDU session for a duration of the first time interval, the UPF may report to the SMF, detection of data inactivity for the first time interval. Based on the report, the SMF may determine to release resources (e.g., N3 tunnel resource, RRC resource) for the PDU session. For example, when there is no data traffic for the PDU session for the duration of the second time interval, the UPF may report to the SMF, detection of data inactivity for the second time interval.

Based on that there is no activity for the second time interval, the SMF may determine to release the PDU session. For the configuration of the second time interval, the PCF may send a request to the NSACF associated with the network slice for which the PDU session is established. Based on the information of the network slice, the NSACF may send information for a value for the second time interval to the SMF. For example, the second time interval may be the value for the NS PDU monitoring timer. The PCF may send the one or more determined configuration parameter to the SMF.

In an example, the SMF may receive the one or more configuration parameter sent by the PCF. The SMF may receive information of the first time interval and/or the second time interval for the PDU session for the network slice. If the PCF does not send the information of the second time interval, the SMF may use locally configured information for the second time interval and/or may receive the information of the second time interval from the NSACF. For example, the SMF may get information of the second time interval, based on the ABNSAC configuration information. Based on the information of the first time interval and/or the second time interval, the SMF may send to the UPF, a N4 message (e.g., N4 Session configuration message). The N4 message may comprise the information of the first time interval and/or the second time interval.

In an example, the UPF may receive from the SMF, the information of the first time interval and/or the second time interval for the PDU session. The UPF may monitor activity over the PDU session. If the UPF does not detect activity over the PDU session for the duration of the first time interval, the UPF may send to the SMF, a first N4 session report message. The first N4 session report message may indicate at least one of the inactivity of the PDU session, the inactivity for the duration of the first time interval, and/or inactivity of N3 interface. Based on the received first N4 session report message, the SMF may determine to deactivate the PDU session. If the UPF does not detect activity over the PDU session for the duration of the second time interval, the UPF may send to the SMF, a second N4 session report message. The second N4 session report message may indicate that the inactivity of the PDU session for the network slice, that the inactivity for the duration of the second time interval, and/or the inactivity of the network slice. Based on the received second N4 session report message, the SMF may determine to release the PDU session and/or may determine to send a report message (e.g., Nnsacf_NSAC_NumOfPDUsUpdate) to the NSACF in charge of the network slice associated with the PDU session. Based on the report message from the SMF, the NSACF may determine whether to keep/release/deactivate the PDU session for the network slice. For example, when the SMF receives from the UPF the second N4 session report message, the example as shown in the example of FIG. 31, 32 for the expiration of the timer may be used.

Figure 35:
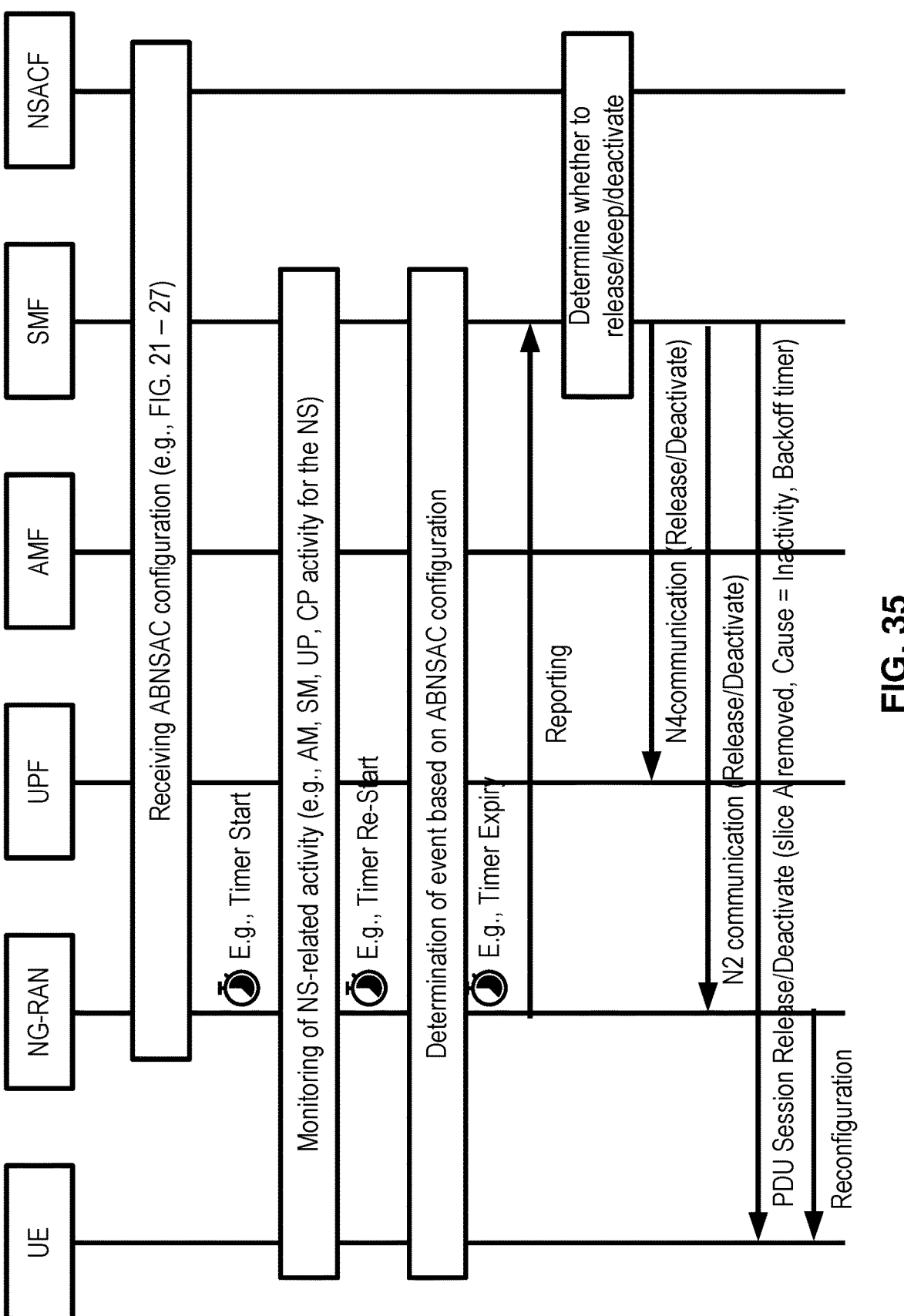
FIG. 35 is an example diagram of an aspect of an embodiment of the present disclosure.

FIG. 35 depicts one example embodiment of the present disclosure. In an example, a network node may use the ABNSAC configuration, to monitor activity of a PDU session, for network slice quota management. In an example, a network node may use the ABNSAC configuration, to manage resources for the PDU session.

In an example, the NG-RAN may perform monitoring of activity of the PDU session. For example, the NG-RAN may start the NS PDU monitoring timer. For example, the NG-RAN may report the expiration of the timer to the SMF and/or the NSACF.

Figure 36:
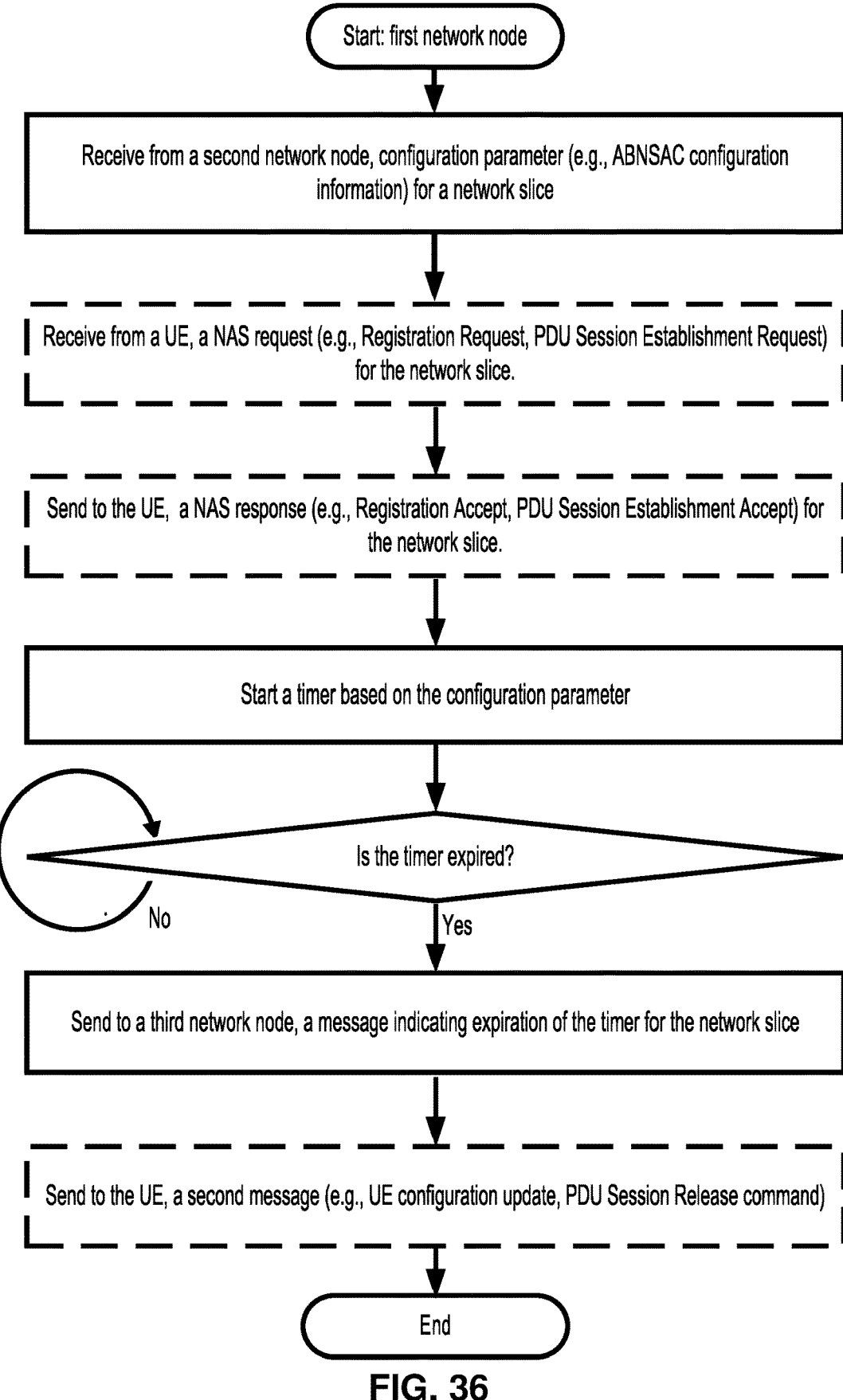
FIG. 36 is an example diagram of an aspect of an embodiment of the present disclosure.

FIG. 36 depicts one example embodiment of the present disclosure. In an example, a network node may use the ABNSAC configuration, to monitor activity of a UE, for network slice quota management. In an example, a network node may use the ABNSAC configuration, to manage resources for the UE.

In an example, a first network node (e.g., an AMF, a SMF) may receive from a second network node (e.g., a NSACF, a UDM, a PCF, a UDR, an AF), a configuration parameter (e.g., ABNSAC configuration information). The configuration parameter may comprise at least one of one or more values for one or more timers for one or more network slices, and/or one or more identifiers of the one or more network slices. The one or more network slices may comprise at least one of a first network slice and/or a second network slice. The configuration parameter (e.g., the ABNSAC configuration information) may comprise at least one of a first value for a first timer for the first network slice and/or a second value for a second timer for the second network slice.

In an example, the first network node may receive from a UE, a NAS request (e.g., a Registration Request, PDU Session Establishment Request) message for the first network slice. For example, the NAS request message may comprise the identifier of the first network slice.

In an example, based on the NAS request message received from the UE, the first network node may send a NAS response (e.g., a Registration Accept, PDU Session Establishment Accept) message to the UE. The NAS response message may comprise the identifier of the first network slice.

In an example, the first network node may start the first timer. For example, based on receiving the NAS request message from the UE, based on sending the NAS response message to the UE, and/or based on the configuration parameter for the first network slice, the first network node may start the first timer for the first network slice with the value for the first timer of the configuration parameter. For example, based on notification of inactivity for the first network slice, the first network node may start the first timer.

In an example, the first network node may determine whether the first timer for the first network slice for the UE expires or not. For example, the first network node may restart the first timer based on one or more events. For example, if the first network node receives a message associated with the first network slice, the first network node may restart the first timer. For example, if the UE sends and/or receives a data for the first network slice, the first network node may restart the first timer.

In an example, based on the determination that the first timer expires, the first network node may send to a third network node (e.g., the NSACF, the AF) a message. The message may comprise information that the first timer for the first network slice expires for the UE, that inactivity of the first network slice is detected, that a counter for the first network slice needs to be decreased, an identifier of a PDU session for the first network slice, an identifier of the UE, the identifier of the first network slice, that the PDU session is released, that the UE is deregistered for the first network slice, and/or the like.

In an example, the first network node may send to the UE, a second message (e.g., UE configuration update message, PDU Session Release command). For example, the first network node may determine to release and/or deactivate the PDU session for the first network slice. For example, the first network node may determine to deregister the UE for the first network slice. For example, the first network node may determine to release/deactivate/deregister, based on a response. For example, the third network node may send the response to the first network node.

Figure 37:
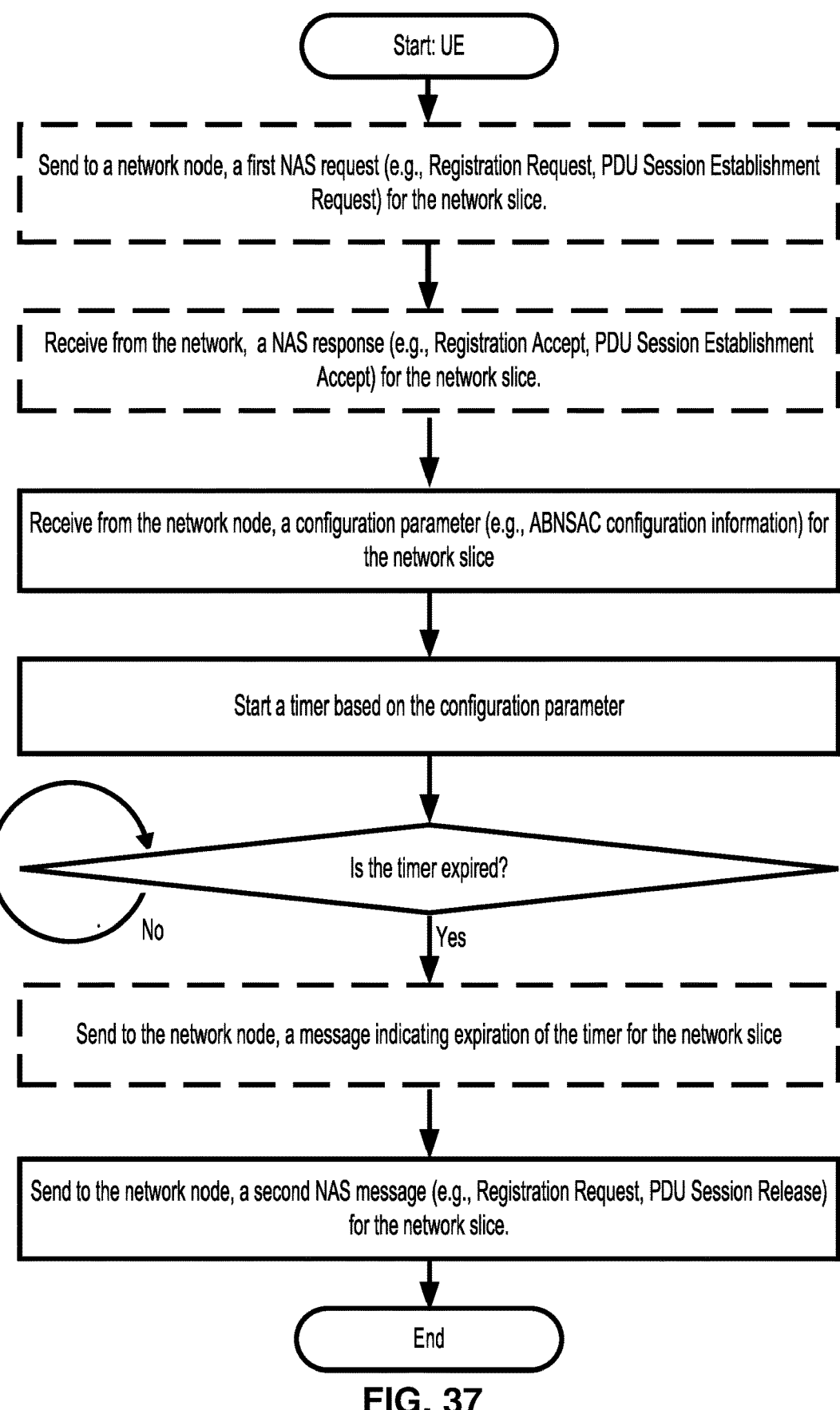
FIG. 37 is an example diagram of an aspect of an embodiment of the present disclosure.

FIG. 37 depicts one example embodiment of the present disclosure. In an example, a network node may use the ABNSAC configuration, to monitor activity of a network slice, for network slice quota management. In an example, a network node may use the ABNSAC configuration, to manage resources for the network slice.

In an example, a UE may send to a network node (e.g., an AMF, a SMF) a first NAS request (e.g., a Registration Request, a PDU Session Establishment Request) message for one or more network slices. The one or more network slices may comprise at least a first network slice.

In an example, based on the first NAS request message, the UE may receive from the network node, a first NAS response (e.g., a Registration Response, a PDU Session Establishment Response) message.

In an example, the UE may receive from the network node, a configuration parameter (e.g., ABNSAC configuration information). For example, based on that the first NAS request message comprises information of the first network slice, the UE may receive the configuration parameter comprising information associated with the first network slice. The configuration parameter may comprise at least one of one or more values for one or more timers for one or more network slices, and/or one or more identifiers of the one or more network slices. The one or more network slices may comprise at least the first network slice. The configuration parameter may comprise at least a first value for a first timer for the first network slice. For example, the configuration parameter may comprise the ABNSAC configuration information.

In an example, the UE may start the first timer based on the configuration parameter. For example, based on receiving the first NAS response message from the network node and/or based on the configuration parameter for the first network slice, the UE may start the first timer for the first network slice with the first value for the first timer.

In an example, the UE may determine whether the first timer for the first network slice expires or not. For example, the UE may restart the first timer based on one or more events. For example, the one or more events may be that the UE sends and/or receives a message associated with the first network slice and/or that the UE sends and/or receives a data for the first network slice.

In an example, based on the determination that the first timer expires, the UE may send to the network node, a message. The message may comprise information that the first timer for the first network slice expires, that inactivity of the first network slice is detected, that a counter for the first network slice needs to be decreased, an identifier of a PDU session for the first network slice, an identifier of the UE, and/or the identifier of the first network slice.

In an example, the UE may send a second NAS request message (e.g., Registration Request, PDU Session Release request) to the network node. The second NAS message may comprise at least one of a request that the PDU session is to be released, a request that the first network slice needs to be deregistered, and/or the like.

In an example, a first network node (e.g., AMF) may receive from a second network node (e.g., NSACF, PCF, UDM, UDR, AF), configuration information for quota management (e.g., network slice quota management). For example, for a network slice, the quota management may be network slice admission control. The network slice admission control may comprise admission control of a wireless device and/or a packet data unit (PDU) session, based on at least one of a number of registered wireless devices for the network slice, a number of established PDU sessions for the network slice, a number of active wireless devices for the network slice, a number of activated PDU sessions for the network slice, and/or a number of deactivated PDU sessions for the network slice. For example, the quota management (e.g., the network slice admission control) may allow/request registration/deregistration of the wireless device for the network slice and/or may allow/request establishment/release/deactivation of the PDU session of the wireless device for the network slice.

In an example, the first network node may receive from the second network node, the configuration information for the quota management, based on sending a request (e.g., Nnsacf_NSAC_NumOfUEsUpdate Request) to the second network node. For example, the request sent by the first network node to the second network node may comprise at least one of an indication of whether the number of wireless devices registered with the network slice is to be increased or not, an identity of the wireless device, an access type to which the network slice is allowed, an identity of the network slice, an identity of the first network node. For example, the second network node may use the number of wireless devices registered with the network slice to track the number of wireless devices registered for the network slice and/or may manage a list of wireless devices allowed for the network slice. For example, when the wireless device needs to be registered for the network slice, the indication of whether the number of wireless devices registered with the network slice is to be increased or not may indicate increase.

In an example, the first network node may send the request (e.g., Nnsacf_NSAC_NumOfUEsUpdate Request) to the second network node, based on receiving from the wireless device a registration request message. The registration request message may comprise at least one of an information (e.g., S-NSSAI) of a list of requested network slices comprising the network slice, and/or an identity of the wireless device. In response to the receiving the registration request message from the wireless device, the first network node may send to the wireless device, a response message comprising one or more identities of network slices allowed for the wireless device. The one or more identities of network slices allowed for the wireless device may comprise at least the network slice which is associated with the timer (e.g., NS UE monitoring timer).

In an example, the configuration information received from the second network node may comprise at least one of a timer value for the timer associated with quota management of the network slice, the identity of the network slice, and/or an indication of whether maximum number of wireless devices registered with the network slice is reached or not. For example, the second network node may use the maximum number of wireless devices registered with the network slice to limit the number of wireless devices registered for the network slice. For example, when the number of wireless devices registered with the network slice reaches the maximum number of wireless devices registered with the network slice, the second network node may send a rejection to the indication received from the first network node. Based on this rejection from the second network node, the first network node may reject the registration request from the wireless device for the network slice. The second network node may determine the configuration information sent to the first network node, based on information from an application server. The application server may use the network slice and/or may manage the network slice. In an example, the configuration information may further comprise at least one of a result indicating whether the number of wireless devices registered for the network slice reaches a threshold, a result indicating whether the number of wireless devices registered for the network slice does not reach a threshold, whether the first network node needs to start a timer for the wireless device, and/or an information of time period during which registration request for the network slice is not allowed.

In an example, the second network node may perform admission control of at least one of the wireless device for the network slice. For example, the second network node may comprise network slice admission control function (NSACF). In an example, the first network node may manage access and mobility control for the wireless device. For example, the first network node may comprise access and mobility control function (AMF).

In an example, the first network node may start the timer for the wireless device with the timer value of the configuration information. For example, the timer may be associated with the network slice and/or the quota management for the network slice. For example, the first network node may start the timer when the network slice is allowed for the wireless device, when the first network node sends the message comprising one or more identities of network slices allowed for the wireless device, when a PDU session established over the network slice is released, and/or when there is no more PDU session established over the network slice.

In an example, for the wireless device, the first network node may restart the timer associated with the network slice. For example, the first network node may restart the timer when a PDU session is established for the network slice, when a message for the PDU session is received, and/or when a message associated with the network slice is received from the wireless device.

In an example, for the wireless device, the first network node may stop the timer associated with the network slice. For example, the first network node may stop the timer when a PDU session is established for the network slice and/or the network slice is de-registered for the wireless device.

In an example, the first network node may determine whether the timer for the wireless device expires or not. For example, the timer may expire if the timer does not stop for a period indicated by the value of the timer after the timer starts and/or restarts. For example, the timer may expire if the timer runs for a time period indicated by the value for the timer after the timer starts or restarts.

In an example, based on the determination that the timer for the wireless device expires, the first network node may send to the second network node, an indication. The indication may comprise at least one of indication of expiration of the timer for the wireless device, the identity of the wireless device, and/or the identity of the network slice.

In an example, based on the received indication (e.g., indication of expiration of the timer for the wireless device) from the first network node, the second network node may determine to disallow the network slice for the wireless device associated with the expiration of the timer, to request de-registration/release of the network slice for the wireless device, and/or to update the number of the wireless devices registered for the network slice.

In an example, based on the indication of expiration of the timer associated with the network slice for the wireless device, the first network node may receive from the second network node, a message comprising at least one of a request to de-register/release the network slice for the wireless device and/or an indication that maximum number of UEs registered for the network slice reached. Based on the message received from the second network node, the first network node may send to the wireless device, a message (e.g., UE configuration update, Registration Reject) comprising at least one of an indication that the network slice is de-registered, released, rejected for the wireless device, a cause indicating that the network slice is de-registered based on inactivity of the wireless device for the network slice, an information of a time period during which a registration request for the network slice is not allowed, one or more allowed network slices (allowed S-NSSAIs), and/or one or more rejected network slices (rejected S-NSSAIs).

In an example, a third network node (e.g., SMF) may receive from a second network node (e.g., NSACF, PCF, UDM, UDR, AF), configuration information for the quota management.

In an example, the third network node may receive from the second network node, the configuration information for the quota management, based on sending a request (e.g., Nnsacf_NSAC_NumOfPDUsUpdate Request) to the second network node. For example, the request sent by the third network node to the second network node may comprise at least one of an indication of whether the number of established PDU sessions for the network slice is to be increased, an indication of whether the number of activated PDU sessions for the network slice is to be increased, an identity of the wireless device, an identity of a PDU session, an access type to which the PDU session is established, an identity of the network slice, and/or an identity of the third network node. For example, the second network node may use the number of established PDU sessions for the network slice to track the number of PDU sessions established for the network slice. For example, the second network node may use the number of activated PDU sessions for the network slice to track the number of PDU sessions activated for the network slice. For example, the second network node may manage a list of wireless devices for which the PDU sessions are established for the network slice. For example, when the PDU session needs to be established for the network slice, the indication of whether the number of established PDU sessions for the network slice is to be increased may indicate increase. For example, when the PDU session needs to be activated for the network slice, the indication of whether the number of activated PDU sessions for the network slice is to be increased may indicate increase.

In an example, the third network node may send the request to the second network node, based on receiving from the wireless device and/or a first network node (e.g., an AMF), a PDU session-related message (e.g., PDU session establishment request message, a PDU session modification message, Nsmf_PDUSession_UpdateSMContext). The PDU session-related message may comprise at least one of information (e.g., S-NSSAI) of the network slice, an identity of the wireless device and/or an identity of the PDU session. In response to receiving the PDU session-related request message from the wireless device and/or the first network node, the third network node may send a response message (e.g., PDU session establishment accept message, Namf_Communication_N1N2MessageTransfer). The response message may comprise at least one of the identity of the network slice, the identity of the PDU session, and/or a result. The identities of the network slice may be associated with the timer (e.g., NS PDU monitoring timer).

In an example, the configuration information received from the second network node may comprise at least one of a timer value for the timer associated with quota management of the network slice, the identity of the network slice, an indication of whether maximum number of established PDU session for the network slice reached, and/or an indication of whether maximum number of activated PDU session for the network slice reached. For example, the second network node may use the maximum number of established PDU sessions for the network slice to limit the number of established PDU sessions for the network slice. For example, when the number of established PDU sessions for the network slice reaches the maximum number of established PDU sessions for the network slice, the second network node may determine to reject the indication (e.g., the number of established PDU session needs to be increased) from the third network node. Based on this determination of the reject, the third network node may reject the PDU session-related message (e.g., PDU session establishment request) from the wireless device for the network slice. For example, the second network node may use the maximum number of activated PDU sessions for the network slice to limit the number of activated PDU sessions for the network slice. For example, when the number of activated PDU sessions for the network slice reaches the maximum number of activated PDU sessions for the network slice, the second network node may determine to reject the indication (e.g., the number of activated PDU session needs to be increased) from the third network node. Based on this determination of the reject, the third network node may reject the PDU session-related message (e.g., Namf_Communication_N1N2MessageTransfer) for the network slice. For example, for the determination of the configuration information, the second network node may use information from an application server. The application server may use the network slice and/or may manage the network slice. In an example, the configuration information may further comprise at least one of a result indicating whether the number of established PDU sessions for the network slice reaches a threshold, whether the number of activated PDU sessions for the network slice reaches a threshold, whether the third network node needs to start a timer for the PDU session for the network slice, and/or an information of time period during which PDU session-related request for the network slice for the wireless device is not allowed.

In an example, the second network node may perform admission control (e.g., quota management) of at least one of the PDU sessions for the network slice. For example, the second network node may comprise at least network slice admission control function (NSACF). In an example, the third network node may manage session (e.g., PDU session) for the wireless device. For example, the third network node may comprise session management function (SMF).

In an example, the third network node may start the timer for the PDU session with the timer value of the configuration information. For example, the timer may be associated with the network slice, the quota management for the network slice, and/or quota management for the PDU session. For example, the third network node may start the timer when the PDU session for the network slice is established for the wireless device, when the third network node sends the session-related message (e.g., PDU session establishment request, Namf_Communication_N1N2MessageTransfer) for the PDU session for the network slice, when the PDU session is activated, and/or when an inactivity for the PDU session is notified.

In an example, for the PDU session, the third network node may restart the timer associated with the network slice. For example, the third network node may restart the timer when the PDU session is activated, when a session-related message for the PDU session is received, and/or when an activity is detected for the PDU session.

In an example, for the PDU session, the third network node may stop the timer associated with the network slice. For example, the third network node may stop the timer when the PDU session is released for the network slice, and/or when the network slice is de-registered for the wireless device.

In an example, the third network node may determine whether the timer for the PDU session expires or not. For example, the timer expires if the timer does not stop for the time period after the timer starts and/or restarts.

In an example, based on the determination that the timer for the PDU session expires, the third network node may send to the second network node, an indication. The indication may comprise at least one of indication of expiration of the timer for the PDU session, the identity of the wireless device, the identity of the network slice, and/or the identity of the PDU session.

In an example, based on the received indication (e.g., indication of expiration of the timer for the PDU session) from the third network node, the second network node may determine whether to release/deactivate/keep the PDU session for the wireless device associated with the expiration of the timer, whether to request release/deactivation/keeping of the PDU session for the network slice, whether to update the number of established PDU sessions, and/or whether to update the number of activated PDU sessions. For example, the second network may send to the third network node, the information of the determination.

In an example, based on sending the indication of the timer associated with the network slice expiration for the PDU session, the third network node may receive from the second network node, a message associated with the determination. The message may comprise at least one of a request to deactivate/release the PDU session for the network slice, an indication that maximum number of established PDU sessions for the network slice reached, and/or an indication that maximum number of activated PDU sessions for the network slice reached. Based on the message received from the second network node, the third network node may send to the wireless device, a message (e.g., PDU session release command and/or PDU session deactivation command) comprising at least one of an indication that the PDU session needs to be released/deactivated, a cause indicating that the PDU session needs to be released/deactivated based on inactivity of the wireless device, and/or an information of a time period during which a request for the PDU session (e.g., a service request, a PDU session establishment request) is not allowed.

In an example, a first network node (e.g., AMF, SMF) may receive from a second network node (e.g., NSACF, PCF, UDM, UDR, AF), configuration information for the quota management. For example, the configuration information received from the second network node may comprise at least one of a timer value for a timer associated with quota management of the network slice, the identity of the network slice, and/or an indication of whether a quota for the network slice is reached or not. In an example, the first network node may start the timer with the timer value of the configuration information. In an example, the first network node may determine whether the timer expires or not. In an example, based on the determination that the timer expires, the first network node may send to the second network node, an indication of expiration of the timer.

In an example, a first network node (e.g., AMF) may receive from a fourth network node (e.g., PCF, UDM, UDR, AF), configuration information for the quota management. For example, the configuration information received from the fourth network node may comprise at least one of a timer value for a timer associated with the quota management of a network slice, an identity of the network slice, and/or an indication of whether a quota for the network slice is reached or not. In an example, the first network node may determine whether the timer expires or not. In an example, based on the determination that the timer expires, the first network node may send to a second network node (e.g., a NSACF), an indication of expiration of the timer.

In an example, a first network node (e.g., AMF) may receive from a fourth network node (e.g., PCF, UDM, UDR, AF, NSACF), configuration information for the quota management. For example, the configuration information received from the fourth network node may comprise at least one of a timer value for a timer associated with the quota management of a network slice, an identity of the network slice and/or an indication of whether a quota for the network slice is reached or not. In an example, the first network node may start the timer with the timer value of the configuration information for the wireless device In an example, a third network node (e.g., SMF) may receive from a fourth network node (e.g., PCF, UDM, UDR, AF, NSACF), configuration information for the quota management. For example, the configuration information received from the fourth network node may comprise at least one of a timer value for a timer associated with quota management of a network slice, an identity of the network slice, an indication of whether a quota for the network slice is reached or not, and/or an identity of a PDU session. In an example, the first network node may determine whether the timer expires or not. In an example, based on the determination that the timer expires, the first network node may send to a second network node (e.g., a NSACF), an indication of expiration of the timer.

In an example, a third network node (e.g., SMF) may receive from a fourth network node (e.g., PCF, UDM, UDR, AF, NSACF), configuration information for the quota management. For example, the configuration information received from the fourth network node may comprise at least one of a timer value for a timer associated with quota management of a network slice, an identity of the network slice, an indication of whether a quota for the network slice is reached or not, and/or an identity of a PDU session. In an example, the third network node may start the timer with the timer value of the configuration information for the wireless device In an example, a first network node (e.g., AMF) may receive from a second network node (e.g., NSACF, PCF, UDM, UDR, AF), configuration information for the quota management. For example, the configuration information received from the second network node may comprise at least one of a timer value for a timer associated with quota management of a network slice, an identity of the network slice, an indication of whether a quota for the network slice is reached or not, and/or an identity of a PDU session. In an example, the first network node may start the timer with the timer value of the configuration information for the wireless device. In an example, the first network node may determine whether the timer expires or not. In an example, based on the determination that the timer expires, the first network node may send to the wireless device, at least one of an indication of expiration of the timer, and/or an indication that the network slice is not allowed/rejected for the wireless device.

In an example, a third network node (e.g., SMF) may receive from a second network node (e.g., NSACF, PCF, UDM, UDR, AF), configuration information for the quota management. For example, the configuration information received from the second network node may comprise at least one of a timer value for a timer associated with quota management of a network slice, an identity of the network slice, an indication of whether a quota for the network slice is reached or not, and/or an identity of a PDU session. In an example, the third network node may start the timer with the timer value of the configuration information for the PDU session. In an example, the third network node may determine whether the timer expires or not. In an example, based on the determination that the timer expires, the third network node may send to the wireless device, at least one of an indication of expiration of the timer, and/or an indication that the PDU session is released/deactivated for the wireless device.

In an example, a second network node (e.g., NSACF) may receive from a first network node (e.g., AMF), an indication of expiration of a timer associated with a network slice for a wireless device. The second network node may determine, based on the indication, to remove the wireless device from the registration to the network slice. Based on the determination, the second network node may send to the first network node, a message indicating that the registration of the wireless device to the network slice is to be rejected or to be removed.

In an example, a second network node (e.g., NSACF) may receive from a third network node (e.g., SMF), an indication of expiration of a timer associated with a network slice for a PDU session. The second network node may determine, based on the indication, to update status of the PDU session. Based on the determination to update the status of the PDU session, the second network node may send to the third network node, a message indicating the updated status of the PDU session of the network slice.

In an example, a third network node (e.g., SMF) may send to a fifth network node (e.g., UPF, NG-RAN), at least one of a first configuration information for a timer associated with the quota management for a network slice and/or a second configuration information for a timer associated with a PDU session. In an example, the third network node may receive from the fifth network node, an indication of expiration for the timer associated with the quota management for a network slice.

In an example, a fifth network node (e.g., UPF, NG-RAN) may receive from a third network node (e.g., SMF), at least one of a first configuration information for a timer associated with the quota management for a network slice and/or a second configuration information for a timer associated with a PDU session. In an example, the fifth network node may send to the third network node, an indication of expiration for the timer associated with the quota management for a network slice.

What is claimed is:

1. A method comprising:

receiving, by an access and mobility management function (AMF) from a unified data management (UDM), a timer value for a network slice inactivity timer for removal of a network slice due to inactivity by a wireless device using the network slice;

sending, by the AMF, a first wireless device configuration message indicating that the network slice is allowed for the wireless device;

starting, by the AMF, the network slice inactivity timer using the timer value in response to:

the network slice being allowed for the wireless device;

a protocol data unit (PDU) session of the network slice being released; and no more PDU sessions for the wireless device being established on the network slice after the PDU session of the network slice is released; and sending, by the AMF to the wireless device and upon expiration of the network slice inactivity timer, a second wireless device configuration message comprising an indication of removal of the network slice.

2. The method of claim 1, wherein the AMF starts the network slice inactivity timer based on a second message comprising one or more identities of network slices allowed for the wireless device being sent to the wireless device.

3. The method of claim 1, further comprising stopping by the AMF, the network slice inactivity timer, based on at least one of:

a PDU session being established for the network slice;

the network slice not being allowed for the wireless device; or the network slice being deregistered for the wireless device.

4. The method of claim 1, further comprising restarting by the AMF, the network slice inactivity timer, based on at least one of:

a message associated with a PDU session established for the network slice being received for the wireless device; or a message associated with the network slice being sent to the wireless device.

5. The method of claim 1, wherein the indication of removal of the network slice indicates that the network slice is not allowed for the wireless device.

6. The method of claim 1, wherein the indication of removal of the network slices comprises a cause value indicating inactivity of the network slice.

7. An access and mobility management function (AMF) comprising one or more processors and memory storing instructions that, when executed by the one or more processors, cause the AMF to:

receive, from a unified data management (UDM), a timer value for a network slice inactivity timer for removal of a network slice due to inactivity by a wireless device using the network slice;

send a first wireless device configuration message indicating that the network slice is allowed for the wireless device;

start the network slice inactivity timer using the timer value in response to:

the network slice being allowed for the wireless device;

a protocol data unit (PDU) session of the network slice being released; and no more PDU sessions for the wireless device being established on the network slice after the PDU session of the network slice is released; and send, to the wireless device and upon expiration of the network slice inactivity timer, a second wireless device configuration message comprising an indication of removal of the network slice.

8. The AMF of claim 7, wherein the AMF starts the network slice inactivity timer based on a second message comprising one or more identities of network slices allowed for the wireless device being sent to the wireless device.

9. The AMF of claim 7, wherein the instructions further cause the AMF to stop the network slice inactivity timer, based on at least one of:

a PDU session being established for the network slice;

the network slice not being allowed for the wireless device; or the network slice being deregistered for the wireless device.

10. The AMF of claim 7, wherein the instructions further cause the AMF to restart the network slice inactivity timer, based on at least one of:

a message associated with a PDU session established for the network slice being received for the wireless device; or a message associated with the network slice being sent to the wireless device.

11. The AMF of claim 7, wherein the indication of removal of the network slice indicates that the network slice is not allowed for the wireless device.

12. The AMF of claim 7, wherein the indication of removal of the network slices comprises a cause value indicating inactivity of the network slice.

13. A non-transitory computer-readable medium comprising instructions that, when executed by one or more processors, cause an access and mobility management function (AMF) to:

receive, from a unified data management (UDM), a timer value for a network slice inactivity timer for removal of a network slice due to inactivity by a wireless device using the network slice;

send a first wireless device configuration message indicating that the network slice is allowed for the wireless device;

start the network slice inactivity timer using the timer value in response to:

the network slice being allowed for the wireless device;

a protocol data unit (PDU) session of the network slice being released; and no more PDU sessions for the wireless device being established on the network slice after the PDU session of the network slice is released; and send, to the wireless device and upon expiration of the network slice inactivity timer, a second wireless device configuration message comprising an indication of removal of the network slice.

14. The non-transitory computer-readable medium of claim 13, wherein the AMF starts the network slice inactivity timer based on a second message comprising one or more identities of network slices allowed for the wireless device being sent to the wireless device.

15. The non-transitory computer-readable medium of claim 13, wherein the instructions further cause the AMF to stop the network slice inactivity timer, based on at least one of:

a PDU session being established for the network slice;

the network slice not being allowed for the wireless device; or the network slice being deregistered for the wireless device.

16. The non-transitory computer-readable medium of claim 13, wherein the instructions further cause the AMF to restart the network slice inactivity timer, based on at least one of:

a message associated with a PDU session established for the network slice being received for the wireless device; or a message associated with the network slice being sent to the wireless device.

17. The non-transitory computer-readable medium of claim 13, wherein the indication of removal of the network slice indicates that the network slice is not allowed for the wireless device.

* * * * *